US011898387B2

(12) United States Patent
Rivas et al.

(10) Patent No.: US 11,898,387 B2
(45) Date of Patent: Feb. 13, 2024

(54) PREASSEMBLED FRICTION HINGE MODULE AND HINGED SYSTEM

(71) Applicant: Southco, Inc., Concordville, PA (US)

(72) Inventors: Hector Eduardo Rivas, Chihuahua (MX); Mark James Rowley, Concordville, PA (US); Pradeep Jayanna, Concordville, PA (US); Michael Thomas Holland, Concordville, PA (US); Richard B. Langkamp, Jr., Concordville, PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 17/191,202

(22) Filed: Mar. 3, 2021

(65) Prior Publication Data

US 2021/0277694 A1 Sep. 9, 2021

Related U.S. Application Data

(60) Provisional application No. 63/130,008, filed on Dec. 23, 2020, provisional application No. 62/986,309, filed on Mar. 6, 2020.

(51) Int. Cl.
*E05D 11/08* (2006.01)
*E05D 11/00* (2006.01)
(Continued)

(52) U.S. Cl.
CPC .............. *E05D 11/082* (2013.01); *E05D 1/06* (2013.01); *E05D 3/02* (2013.01); *E05D 11/0054* (2013.01);
(Continued)

(58) Field of Classification Search
CPC ................. G06F 1/1681; G06F 1/1616; E05Y 2900/606; E05Y 2201/11; E05Y 2201/21;
(Continued)

(56) References Cited

U.S. PATENT DOCUMENTS 5,425,157 A * 6/1995 Chang .................. E05D 11/082 16/386
5,464,083 A * 11/1995 Arnold ................. G06F 1/1681 16/337
(Continued)

FOREIGN PATENT DOCUMENTS

CN 205652049 U 10/2016
CN 208306425 U * 1/2019
(Continued)

OTHER PUBLICATIONS

Chinese Notification to Make Rectification for Chinese Application No. 202110250973.0, dated Apr. 7, 2021, with translation, 3 pages.
(Continued)

*Primary Examiner* — Chuck Y Mah
(74) *Attorney, Agent, or Firm* — RatnerPrestia

(57) ABSTRACT

A hinged system includes a preassembled hinge module for pivotally coupling a first component to a second component. The preassembled hinge module includes a shaft, a torque element frictionally engaging the shaft, and a housing. The housing includes a cover, a side wall, and a rear wall that define an interior space enclosed within the housing. The interior space receives the torque element inside the housing. The cover defines a first aperture, and the rear wall defines a second aperture, the first aperture and the second aperture aligned with a pivot axis of the shaft. The shaft extends through at least the first aperture, the interior space, and the second aperture. The shaft is separate from, and configured to be mounted to, the first component. The housing is separate from, and configured to be mounted to, the second component.

29 Claims, 63 Drawing Sheets

(51) Int. Cl.
*E05D 3/02* (2006.01)
*E05D 11/02* (2006.01)
*E05D 1/06* (2006.01)

(52) U.S. Cl.
CPC ........... *E05D 11/02* (2013.01); *E05Y 2201/11* (2013.01); *E05Y 2201/21* (2013.01); *E05Y 2201/26* (2013.01); *E05Y 2201/266* (2013.01)

(58) Field of Classification Search
CPC .......... E05Y 2201/266; E05Y 2201/26; H04M 1/0216; E05D 11/0054; E05D 11/02; E05D 11/06; E05D 11/082; E05D 11/084; E05D 11/085; E05D 3/02; E05D 5/14; E05D 2005/145; F16C 11/04; Y10T 16/54038
See application file for complete search history.

(56) References Cited

U.S. PATENT DOCUMENTS

| | | | | | |
|---|---|---|---|---|---|
| 6,101,676 | A * | 8/2000 | Wahl | G06F 1/1681 403/114 |
| 6,530,123 | B1 * | 3/2003 | Wahlstedt | G06F 1/1616 16/337 |
| 7,143,476 | B2 * | 12/2006 | Minami | G06F 1/1681 16/337 |
| 7,614,674 | B2 | 11/2009 | Shiono et al. | |
| 7,770,953 | B2 | 8/2010 | Koarai | |
| 8,074,832 | B2 | 12/2011 | Fujiwara et al. | |
| 8,448,297 | B2 * | 5/2013 | Chen | E05D 11/10 16/342 |
| 8,523,476 | B2 * | 9/2013 | Billings | E05D 11/084 403/41 |
| 9,206,633 | B1 * | 12/2015 | Ju | G06F 1/1681 |
| 9,243,434 | B2 | 1/2016 | Koarai et al. | |
| 9,341,009 | B2 * | 5/2016 | Triebold | F16C 11/069 |
| 9,554,654 | B1 * | 1/2017 | Jung | A47C 7/566 |
| 10,202,791 | B1 * | 2/2019 | Jean | E05D 11/082 |
| 2006/0090298 | A1 * | 5/2006 | Kitamura | G06F 1/1616 16/337 |
| 2007/0094845 | A1 * | 5/2007 | Chang | G06F 1/1616 16/342 |
| 2009/0293229 | A1 * | 12/2009 | Chiang | G06F 1/1616 16/342 |
| 2009/0311073 | A1 * | 12/2009 | Lee | E05D 11/087 411/209 |
| 2011/0041291 | A1 * | 2/2011 | Tseng | G06F 1/1681 16/386 |
| 2011/0239408 | A1 * | 10/2011 | Chang | G06F 1/1681 16/386 |
| 2013/0111706 | A1 * | 5/2013 | Anderson | E05D 11/1085 16/342 |
| 2014/0059805 | A1 * | 3/2014 | Krahn | G06F 1/1681 16/342 |
| 2015/0121654 | A1 * | 5/2015 | Novin | E05D 11/082 16/273 |
| 2018/0224898 | A1 * | 8/2018 | Huang | G06F 1/1616 |
| 2019/0346890 | A1 * | 11/2019 | Kim | E05D 11/00 |
| 2020/0048948 | A1 * | 2/2020 | Kuramochi | E05F 3/14 |
| 2021/0031698 | A1 | 2/2021 | Fujiwara | |

FOREIGN PATENT DOCUMENTS

| | | | | | |
|---|---|---|---|---|---|
| DE | 202018102763 | U1 | | 8/2018 | |
| JP | 2009067104 | A | | 4/2009 | |
| JP | 2009067105 | A | | 4/2009 | |
| JP | 2010159033 | A | | 7/2010 | |
| KR | 2001094560 | A | * | 11/2001 | F16C 11/04 |
| KR | 20070082663 | A | | 8/2007 | |

OTHER PUBLICATIONS

Extended European Search Report for European Application No. 21 161 109.0, dated Oct. 8, 2021, 8 pages.

* cited by examiner

PREASSEMBLED FRICTION HINGE MODULE AND HINGED SYSTEM

CROSS-REFERENCE TO RELATED APPLICATIONS

This application claims priority to U.S. Provisional Patent Application Nos. 63/130,008, filed Dec. 23, 2020 and 62/986,309, filed Mar. 6, 2020, the entire disclosures of which are incorporated herein by reference for all purposes.

FIELD

The present invention relates generally to friction hinges, and more specifically to a preassembled friction hinge module that can be used to pivotally connect components in a system.

BACKGROUND

Various types of mechanical hinges are available to connect components in a pivoting relationship. A friction hinge, also referred to as a "constant torque hinge" or "position hinge," is one type of hinge used on apparatuses that feature a pivoting door, panel or other part that opens and closes about a pivot axis. Friction hinges are commonly used to connect laptop computer screens to keyboards, and to connect arm rests to center consoles in automobiles, among other applications.

In a typical friction hinge, a pivot shaft has an outer surface that bears against the inner surface of another part, creating mechanical interference in the hinge. This mechanical interference holds components in a stable position after they are pivoted and released, which is desirable for holding components such as doors and arm rests in any position. The mechanical interference also adds a tactile "quality feel" to the door and arm rest movement, providing substantially constant resistance to rotation engaging the user experience during the closing and opening efforts.

Conventional friction hinges used in center consoles are typically manufactured as a large assembly of parts. The assembly can include large brackets and other stamped pieces that are designed for installation into the automobile interior. The size of these hinge assemblies is relatively large, adding significant weight to the console. In addition, the stamped parts require additional tooling to manufacture the parts.

SUMMARY OF THE INVENTION

The drawbacks of conventional friction hinge assemblies are addressed in many respects by friction hinge modules, systems and methods in accordance with the invention.

In a first aspect of the invention, a preassembled hinge module is configured for coupling a first component to a second component for pivotal movement relative to one another. The preassembled hinge module includes a shaft defining a pivot axis; a torque element frictionally engaging the shaft; and a housing, the housing comprising a side wall, a rear wall, and a cover, the side wall, the rear wall, and the cover together defining an interior space within the housing, wherein the interior space is configured to receive the torque element inside the housing; wherein the cover defines a first aperture and the rear wall defines a second aperture being aligned with the pivot axis of the shaft, with the shaft extending through at least the first aperture, the interior space of the housing, and the second aperture; wherein the shaft is separate from, and configured to be mounted to, the first component; and wherein the housing is separate from, and configured to be mounted to, the second component. This new design allows for the use of lighter material brackets, such as molded plastic or castings. Also, the new design allows for the reduction of components, such as the removal of an element staking rivet or other components rendered unnecessary by the design.

In another aspect of the invention, a method is provided for manufacturing a hinge module, the method includes the steps of placing a torque element inside an interior space of a housing; aligning an aperture defined in a rear wall of the housing with an aperture defined in the torque element to create a passage; inserting a shaft through the passage; placing a cover adjacent the torque element such that an end of the shaft is exposed through an aperture of the cover; and squeezing the side wall along the perimeter to secure the cover relative to the housing.

In still another aspect of the invention, a hinge module set is configured for coupling a first component to a second component for pivotal movement relative to one another, the hinge module set comprising a first preassembled hinge module configured to control relative pivotal movement of the first and second components in a first pivot direction, and a second preassembled hinge module configured to control relative pivotal movement of the first and second components in a second pivot direction opposite the first direction, the first and second preassembled hinge modules each includes a shaft defining a pivot axis; a torque element frictionally engaging the shaft; and a housing, the housing comprising a side wall, a rear wall, and a cover, the side wall, the rear wall, and the cover together defining an interior space within the housing, wherein the interior space is configured to receive the torque element inside the housing; wherein the cover defines a first aperture and the rear wall defines a second aperture being aligned with the pivot axis of the shaft, with the shaft extending through at least the first aperture, the interior space of the housing, and the second aperture; wherein the shaft is separate from, and configured to be mounted to, the first component; and wherein the housing is separate from, and configured to be mounted to, the second component.

In yet another aspect of the invention, a hinged system is configured for coupling a first component to a second component for pivotal movement relative to one another, the preassembled hinge module includes a shaft defining a pivot axis, the shaft being separate from, and configured to be mounted to, the first component; a torque element frictionally engaging the shaft; a housing containing the torque element; and an adapter having an end configured for fixed coupling to the shaft and an opposite end configured for releasable coupling to the first component.

In another aspect of the invention, a hinged system includes a first component; a second component; and a preassembled hinge module that couples the first component to the second component in a pivot connection so as to allow pivotal movement of the first component relative to the second component, the preassembled hinge module including a shaft defining a pivot axis; a torque element frictionally engaging the shaft; and a housing defining an interior space enclosed within the housing, wherein the interior space is configured to receive the torque element, wherein the cover defines a first aperture and the rear wall defines a second aperture, the first aperture and the second aperture being aligned with the pivot axis of the shaft, with the shaft extending through at least the first aperture, the interior space of the housing, and the second aperture, wherein the shaft is mounted to the first component, and wherein the housing is mounted to the second component.

BRIEF DESCRIPTION OF THE DRAWINGS

The foregoing summary and the following description will be better appreciated and understood in conjunction with the non-limiting examples illustrated in the attached drawing figures, of which.

DETAILED DESCRIPTION

Figure 1A:
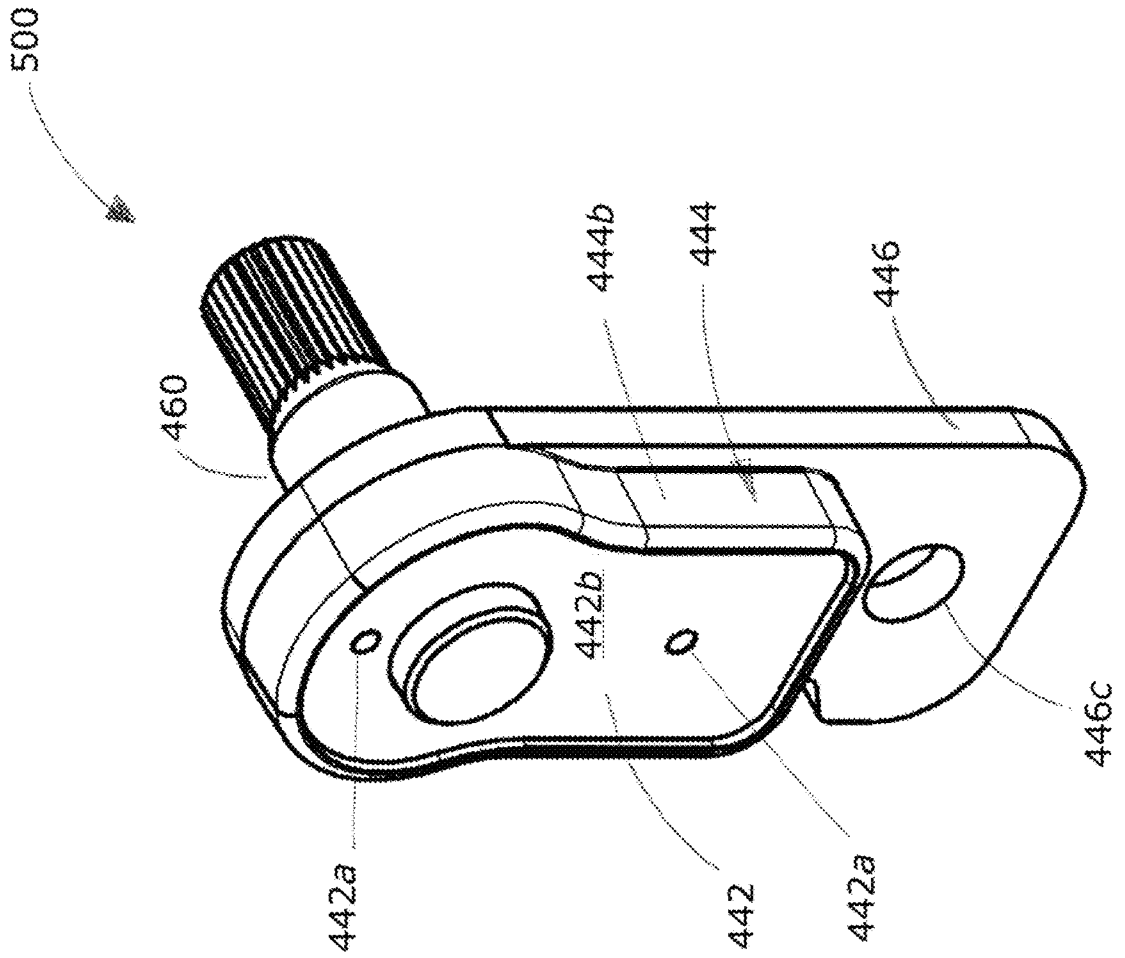
FIG. 1A is a perspective view of a preassembled hinge module in accordance with an exemplary embodiment of the invention.

Although the invention is illustrated and described herein with reference to specific embodiments, the invention is not intended to be limited to the details shown. Rather, various modifications may be made in the details within the scope and range of equivalents of the claims and without departing from the invention.

Additionally, various forms and embodiments of the invention are illustrated in the figures. It will be appreciated that the combination and arrangement of some or all features of any of the embodiments with other embodiments is specifically contemplated herein. Accordingly, this detailed disclosure expressly includes the specific embodiments illustrated herein, combinations and sub-combinations of features of the illustrated embodiments, and variations of the illustrated embodiments.

Referring generally to FIGS. 1-18, a preassembled hinge module 500 is configured for coupling a first component 110 to a second component 120 for pivotal movement relative to one another, the preassembled hinge module 500 includes a shaft 460 defining a pivot axis 462; a torque element 480 frictionally engaging the shaft 460, the torque element 480 having a perimeter defining a recess 482; and a housing 440 having a side wall 444, a rear wall 446, and a cover 442, the side wall 444 and the rear wall 446 and the cover 442 together defining an interior space 448 within the housing 440, wherein the interior space 448 is configured to receive the torque element 480 inside the housing 440, the side wall 446 of the housing 440 having a detent or protrusion 486 extending into the interior space 448 within the housing 440, the detent or protrusion 486 extending into the recess 482 defined in the perimeter of the torque element 480, thereby limiting movement of the torque element 480 relative to the housing 440; wherein the cover 442 defines a first aperture 443 and the rear wall 446 defines a second aperture 447, the first aperture 443 and the second aperture 447 being aligned with the pivot axis 462 of the shaft 460, with the shaft 460 extending through at least the first aperture 443, the interior space 448 of the housing 440, and the second aperture 447; wherein the shaft 460 is separate from, and configured to be mounted to, the first component 110; and wherein the housing 440 is separate from, and configured to be mounted to, the second component 120.

The rear wall 446 of the housing of the preassembled hinge module 500 may include a universal mounting surface 449 configured to be mounted to the second component 120.

The torque element 480 defines an aperture 484 aligned with the pivot axis 462 of the shaft 460, with the shaft 460 extending through the aperture 484 in frictional engagement with the torque element 480.

The side wall 444 has an inner surface 454, supplemental to the detent 486, configured to secure the torque element 480 inside the housing 440 and prevent the torque element 480 from rotation with respect to the housing 440.

The inner surface 454 defines one or more ridges 456 for securing the torque element 480.

The rear wall 446 extends beyond the side wall 444 to form an extension 446*b*.

The extension 446*b* of the rear wall 446 defines a third aperture 446C for receiving a mounting fastener 205 to mount the housing 440 to the second component 120.

The rear wall 446 and the side wall 444 of the housing 440 are integrally formed as a single body of unitary construction that is separate from the cover 442.

The preassembled hinge module 500 may include plural torque elements 480 frictionally engaging the shaft 460.

The interior space 448 receives the torque element 480 in a form-locking fit.

The interior space 448 forms a reservoir 448*a* that contains a quantity of lubricant 490.

A method for assembling a hinge module 500 is also provided, the method including placing a torque element 480 inside an interior space 480 of a housing 440 having a rear wall 4446 and a side wall 444 together at least partially defining the interior space 448; applying a lubricant 490 into an edge 488 (FIG. 3A) of the torque element 480; aligning an aperture 447 defined in the rear wall 446 of the housing 440 with an aperture 443 defined in the torque element 480 to create a passage 401; inserting a shaft 460 through the passage 401; placing a cover 442 adjacent the torque element 480 such that an end 464 of the shaft 460 is exposed through an aperture 443 defined in the cover 442 and the cover 442 extends at least partially into the interior space 448 of the housing 440; and deforming the side wall 444 of the housing 440 to secure the cover 442 relative to the housing 440.

The method for assembling a hinge module 500, further comprising includes placing the cover 442 such that the cover 442 extends within the interior space 448 of the housing 440.

An edge surface 444*a* of the side wall 444 of the housing 440 extends beyond an outer surface 442*a* of the cover 442.

The deforming step includes deforming the edge surface of the side wall 444 of the housing 440 to at least partially contact the outer surface of the cover 442, thereby limiting movement of the cover 442 from the interior space 448 of the housing.

The deforming step includes pressing at least a portion of the side wall 444 of the housing 440 inwardly toward the interior space 448 of the housing 440 and into contact with the cover 442.

The steps are performed sequentially in the order recited.

The steps of placing the torque element 480 inside the interior space 448 of the housing 440, inserting the shaft 460 through the passage 401, placing the cover 442 adjacent the torque element 480, and deforming the side wall 444 of the housing 440 are performed by actions initiated generally along a common assembly direction.

The side wall 444 of the housing 440 extends upwardly from the rear wall 446 and the steps of placing the torque element 480 inside the interior space 448 of the housing 440, placing the cover 442 adjacent the torque element 480, and deforming the side wall 444 of the housing 440 are performed by actions performed in a top-down manner generally along the common assembly direction.

The deforming step includes deforming the side wall 444 of the housing 440 radially inwardly from an outer surface 444*b* of the side wall 444 to secure the cover 442 relative to the housing 440.

The side wall 444 of the housing 440 is provided with an inner surface 454 corresponding in position to an outer surface 480*a* of the torque element 480, the method further comprising forcing the cover 442 against the side wall 444 of the housing 440 to move the detent 486 toward the outer surface of the torque element.

The inner surface 454 of the side wall 444 of the housing 440 is or includes a detent 486 and the outer surface of the torque element is a recess 482, the method further comprising forcing the cover 442 against the detent 486 of the side wall 444 of the housing 440 to move material of the detent 486 into the recess 482 of the torque element 480.

The method includes forcing the cover 442 against the detent 486 of the side wall 444 of the housing 440 in a direction toward the rear wall 446 of the housing 440 to move material of the detent 486 in a direction inwardly relative to the side wall 444 of the housing 440 and into the recess 482 of the torque element 480.

A hinge module set 300 is configured for coupling a first component 110 to a second component 120 for pivotal movement relative to one another, the hinge module set 300 including a first preassembled hinge module 400 configured to control relative pivotal movement of the first and second components in a first pivot direction, and a second preassembled hinge module 500 configured to control relative pivotal movement of the first and second components in a second pivot direction opposite the first direction, the first and second preassembled hinge modules each comprising: a shaft 460 defining a pivot axis 462; a torque element 480 frictionally engaging the shaft 460, the torque element 480 having a perimeter defining a recess 482; and a housing 440 having a side wall 444, a rear wall 446, and a cover 442, the side wall 444 and the rear wall 446 and the cover 442 together defining an interior space 448 within the housing 440, wherein the interior space 448 is configured to receive the torque element 480 inside the housing 440, the side wall 444 of the housing 440 having a detent 486 extending into the interior space 448 within the housing 440, the detent 486 extending into the recess 482 defined in the perimeter of the torque element 480, thereby limiting movement of the torque element 480 relative to the housing 440; wherein the cover 442 defines a first aperture 443 and the rear wall 446 defines a second aperture 447, the first aperture 443 and the second aperture 447 being aligned with the pivot axis 462 of the shaft 460, with the shaft 460 extending through at least the first aperture 443, the interior space 448 of the housing 440, and the second aperture 447; wherein the shaft 460 is separate from, and configured to be mounted to, the first component 110; and wherein the housing 440 is separate from, and configured to be mounted to, the second component 120.

The housing 440 of the first preassembled hinge module 400 comprises a first indicia 420 corresponding to a first mounting location, and the second preassembled hinge 500 module comprises a second indicia 520 corresponding to a second mounting location opposite the first mounting location.

A preassembled hinge module system 600 is configured for coupling a first component 110 to a second component 120 for pivotal movement relative to one another, the preassembled hinge system 600 includes a shaft 460 defining a pivot axis 462, the shaft 460 being separate from, and configured to be mounted to, the first component 110; a torque element 480 frictionally engaging the shaft 460; a housing 440 containing the torque element 480; and an adapter 491 having an end 492 configured for fixed coupling to the shaft 460 and an opposite end 493 configured for releasable coupling to the first component 110.

The shaft 460 is mated to the adapter 491, the adapter 491 defining a counterbore opening to receive a portion of an end 466 of the shaft 460.

A hinged system 100 includes a first component 110; a second component 120; and a hinge system 100 including preassembled hinge modules that couple the first component 110 to the second component 120 in a pivot connection so as to allow pivotal movement of the first component 110 relative to the second component 120, each of the preassembled hinge modules including a shaft 460 defining a pivot axis 462; a torque element 480 frictionally engaging the shaft 460; and a housing 440 defining an interior space 448 within the housing 440, wherein the interior space 448 is configured to receive the torque element 480; wherein the cover 442 defines a first aperture 443 and the rear wall 446 defines a second aperture 447, the first aperture 443 and the second aperture 447 being aligned with the pivot axis 462 of the shaft 460, with the shaft 460 extending through at least the first aperture 443, the interior space 448 of the housing 440, and the second aperture 447; wherein the shaft 460 is separate from, and configured to be mounted to, the first component 110; and wherein the housing 440 is separate from, and configured to be mounted to, the second component 120.

Figure 7:
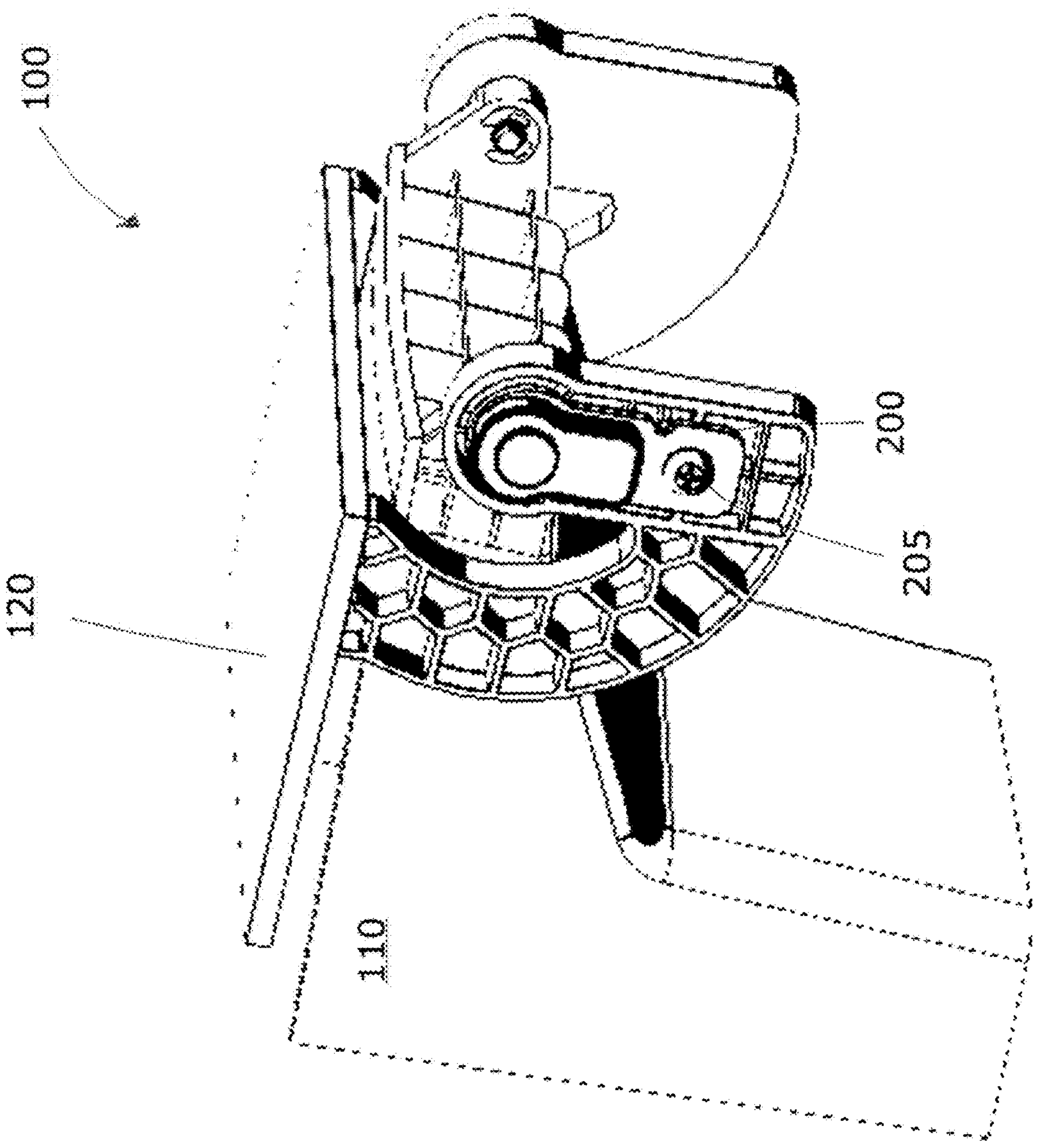
FIG. 7 is a perspective view of a hinged system in accordance with an exemplary embodiment of the invention.

Referring more specifically to FIG. 7, a hinged system 100 is shown in accordance with one embodiment. Hinged system 100 can be utilized in a variety of applications that incorporate one or more friction hinges for controlling relative pivot motion of components. For example, hinged system 100 can be incorporated into various types of closure systems used on motor vehicles, watercraft and/or aircraft, including but not limited to various types of compartments, cabinets, hatches, receptacles, overhead bins and storage units.

In the present example, hinged system 100 is incorporated into a center console of an automobile. Hinged system 100 includes a first component in the form of a console receptacle 110 and a second component in the form of a cover 120. Cover 120 is coupled to receptacle 110 in a pivot connection. The pivot connection allows pivotal movement of cover 120 relative to receptacle 110 between an open position and a closed position. Cover 120 is coupled to receptacle 110 by a pair of hinge modules 200, one on each side of the cover. Each hinge module 200 is a preassembled unit configured for universal mounting to components that require a friction hinge. As such, hinge module 200 can be installed on various types of assemblies and in various arrangements.

Figure 9:
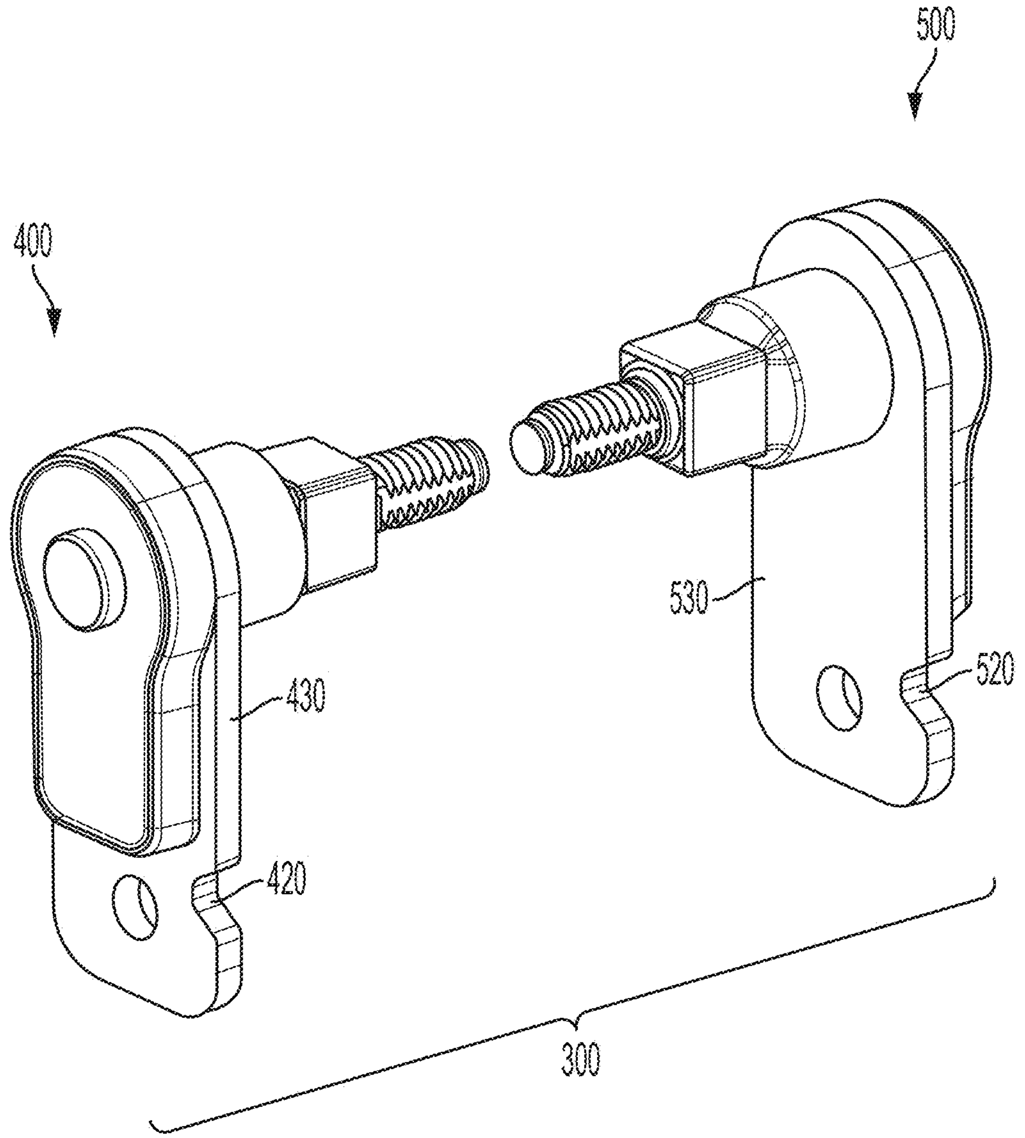
FIG. 9 is a set of two preassembled hinge modules in accordance with another exemplary embodiment of the invention, each hinge module shown with an adapter that can be provided separately.

Referring now to FIG. 9, a hinge module set 300 is shown in accordance with an embodiment of the invention. Hinge module set 300 includes a first preassembled hinge module 400 and a second preassembled hinge module 500. First preassembled hinge module 400 and second preassembled hinge module 500 are configured to couple a first component to a second component for pivotal movement relative to one another along a pivot axis. First preassembled hinge module 400 is installed at a first point along the pivot axis, and second preassembled hinge module 500 is installed at a second point along the pivot axis. As such, first preassembled hinge module 400 and second preassembled hinge module 500 are configured to control pivot motion at opposite ends of a pivot axis between two components. For example, preassembled hinge module 400 and preassembled hinge module 500 can be installed on a center console in a mirrored arrangement in which the hinge modules are installed on opposite sides of the cover.

Preassembled hinge module 400 and preassembled hinge module 500 apply frictional resistance against pivot motion. The amount of frictional resistance applied by hinge module 400 is the same amount of frictional resistance applied by hinge module 500. In another embodiment of the invention, the amount of frictional resistance applied by hinge module 400 is different from the amount of frictional resistance applied by hinge module 500. When hinge modules 400 and 500 are installed, hinge module 400 applies frictional resistance in a first direction, and hinge module 500 applies frictional resistance in a second direction that is the opposite of the first direction. In another embodiment of the invention, hinge module 400 applies frictional resistance in a first direction and hinge module 500 applies resistance in a first direction. For this reason, preassembled hinge modules 400 and 500 must be installed on the correct sides of an arm rest.

Each of hinge modules 400 and 500 is designated for installation at a specific side or position on the pivot axis relative to the cover, so that the hinge modules apply the same amount of frictional resistance to pivot motion in the same directions. Preassembled hinge module 400 is designed to couple a cover to a left side of a console receptacle, and preassembled hinge module 500 is designed to couple the cover to a right side of a console receptacle.

Hinge modules 400 and 500 include geometric features that ensure that the hinge modules are only installed on the correct side of the console. In particular, hinge module 400 includes a surface indentation or notch 420 on a right side, and hinge module 500 includes a surface indentation or notch 520 on a left side. As such, hinge module 400 has a profile shape 430 that is the mirror image of the profile shape 530 of hinge module 500.

The mounting surfaces on each side of the console have recesses with shapes that conform to only one of the profile shapes 430 and 530, so that each side of the console will accept only one of the hinge modules 400 and 500. This ensures that the hinge modules 400 and 500 are installed on the correct sides of the console. Hinge modules 400 and 500 each include the same component parts. Therefore, only the component parts of hinge module 500 will be described, with the understanding that hinge module 400 also includes similar parts designed to produce frictional resistances in the opposite direction.

Figure 1B:
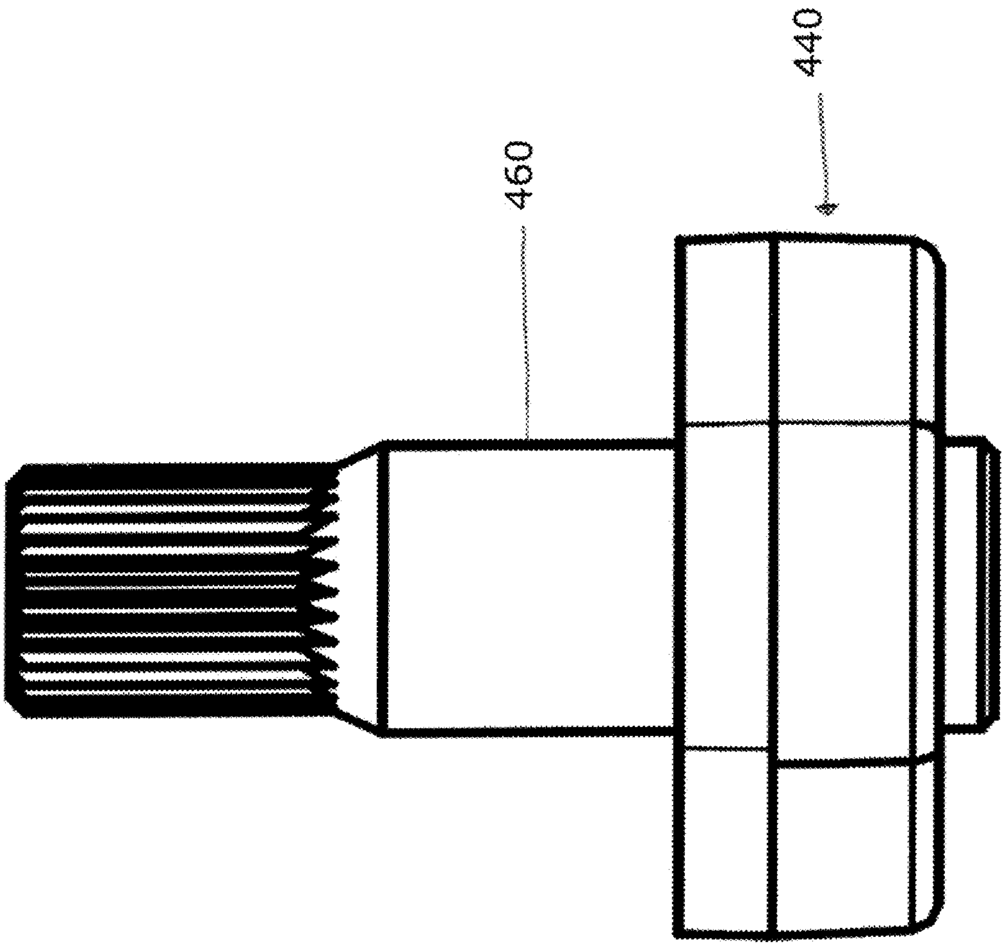
FIG. 1B is a top plan view of the preassembled hinge module of FIG. 1A.
Figure 1C:
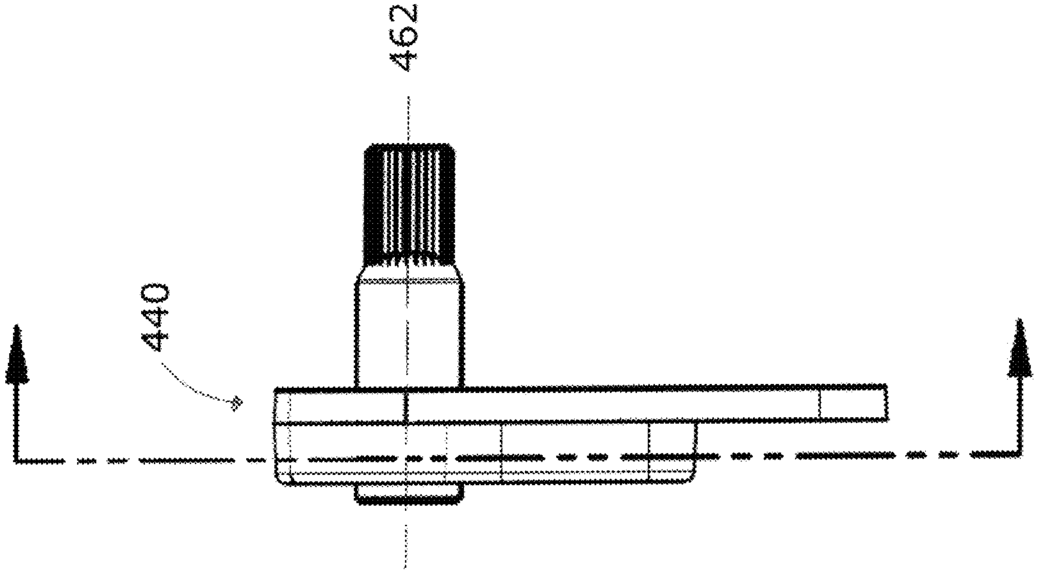
FIG. 1C is a side view of the preassembled hinge module of FIG. 1A.
Figure 2A:
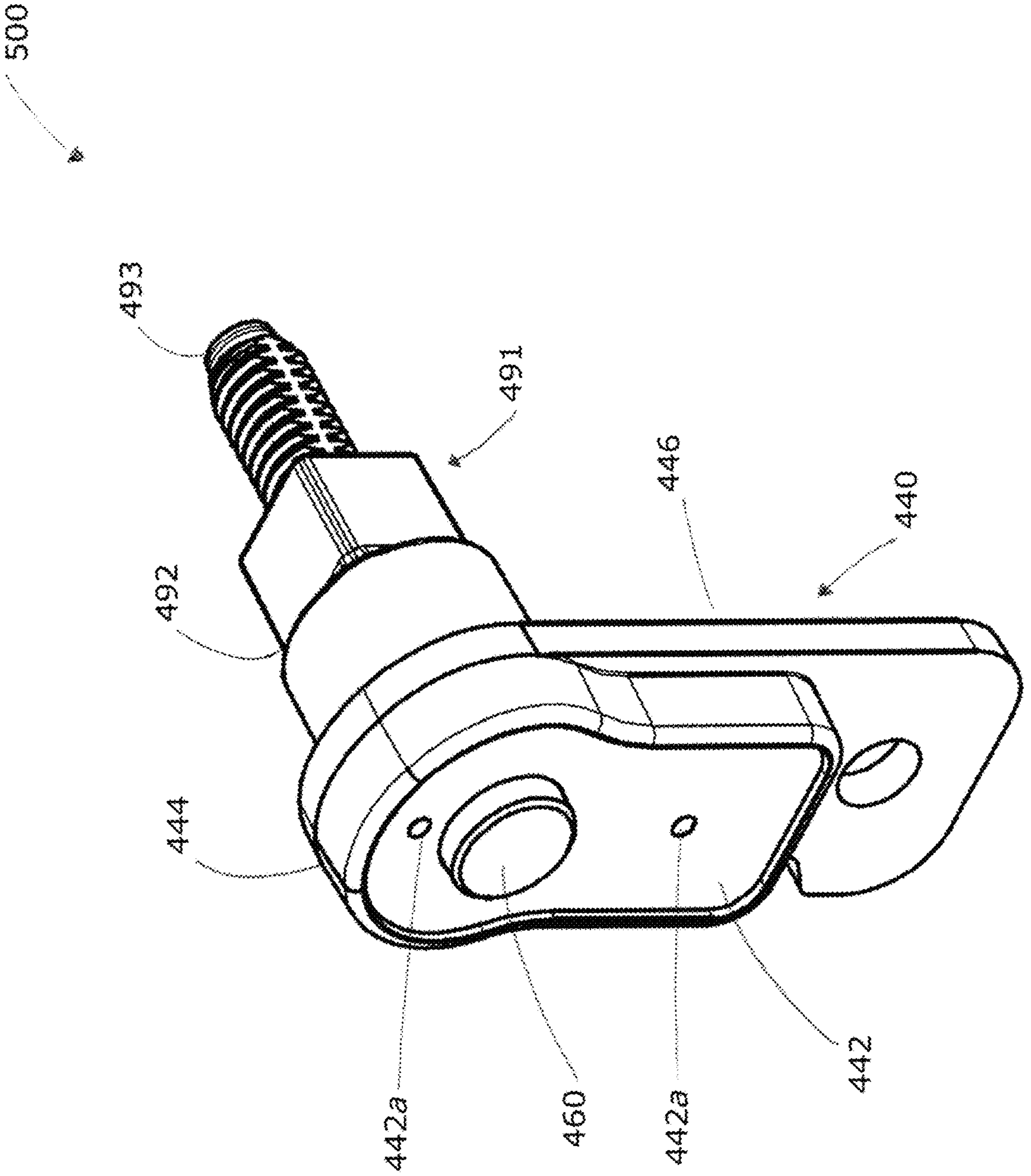
FIG. 2A is a perspective view of a preassembled hinge module in accordance with another exemplary embodiment of the invention, shown with an adapter that can be provided separately.
Figure 2B:
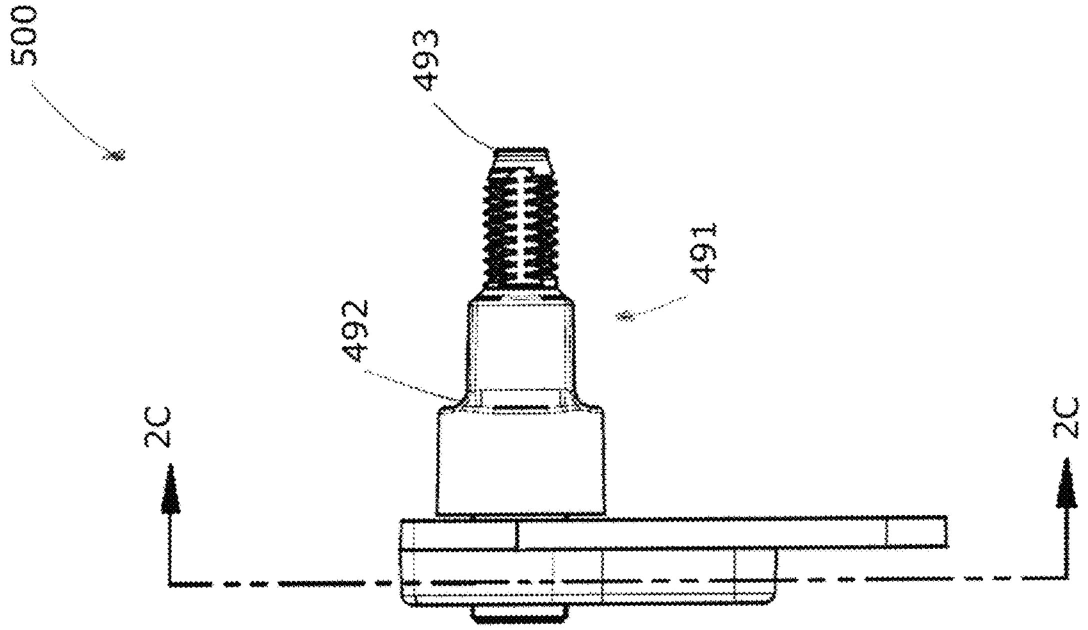
FIG. 2B is a side view of the preassembled hinge module of FIG. 2A.
Figure 2C:
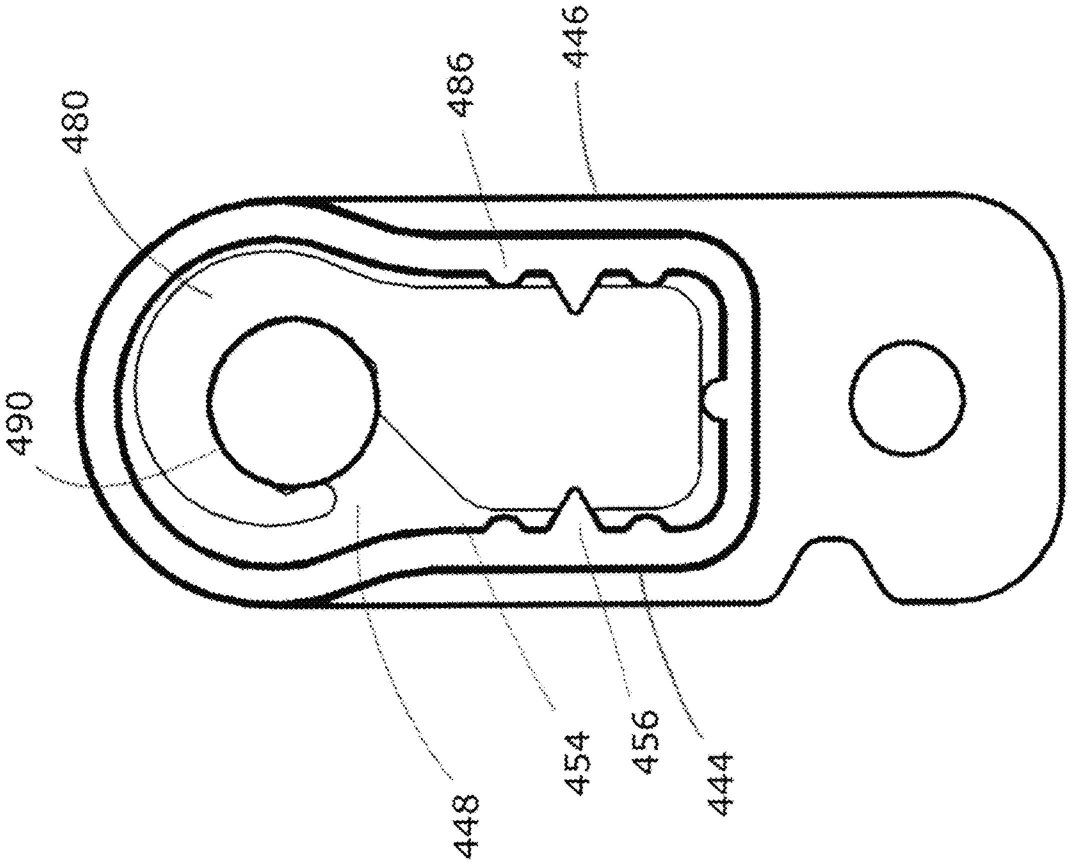
FIG. 2C is a cross section view of a housing of the hinge module of FIG. 2A taken through line 2C-2C, showing a torque element secured inside the housing.
Figure 2D:
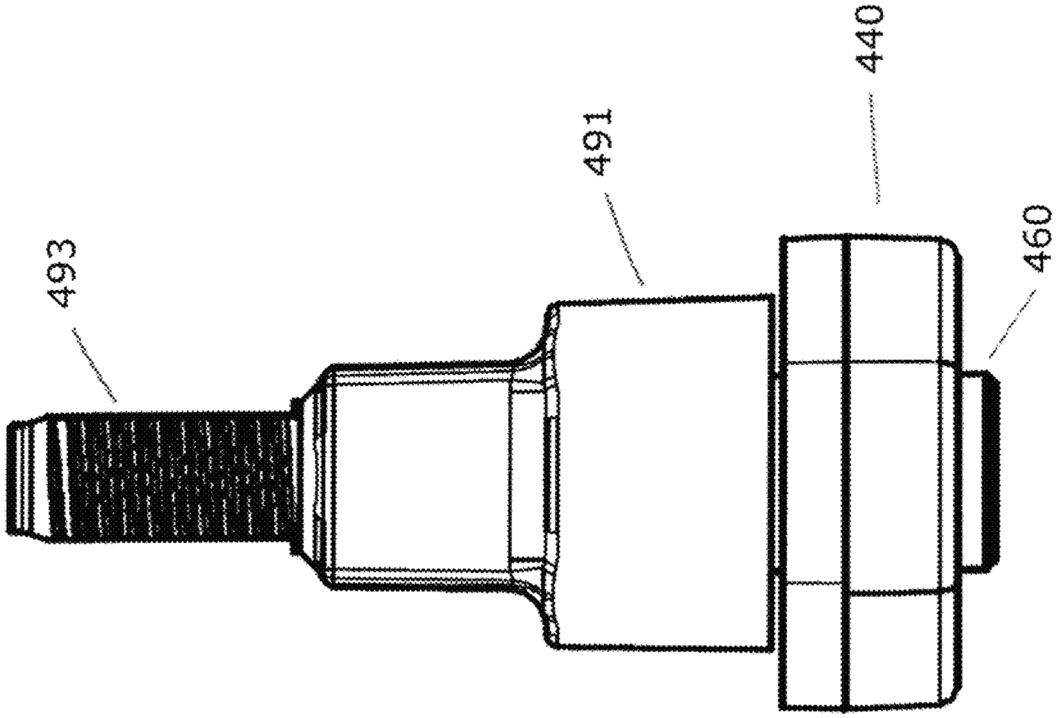
FIG. 2D is a top plan view of the preassembled hinge module of FIG. 2A.
Figure 2E:
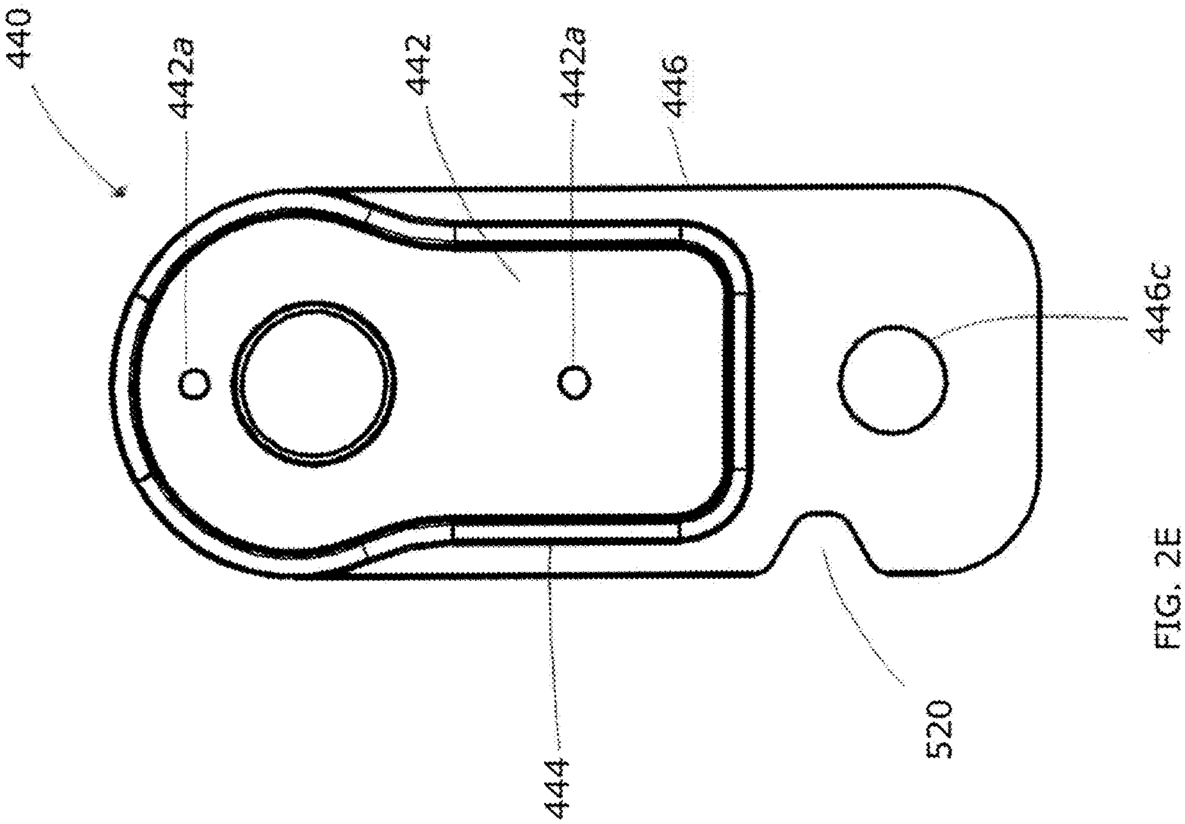
FIG. 2E is a front elevational view of the preassembled hinge module of FIG. 2A, showing the cover.
Figure 3A:
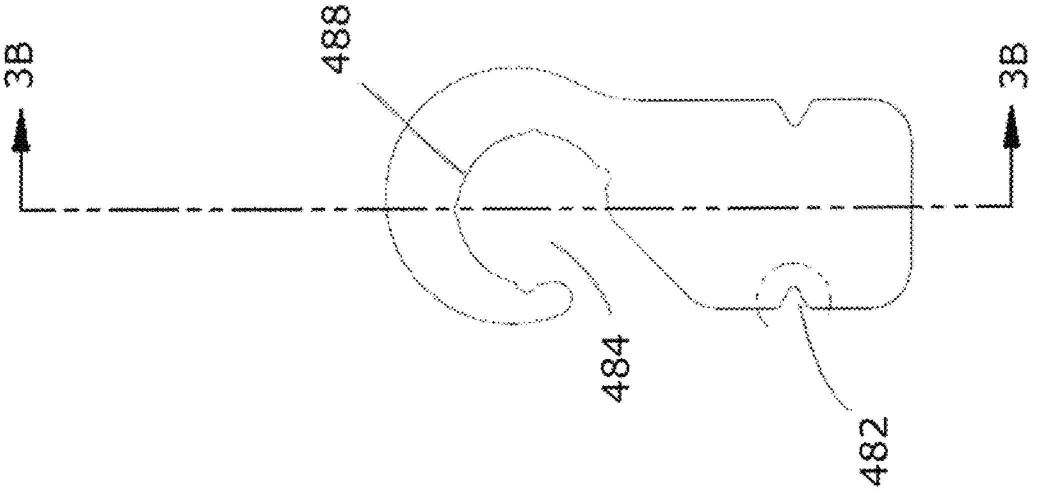
FIG. 3A is a front elevational view of a torque element of the hinge module of FIG. 1A.
Figure 3B:
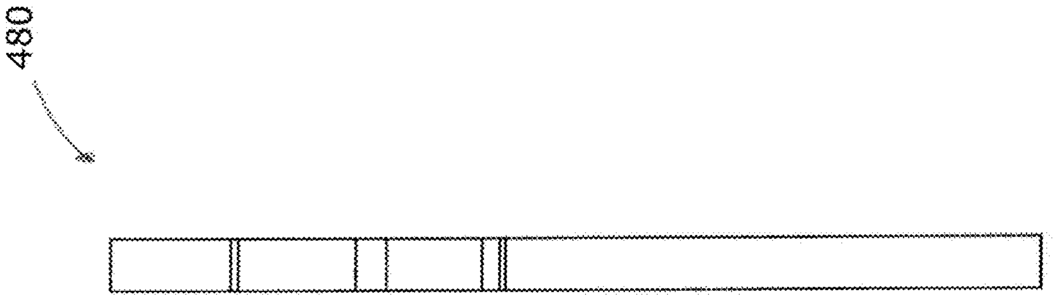
FIG. 3B is a cross section view of the torque element of the hinge module of FIG. 1A taken through line 3B—3B.
Figure 3C:
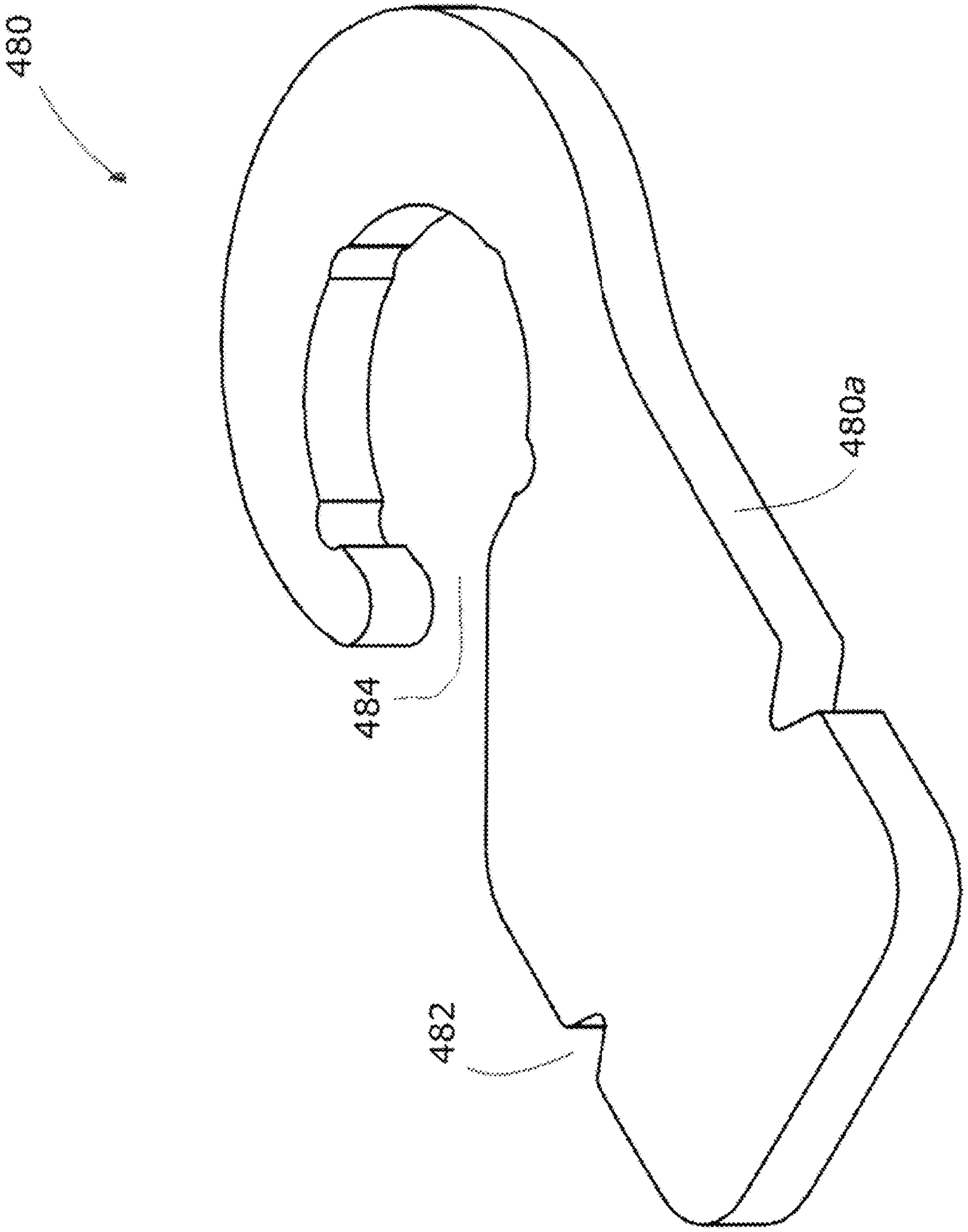
FIG. 3C is a perspective view of the torque element of the hinge module of FIG. 1A.
Figure 3D:
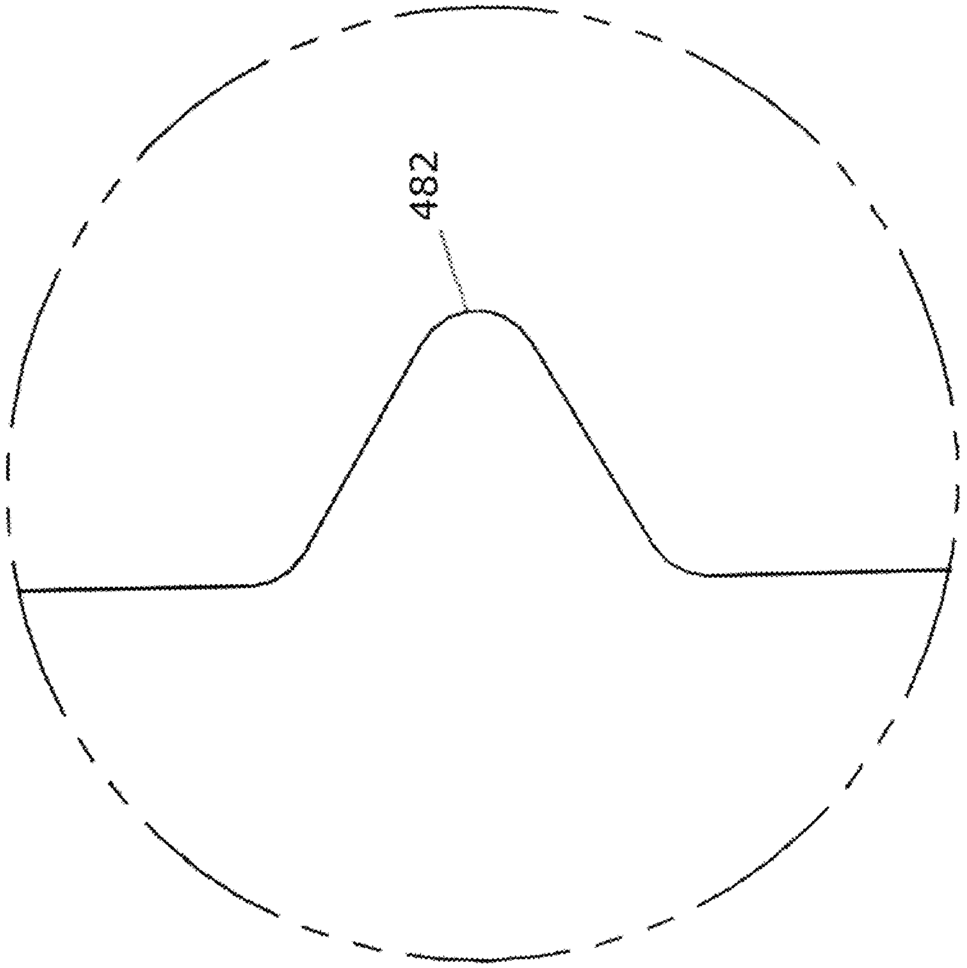
FIG. 3D is an enlarged view of a portion of the perimeter surface of the torque element of FIG. 3A, showing a recess in the perimeter of the torque element.
Figure 8:
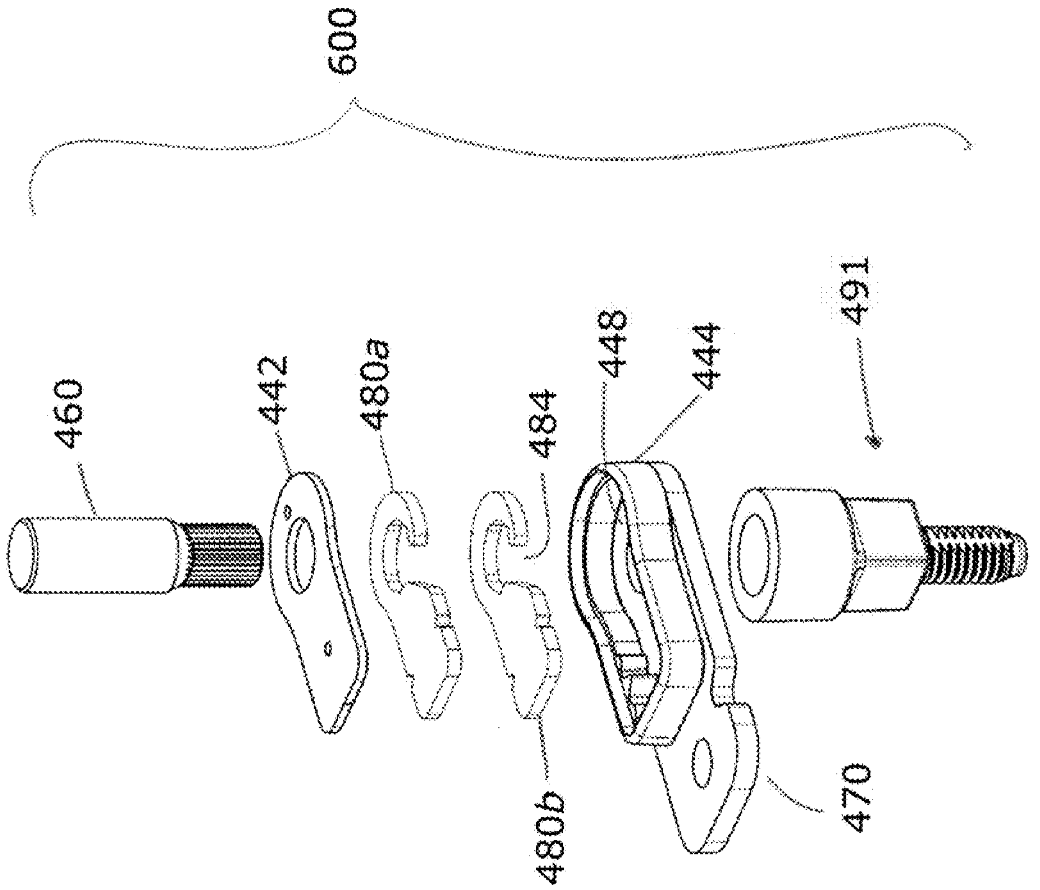
FIG. 8 is an exploded view the hinge module of FIG. 2A.

Referring now to FIGS. 1A-1C, hinge module 500 includes a housing 440 and a shaft 460 that defines a pivot axis 462. Housing 440 has a cover 442, a side wall 444, and a rear wall 446. In one embodiment, as shown in FIGS. 2A, 2B, and 2D, hinge module 500 includes a housing 440, having a cover 442, a side wall 444, and a rear wall 446, and a shaft 460 coupled to an end 492 of adapter 491, the adapter 491 having an opposite end 493 configured for releasable coupling to a first component. In FIG. 8, cover 442, side wall 444 and rear wall 446 define an interior space 448. As shown in FIG. 2C, interior space 448 is configured to receive torque element 480. In FIGS. 3A-3D, torque element 480 defines a recess 482 that extends through a portion of the torque element 480. FIGS. 16A-16D illustrate another embodiment of torque element 480 defining recess 482 that extends through a portion of the torque element 480. In addition, torque element 480 defines an aperture 484 for frictionally engaging shaft 460.

Referring to FIG. 2C, side wall 444 has a detent 486 extending into interior space 448 within housing 440. The detent can be provided in the form of a pointed or rounded ridge, an extension, a contour, or any form that can extend an interior surface of any wall of the housing into the interior space. Detent 486 extends into recess 482 defined in the perimeter of torque element 480, thereby securing torque element 480 inside housing 440 and limiting movement of torque element 480 from rotation with respect to housing 440. Alternatively, the perimeter of the torque element can be provided with a detent to extend outwardly into a recess formed in a wall of the housing; in other words, the recess and detent arrangement shown in FIG. 2C can be reversed by placing the recess on the housing and the detent on the torque element or vis-a-versa.

The amount of frictional resistance provided by torque element 480 depends in part on the amount of surface area of the torque element that contacts shaft 460. Accordingly, the thickness of a single torque element can be varied to change the frictional resistance. Also, the respective dimensions (outer dimension of the shaft and inner dimension of the torque element) can be modified to increase or decrease the frictional resistance.

In FIG. 2C, only one torque element 480 is visible. It will be understood, however, that one or more additional torque elements can be received in interior space 448 and stacked adjacent to torque element 480. Placing additional torque elements adjacent to torque element 448 increases the total surface area that frictionally engages shaft 460, and therefore increases the amount of frictional resistance provided by hinge module 500.

Figure 10A:
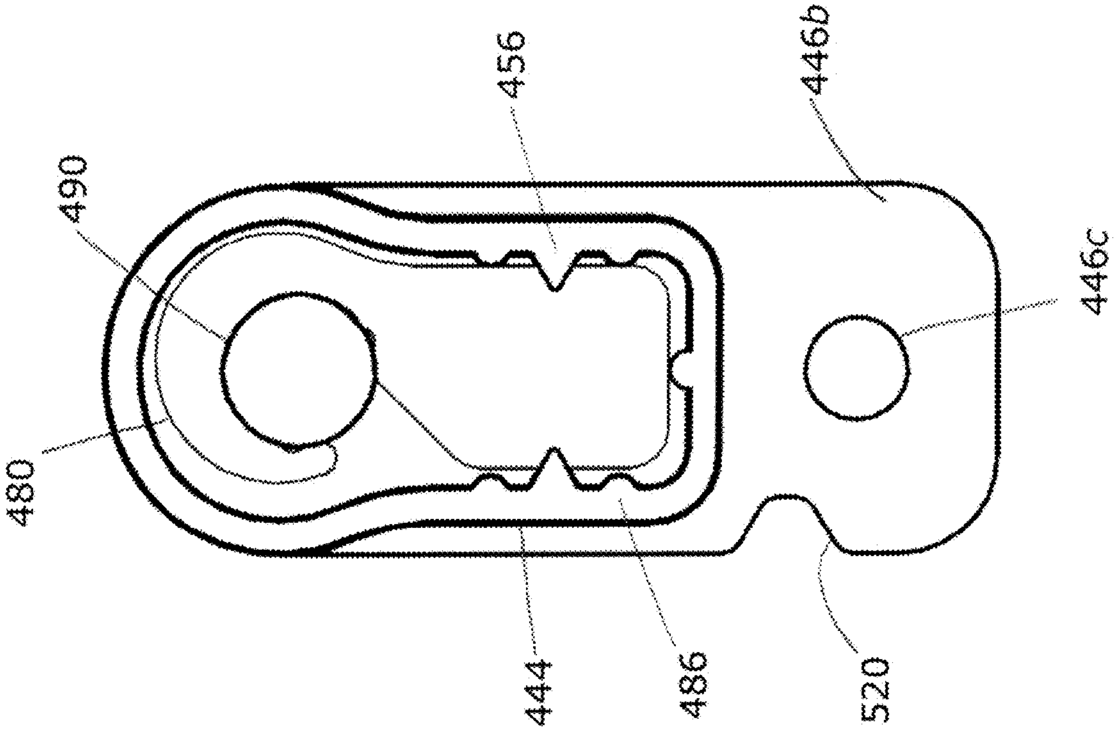
FIG. 10A is a cross section view of a hinge module from the set of FIG. 9, showing a torque element in a first position.
Figure 10B:
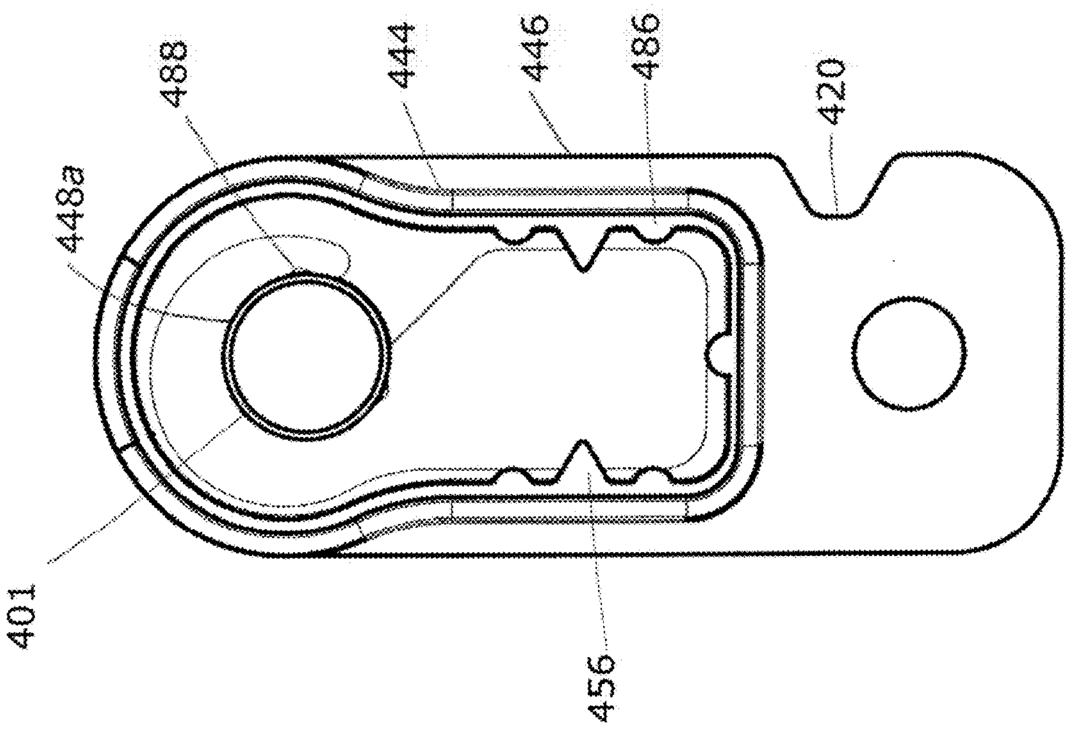
FIG. 10B is a cross section view of a hinge module from the set of FIG. 9, showing a torque element in a second position.
Figure 11A:
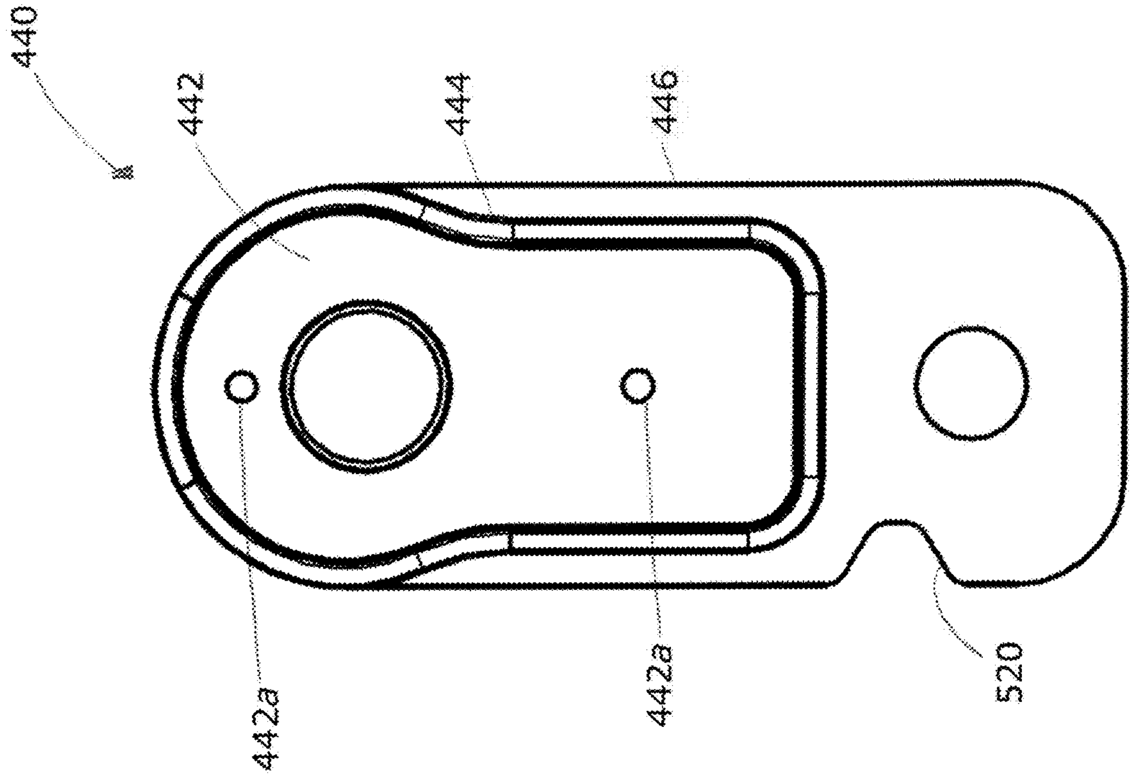
FIG. 11A is a front elevational view of a hinge module from the set of FIG. 9, showing a rear wall attached to a side wall in a first position.
Figure 11B:
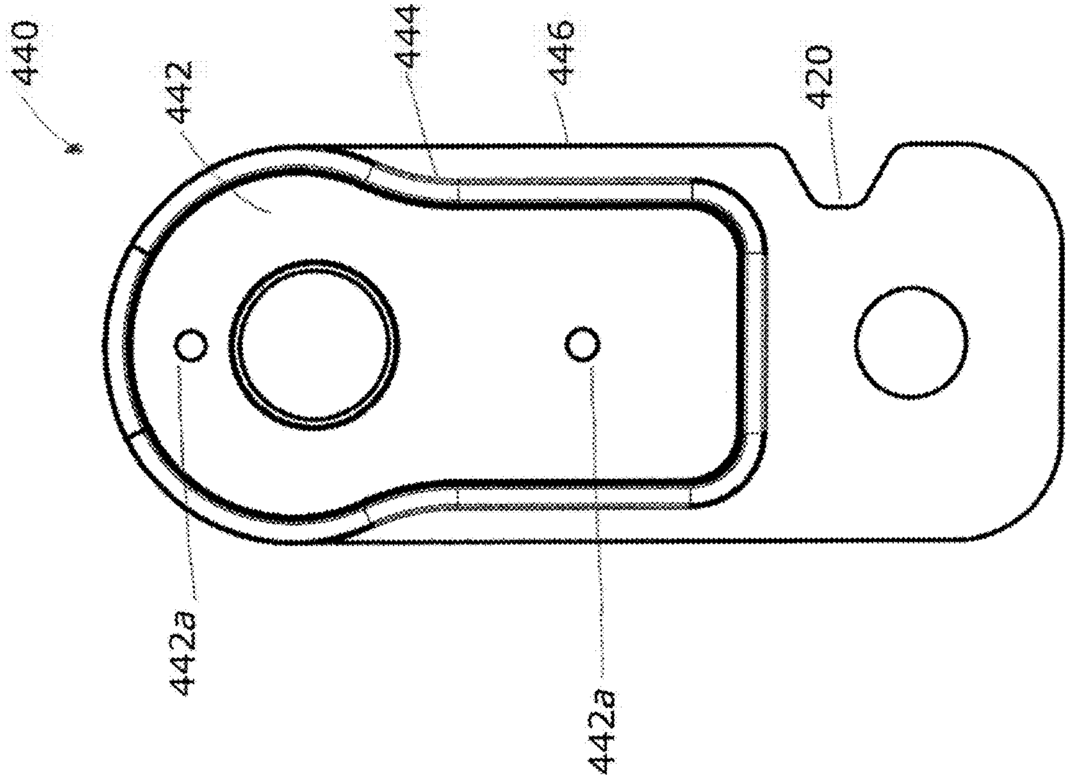
FIG. 11B is a front elevational view of a hinge module from the set of FIG. 9, showing a rear wall attached to a side wall in a second position.
Figure 12:
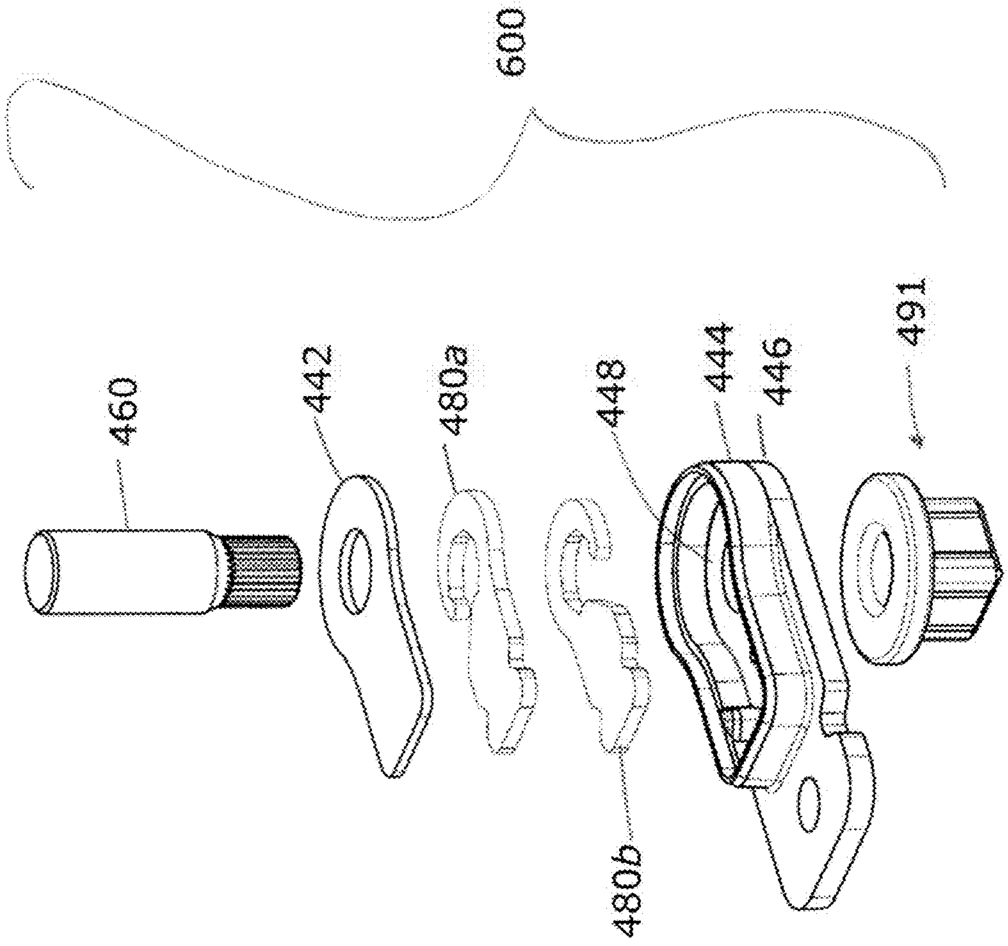
FIG. 12 is an exploded view of a preassembled hinge module in accordance with another exemplary embodiment of the invention, showing an adapter, a first torque element in a first position, and a second torque element in a second position.
Figure 13A:
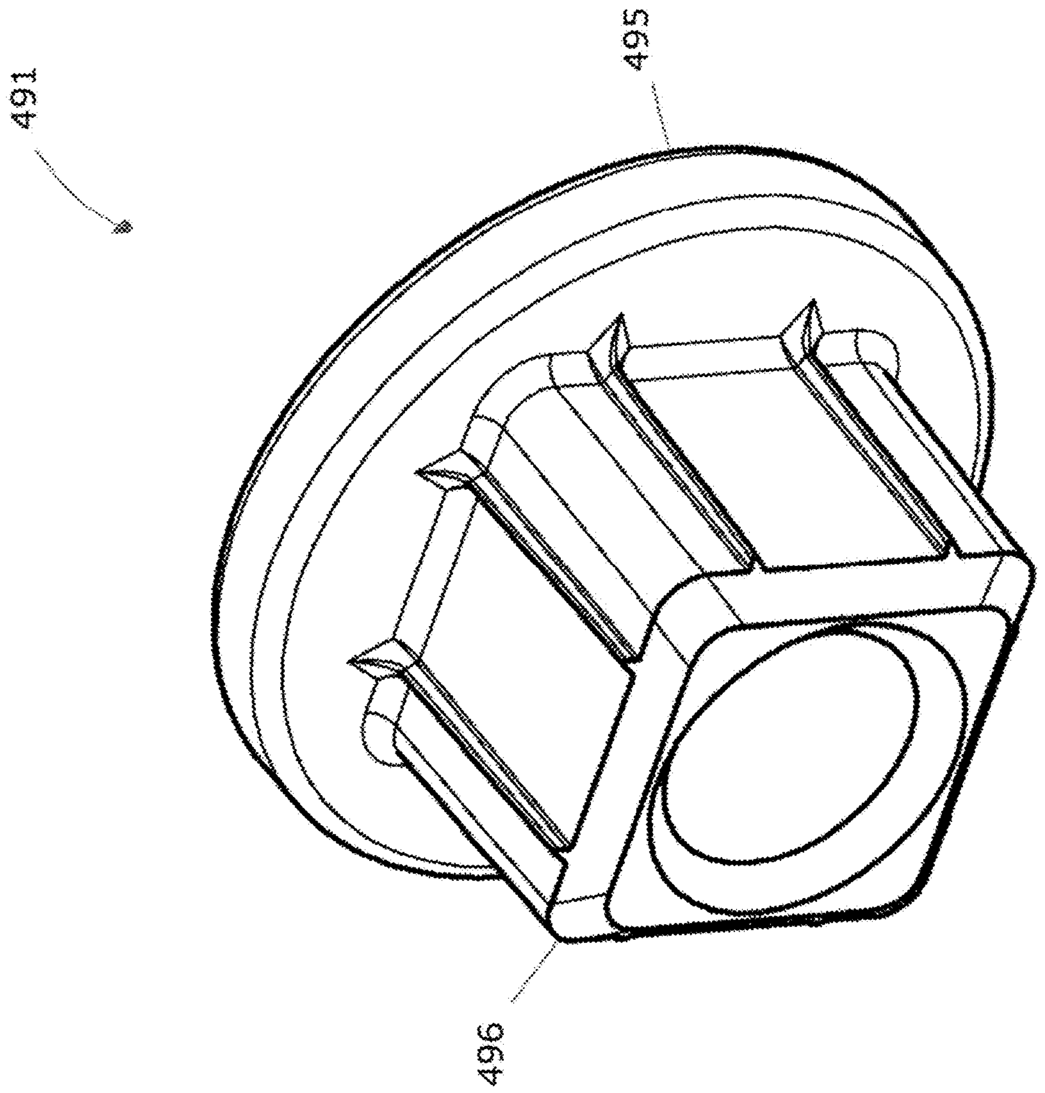
FIG. 13A is a perspective view of an adapter of the hinge module of FIG. 12.
Figure 13B:
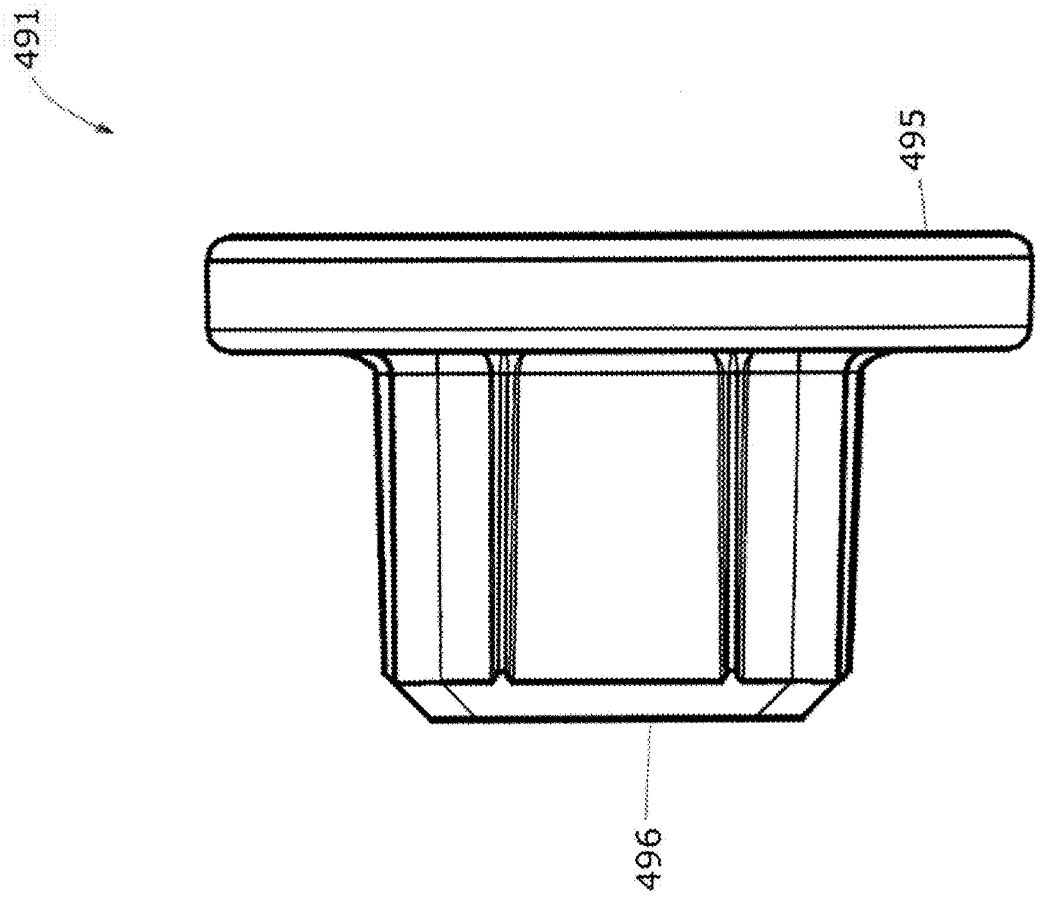
FIG. 13B is a side view of the adapter of the hinge module of FIG. 12.
Figure 13C:
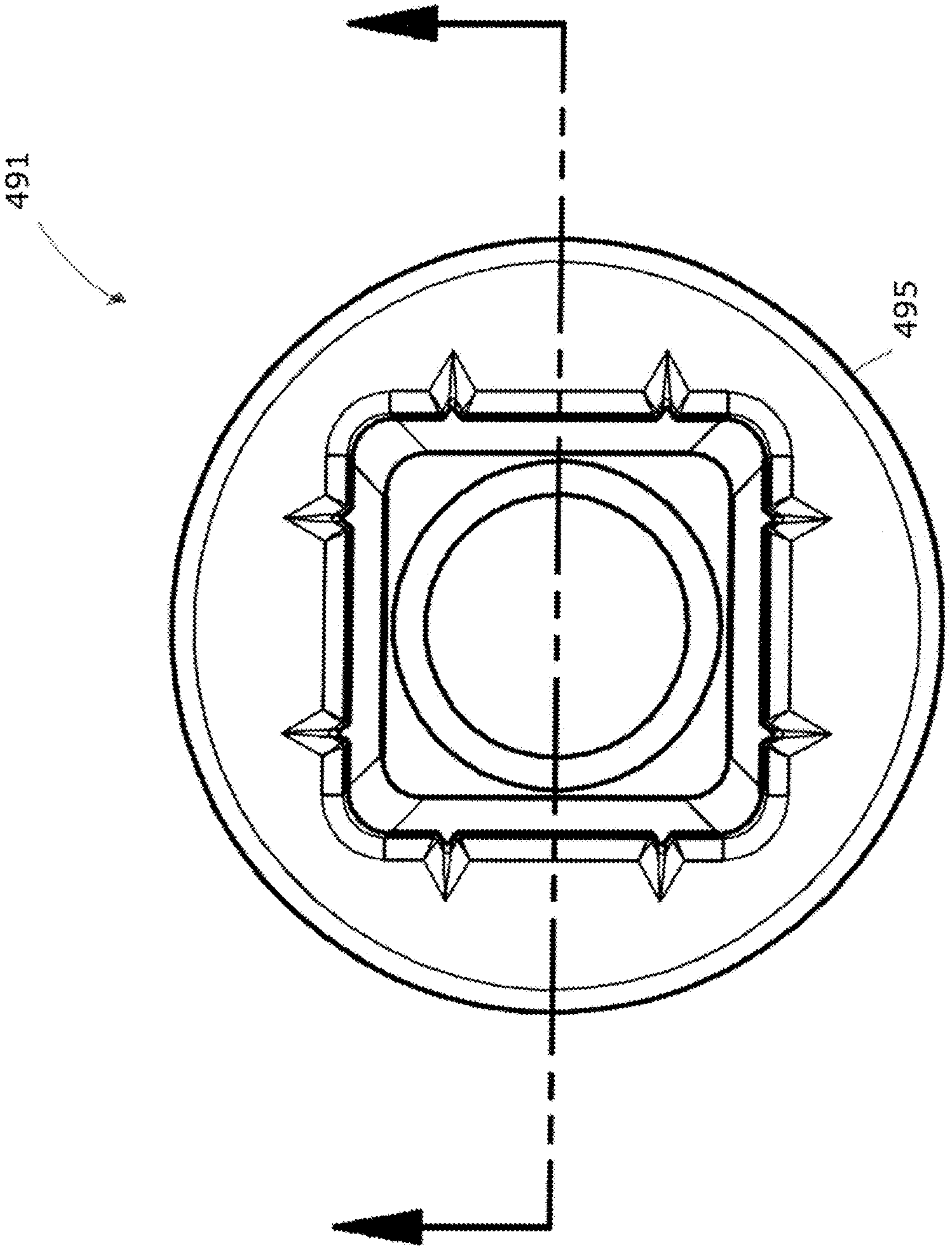
FIG. 13C is rear view of the adapter of the hinge module of FIG. 12.
Figure 13D:
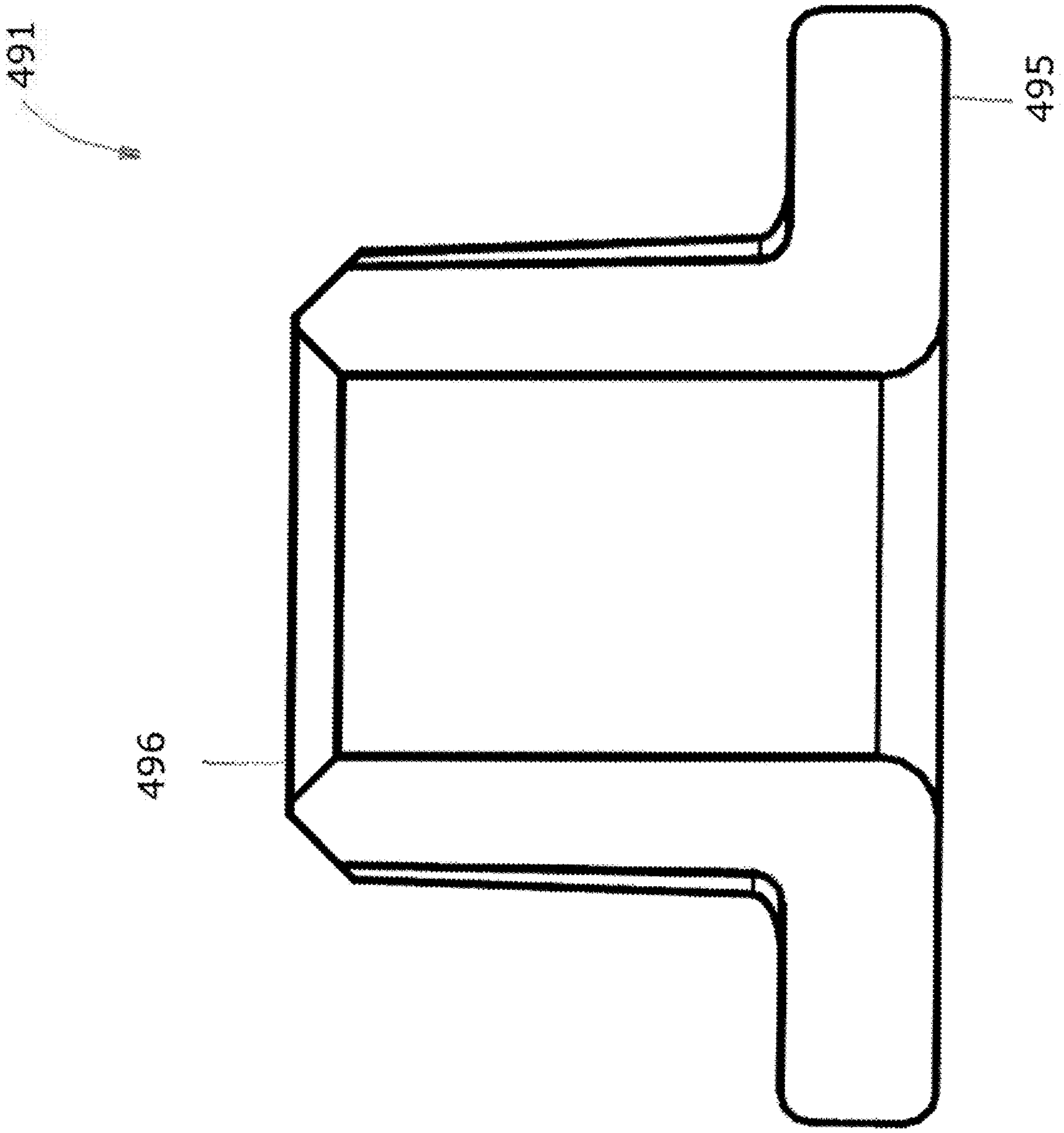
FIG. 13D is a top plan view of the adapter of the hinge module of FIG. 12.
Figure 17:
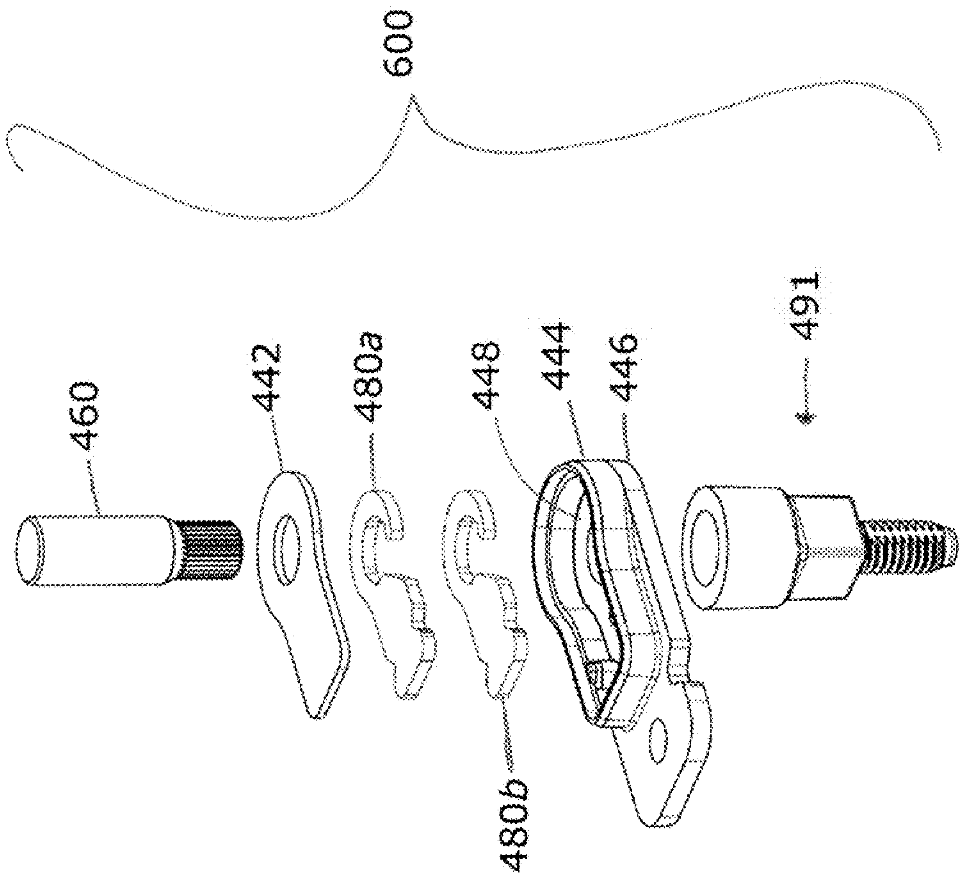
FIG. 17 is an exploded view of a preassembled hinge module in accordance with another exemplary embodiment of the invention, showing an adapter, a first torque element in a first position, and a second torque element in the first position.

The amount of frictional resistance provided by hinge module 500 can be increased by placing additional torque elements in interior space 448 to increase the total thickness of torque elements, and/or by replacing torque element 480 with a thicker torque element having a greater surface area in contact with shaft 460. Furthermore, in FIG. 2C, a torque element 480 is placed in a first position. It will be understood however, as seen in FIGS. 10A-10B, that torque element 480 can be placed within interior space 448 in a second position. Specifically, as shown in FIG. 12, torque element 480*a* can be placed in a first position and torque element 480*b* in a second position. In FIG. 17, torque element 480*a* can be placed in a first position and torque element 480*b* in a first position. Torque element 480*a* can be placed in a second position and torque element 480*b* can be placed in a second position, not pictured.

The positioning of the torque elements can be used to provide symmetrical torque (same frictional resistance in both directions of rotation) or asymmetrical torque (different frictional resistances in opposite directions of rotation).

Figure 4A:
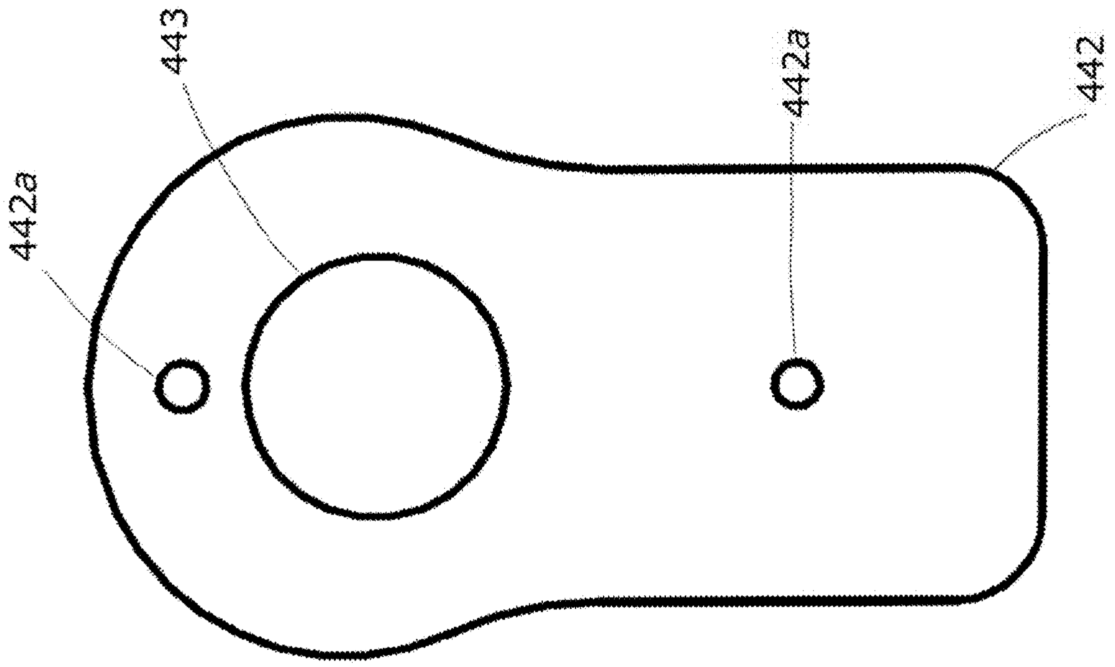
FIG. 4A is a front elevational view of a cover of the hinge module of FIG. 1A.
Figure 4B:
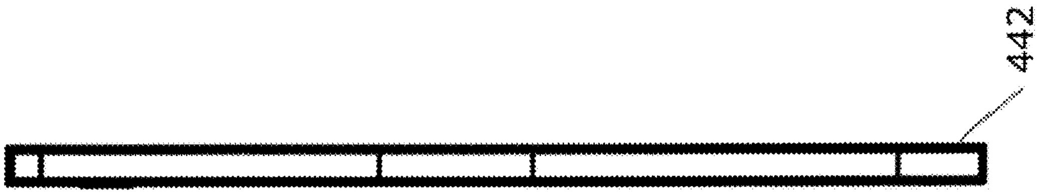
FIG. 4B is a side view of the cover of the hinge module of FIG. 1A.
Figure 4C:
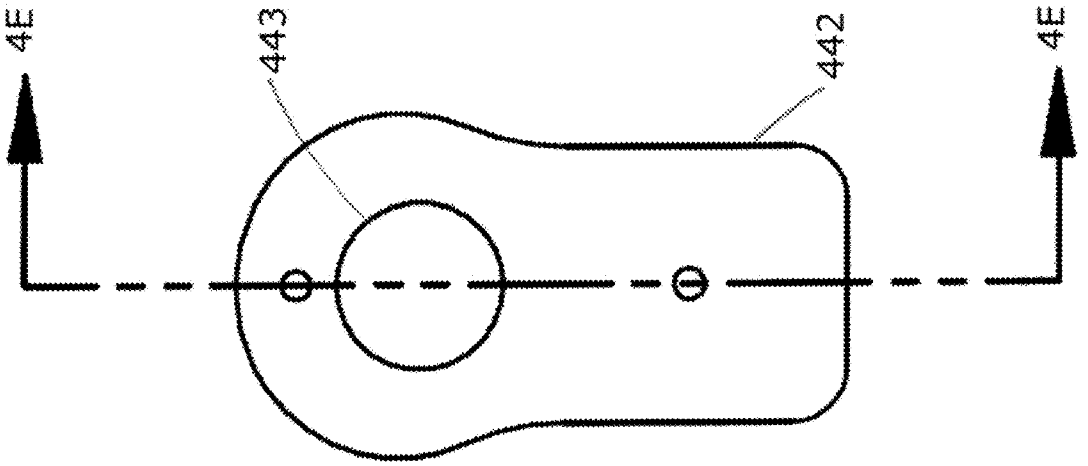
FIG. 4C is a front elevational view of the cover of the hinge module of FIG. 1A, showing line 4E-4E.
Figure 4D:
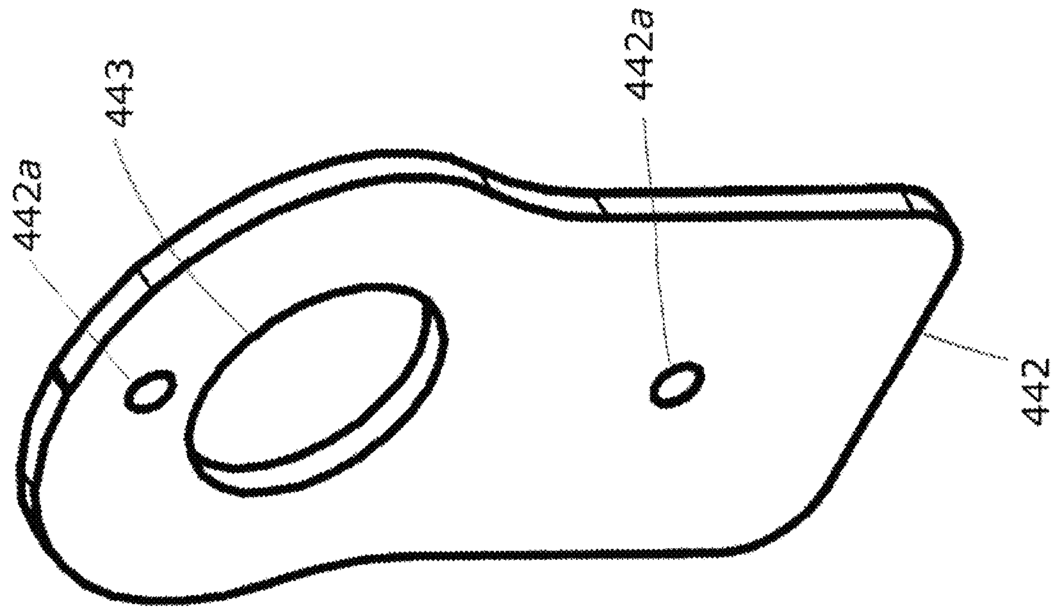
FIG. 4D is a perspective view of the cover of the hinge module of FIG. 1A.
Figure 4G:
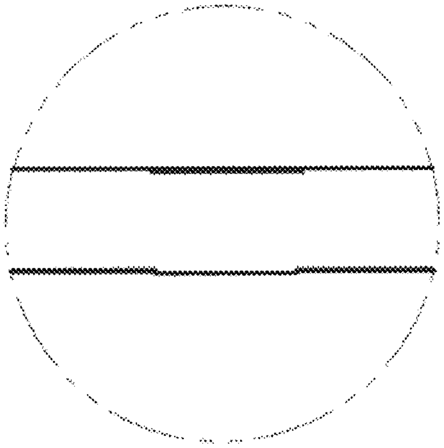
FIG. 4G is an enlarged view of a bottom portion (4G) of the cover of the hinge module of FIG. 1A.
Figure 4F:
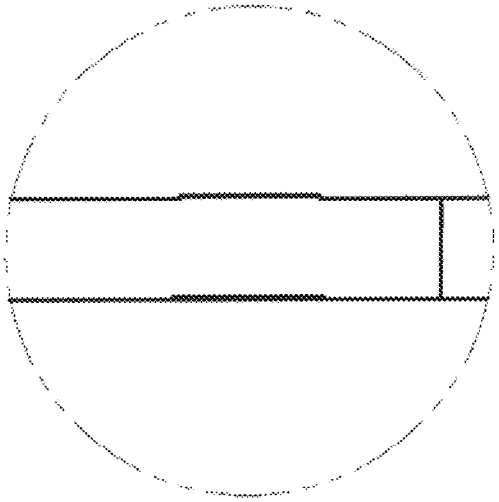
FIG. 4F is an enlarged view of a top portion (4F) of the cover of the hinge module of FIG. 1A.
Figure 4E:
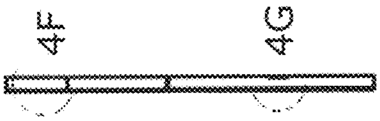
FIG. 4E is a cross section view of the cover of the hinge module of FIG. 1A taken through line 4E-4E in FIG. 4C.
Figure 14A:
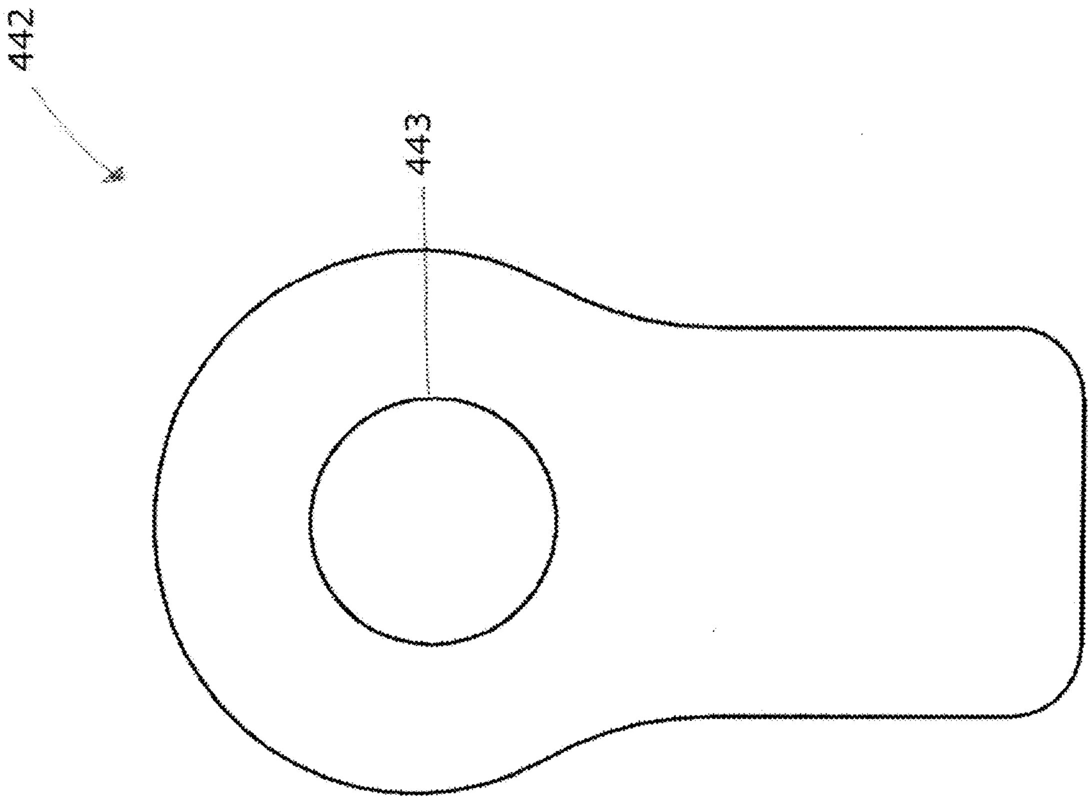
FIG. 14A is a front elevational view of a cover of the hinge module of FIG. 12.
Figure 14B:
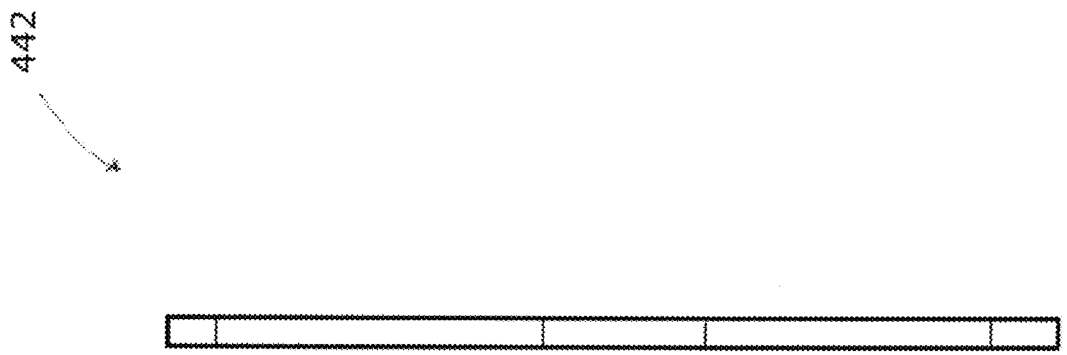
FIG. 14B is a side view of the cover of the hinge module of FIG. 12.
Figure 14C:
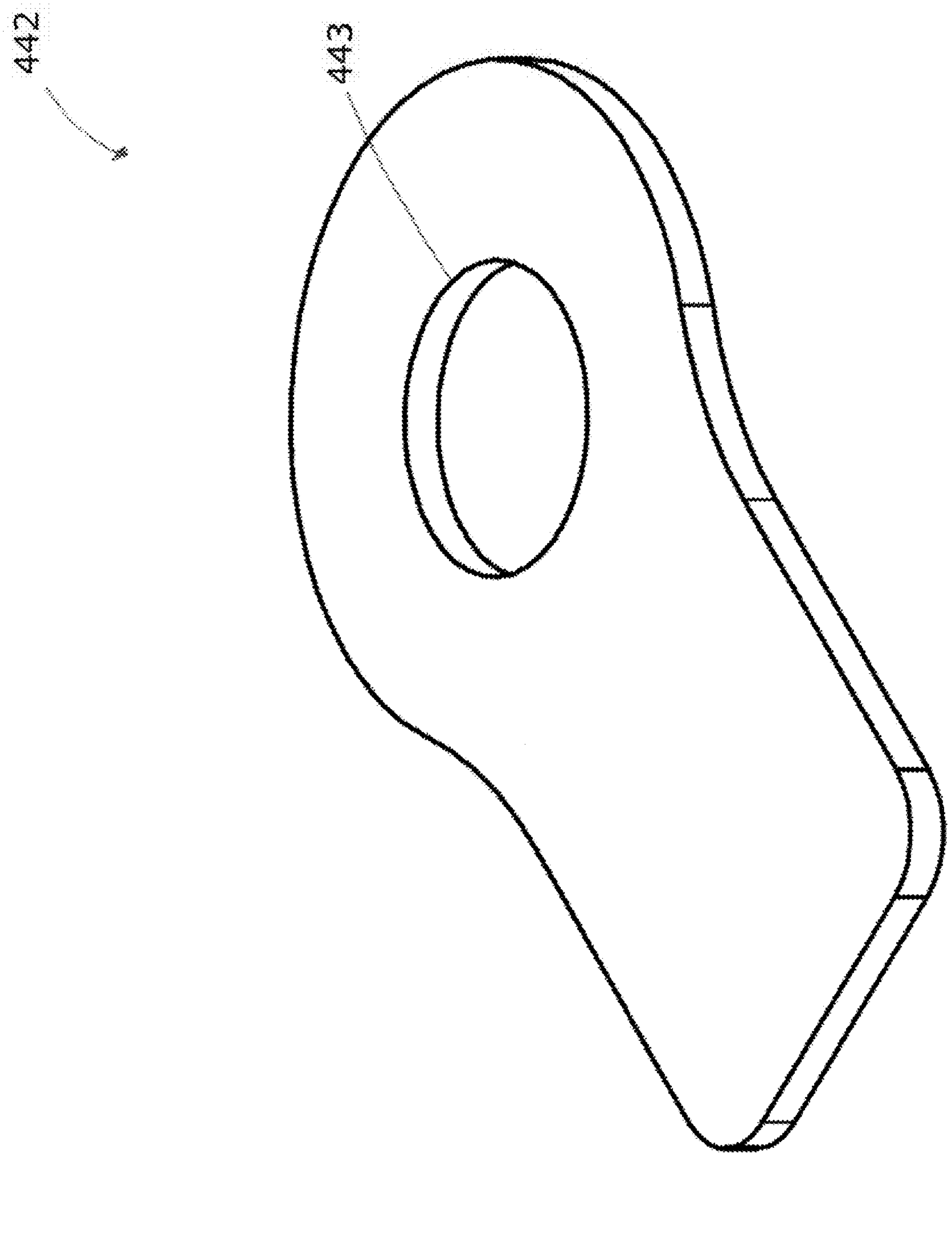
FIG. 14C is a perspective view of the cover of the hinge module of FIG. 12.
Figure 15A:
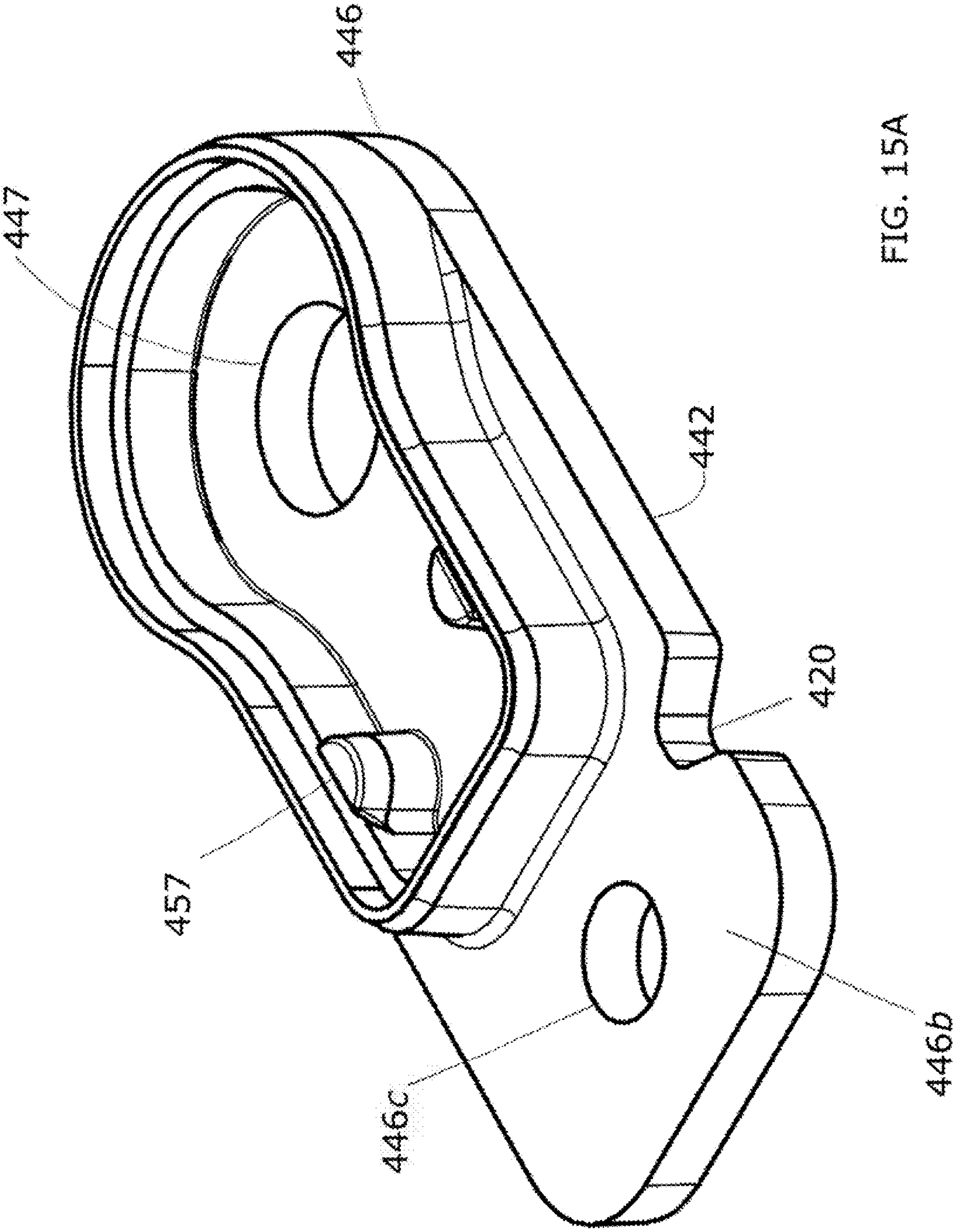
FIG. 15A is a perspective view of the housing of the hinge module of FIG. 12, showing a rear wall and a side wall.

FIGS. 4A, 4C, and 4D depict cover 442 comprising a first aperture 443 and two surface features such as indentations 442*a* that will allow components to be processed in a plating bath, prevent components from stacking, and prevent plating material from adhering to the surface. In another embodiment, as illustrated by FIGS. 14A—14C, cover 442 defines a first aperture 443. Further, FIG. 15A illustrates a rear wall 446 defining a second aperture 447. First aperture 443 and second aperture 447 are axially aligned with each other. As shown in FIGS. 1A-1C, shaft 460 extends through at least first aperture 443, interior space 448, and second aperture 447, such that the first aperture 443 and second aperture 447 are aligned with the shaft 460.

Referring briefly to FIG. 14C, it is noted that cover 442 does not include indentations 442*a* in this embodiment. Instead, the cover 442 depicted in FIG. 14C can be formed from a pre-plated material. Accordingly, in this embodiment, indentations 442*a* are not required.

Figure 5A:
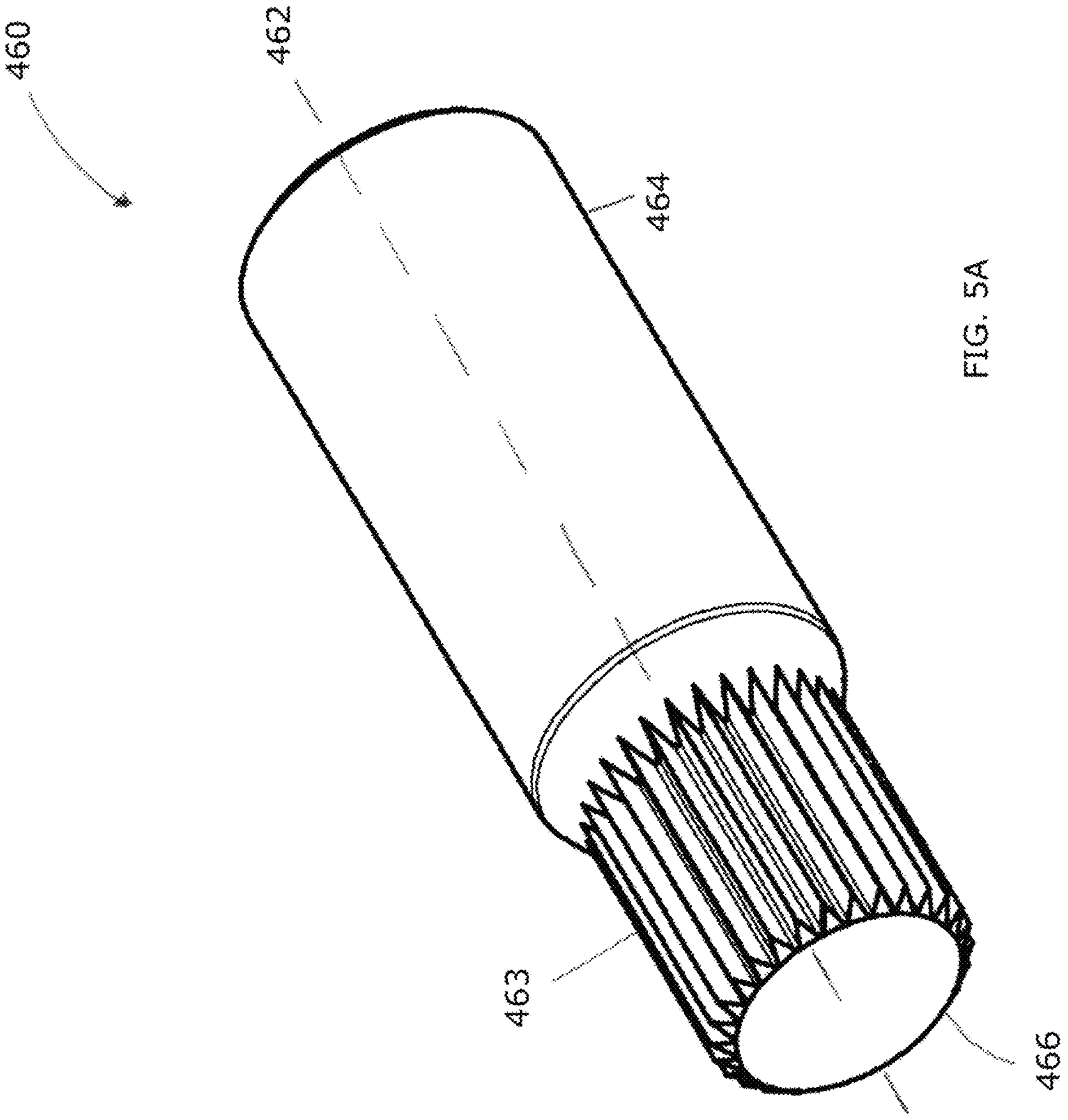
FIG. 5A is a perspective view of a shaft of the hinge module of FIG. 1A.
Figure 5B:
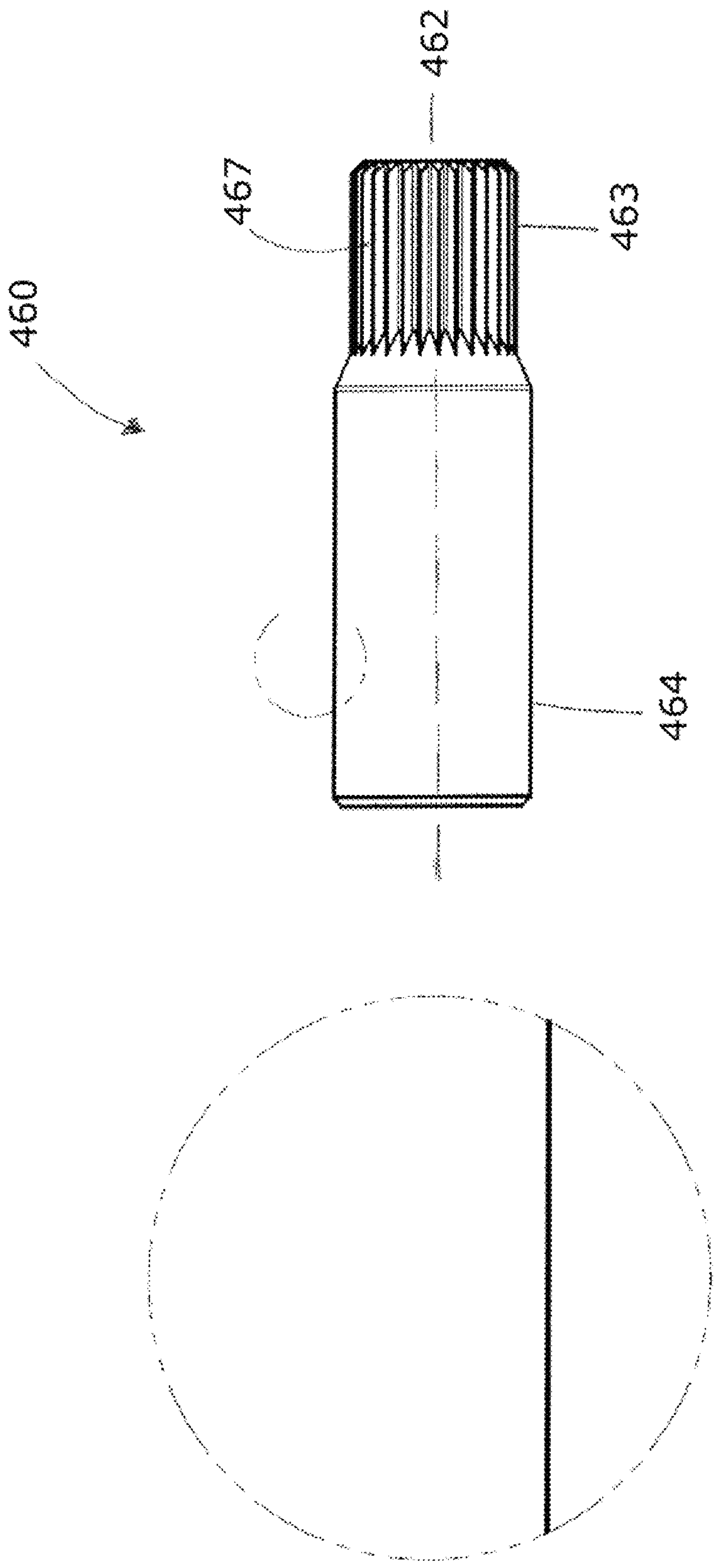
FIG. 5B is a side view of a shaft of the hinge module of FIG. 1A, also showing an enlarged view of a portion of the profile of the shaft.
Figure 5C:
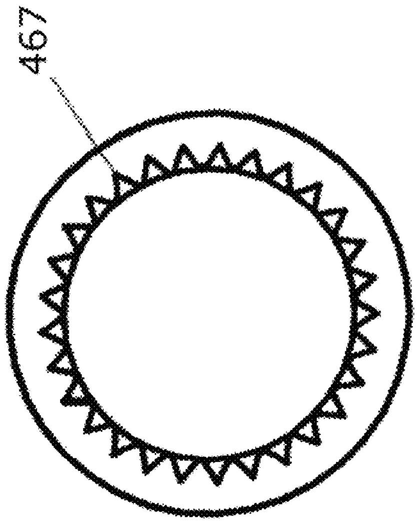
FIG. 5C is front view of the shaft of the hinge module of FIG. 1A.
Figure 6A:
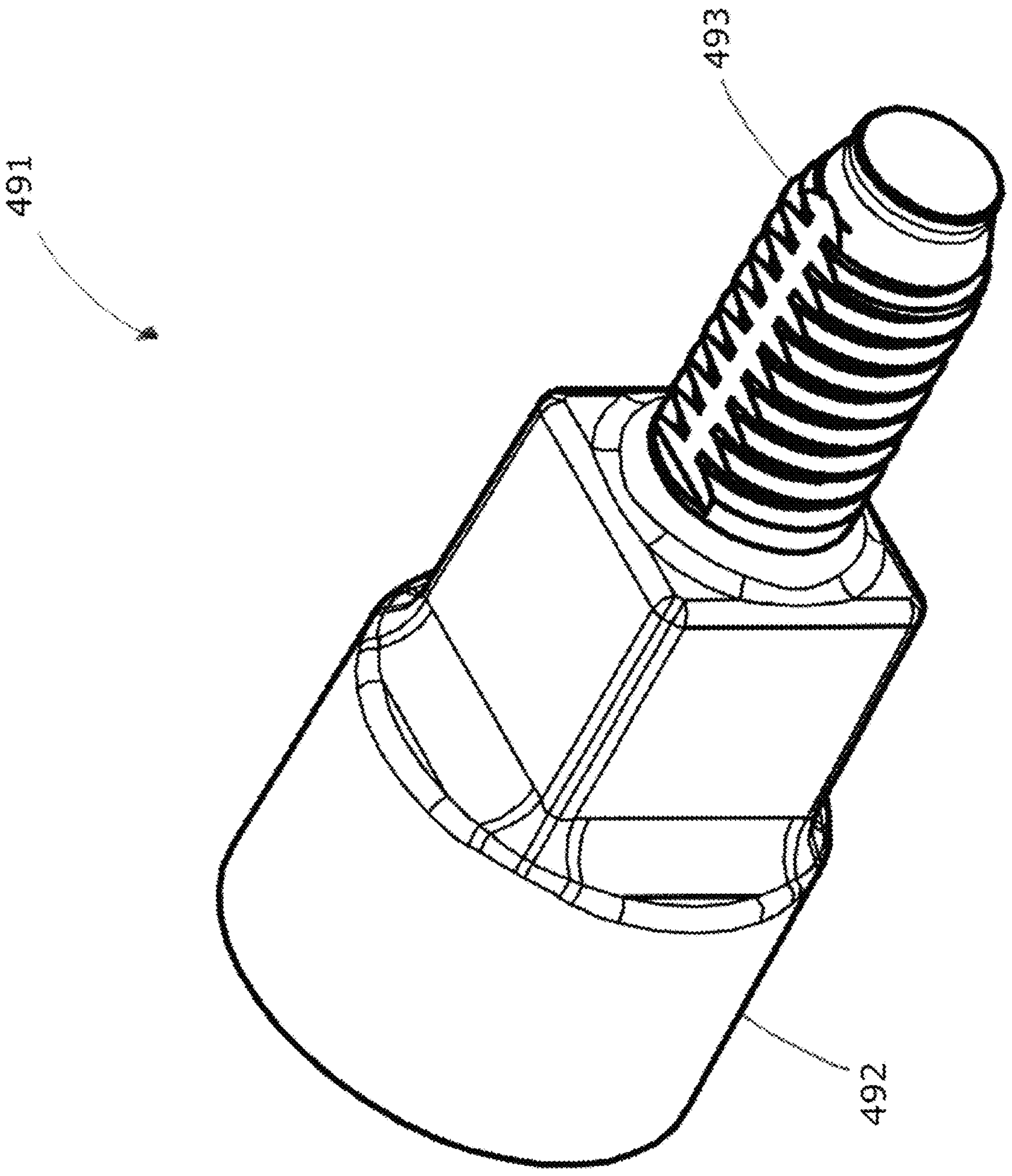
FIG. 6A is a perspective view an adapter of the hinge module of FIG. 2A.
Figure 6B:
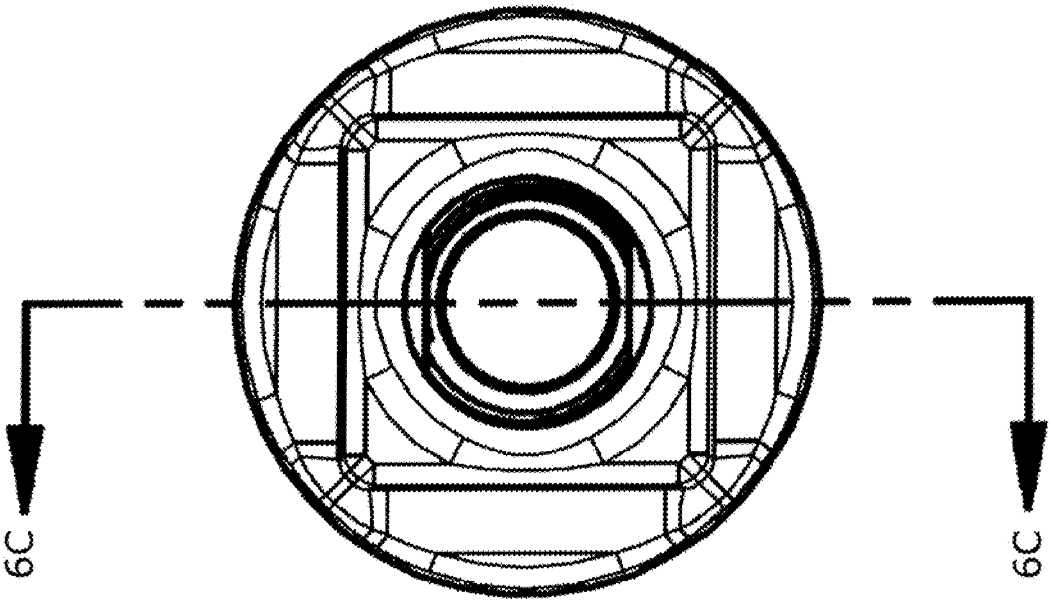
FIG. 6B is a front view of the adapter of the hinge module of FIG. 2A.
Figure 6C:
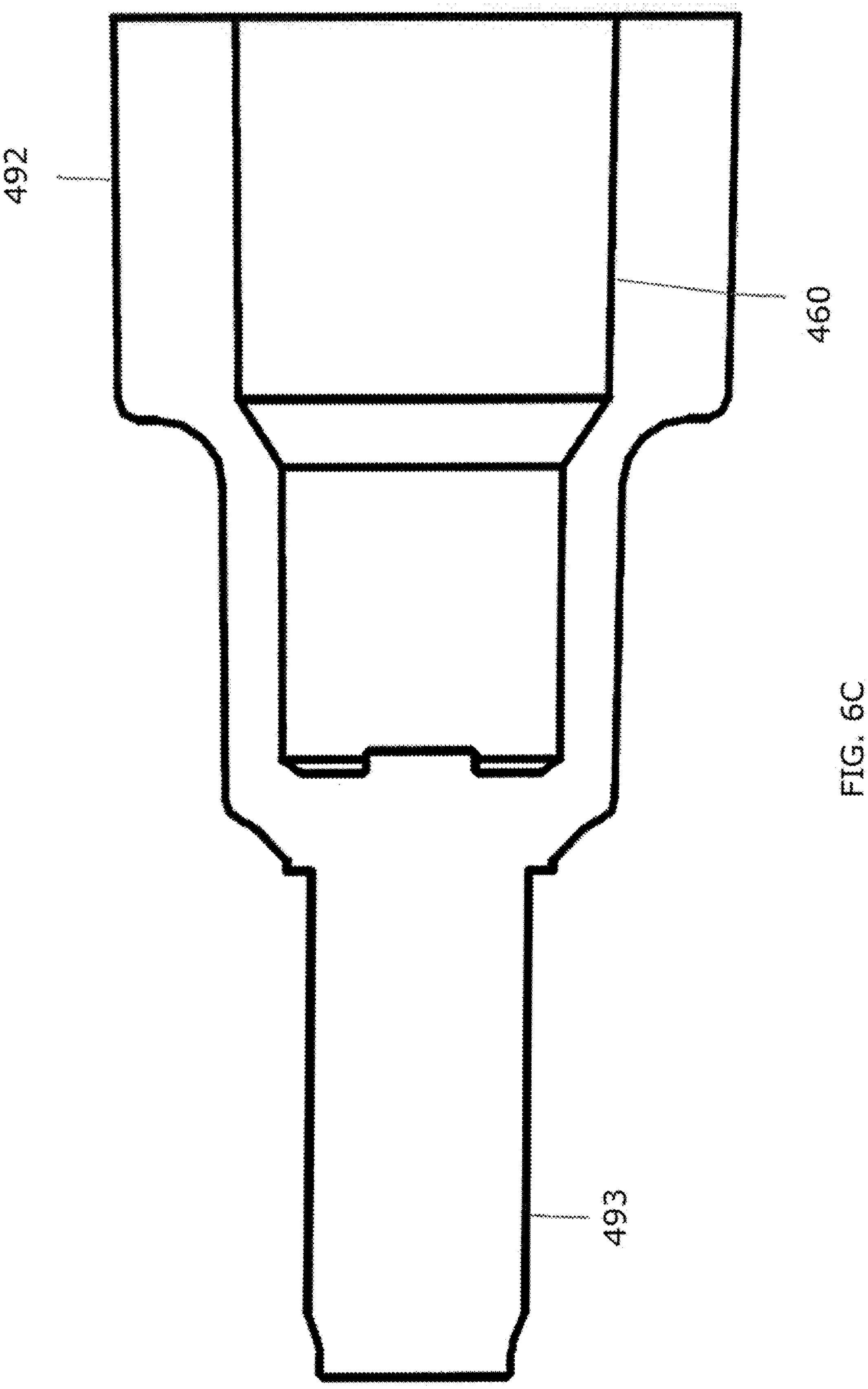
FIG. 6C is a cross section view of the adapter of the hinge module of FIG. 2A taken through line 6C-6C.
Figure 6D:
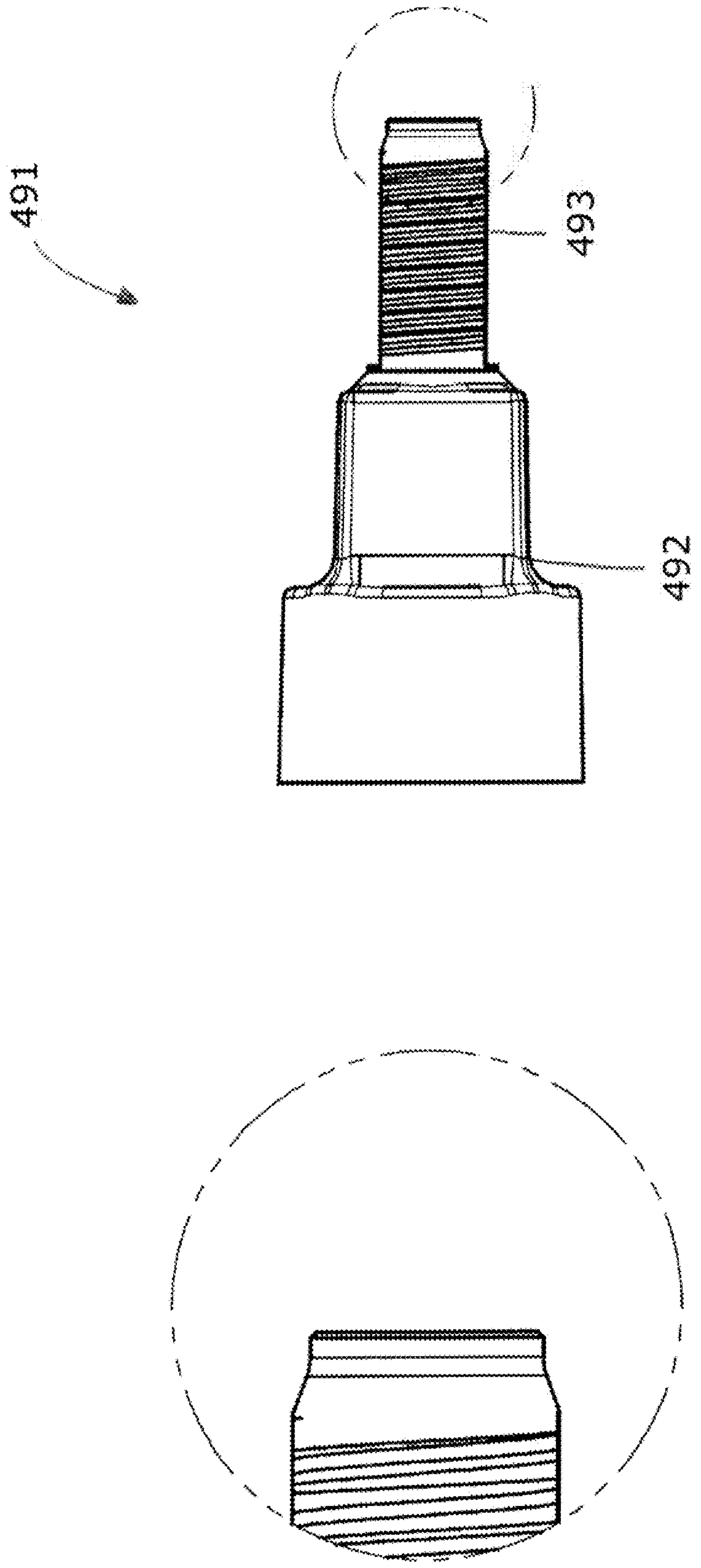
FIG. 6D depicts an enlarged view of an end of the adapter of the hinge module of FIG. 2A.

Referring to FIG. 5A-5C, shaft 460 has a proximal end 464 and a distal end 466 opposite the proximal end. Distal end 466 includes a head 463 having a reduced diameter relative to other sections of shaft 460. Distal end 466 defines a coupling surface 467 such as a spline or knurled surface, which can cooperate with a coupling element to connect the hinge module to a first component.

Referring now to FIG. 8, in accordance with another embodiment of the invention, preassembled hinge module 500 includes a shaft 460, a cover 442, a torque element 480, a housing 440, and a coupling element in the form of an adapter 491 having a proximal end 492 configured for fixed coupling to shaft 460 and an opposite end 493 configured for releasable coupling to a first component.

In one embodiment, as illustrated in FIGS. 6A-6D, the adapter 491 defines a counterbore opening to receive a portion of an end of shaft 460. In another embodiment, as shown in FIGS. 12, 13A-13D, the adapter 494 defines an opening 495 configured to receive a portion of an end of shaft 460 and an opposite end 496 configured for releasable coupling to a first component. It will be understood that other types of couplings can be attached to the distal ends of shaft 460 in accordance with the invention.

By providing an adapter such as adapter 491, it is possible to adapt the preassembled hinge module for use in a system configured for disassembly. For example, shaft 460 may be designed for permanent or semi-permanent fixation to the console of an automobile. Such fixation may be desirable to prevent or resist unintended disassembly or tampering or inadvertent loosening of the hinge module. If it is desired to adapt the preassembled hinge module for use in a system configured for disassembly, an adapter such as adapter 491 can be provided to convert the hinge assembly to a more easily removable assembly. This may be advantageous for facilitating repair and replacement of the hinge assembly, retrofitting of the hinge assembly, or removal for cleaning or access to interior components.

As illustrated in FIG. 15A, rear wall 446 provides a universal mounting surface 449 that can be mounted to a center console receptacle, cover, or other component. Further, rear wall 446 extends beyond housing 440 to form an extension 446*b*. Extension 446*b* defines an aperture 446*c* for receiving a mounting fastener, such as a screw 205 shown in FIG. 7, to mount housing 440 to a console receptacle or cover.

Referring to FIGS. 15A-15D, side wall 444 and rear wall 446 of housing 440 are integrally formed as a single body of unitary construction that is separate from cover 442. Rear wall 446 in the form of a flat mounting plate 470 mates with side wall 444 in a fluid tight connection. This construction allows the formation of a one-piece housing body that can be formed by molding, casting, stamping, machining, or other known processes. Alternatively, however, the side wall 444 and rear wall 446 of housing 440 can be formed separately and later joined to one another, such as by welding, adhesive, thermal bonding, or mechanical fastening.

Figure 15B:
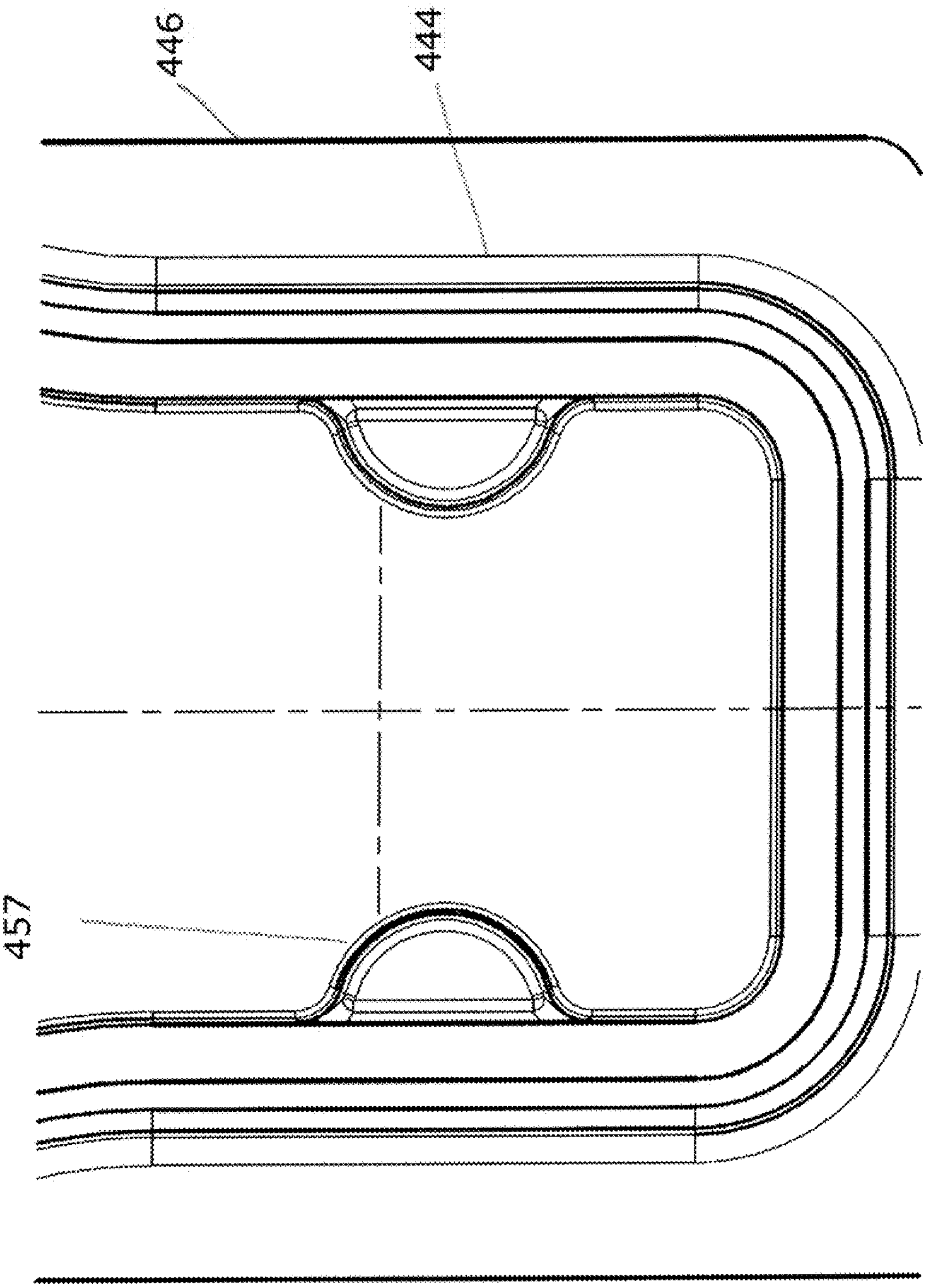
FIG. 15B is a magnified view of an interior space of the housing of the hinge module of FIG. 15A.
Figure 15C:
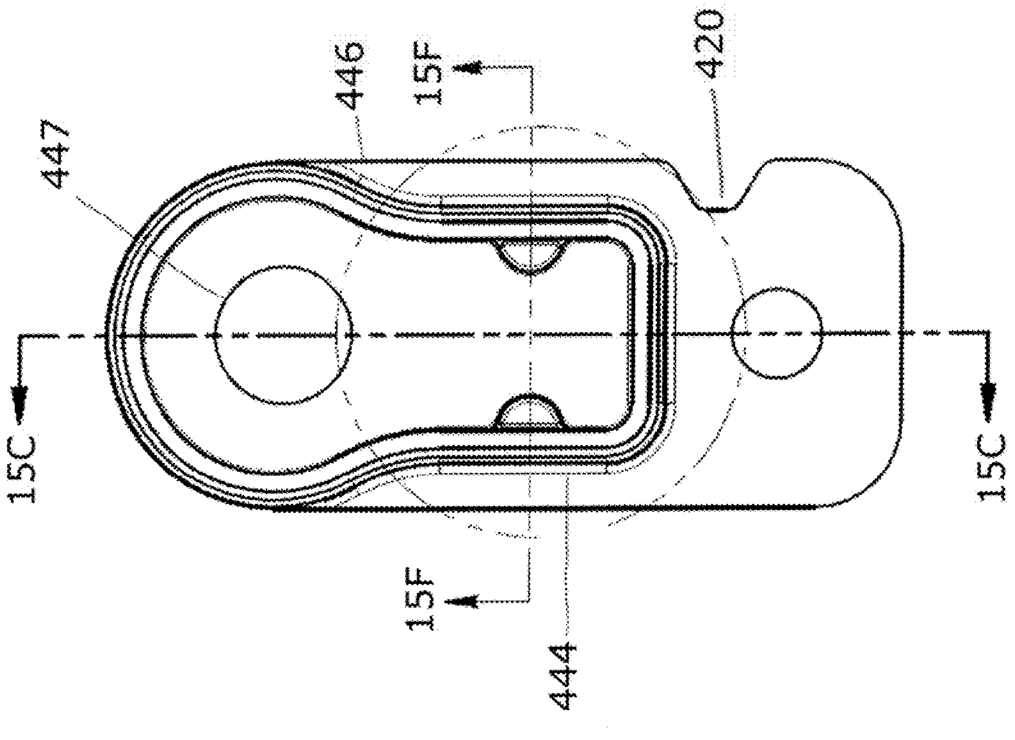
FIG. 15C is a front elevational view of the interior space of the housing of the hinge module of FIG. 15A.
Figure 15D:
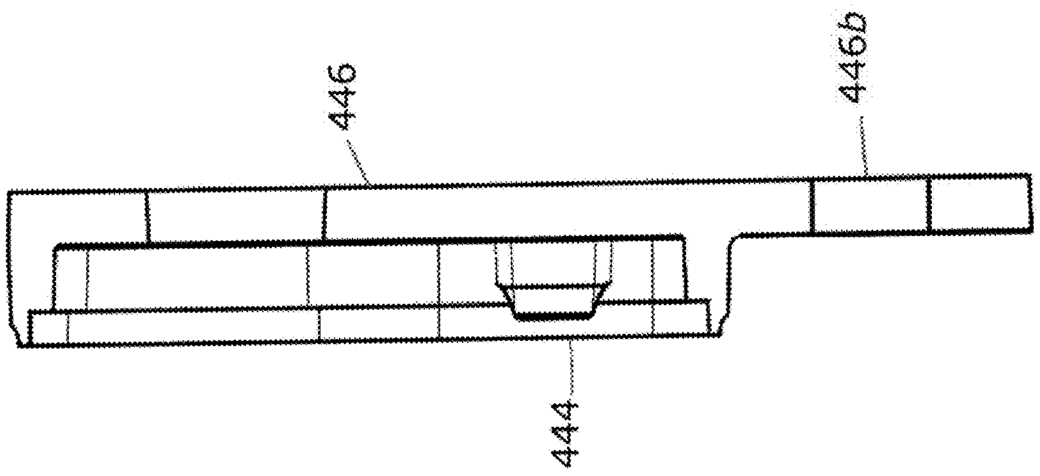
FIG. 15D is a cross section view of the interior space of the housing of the hinge module of FIG. 15A taken through line 15C-15C, showing the inner surface of the side wall.
Figure 15E:
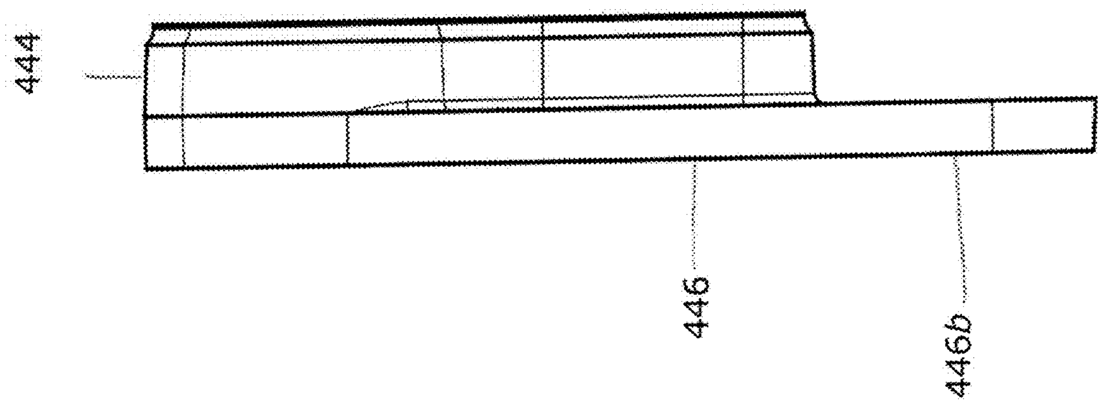
FIG. 15E is a side view of the housing of the hinge module of FIG. 15A.

As shown in FIG. 2C, interior space 448 of housing 440 receives torque element 480 in a form-locking fit. Specifically, an inner surface 454 extending along the interior of sidewall 444 includes an engagement surface in the form of detents such as sharp ridges 456. External pressure applied along the perimeter of the side wall allows ridges 456 to engage recess 482 of torque element 480, holding the torque element in the form-locking fit. In another embodiment, as shown in FIGS. 15A-15C, inner surface 454 includes an engagement surface in the form of detents having rounded edges 457.

In FIG. 2C, interior space 448 of housing 440 forms a chamber or reservoir 448*a* adapted to store a quantity of lubricant, such as grease 490. Grease 490 is applied along edge 488 (FIG. 3A) where the edge 488 engages shaft 460 in frictional engagement. The side wall 444, cover 442, and rear wall 446 in the form of amounting plate 470 form a sealed chamber or reservoir that prevents lubricant applied to torque element 480 from leaking out of housing 440, and that prevents dirt and other solid and/or liquid contaminants from entering into the housing.

Preassembled hinge module 400 can be used in the following manner to pivotally couple a first component to a second component. Hinge module 400 arrives to the installer in a pre-assembled state, with an appropriate number of torque 480 elements in housing 440. Therefore, hinge module 400 arrives ready for installation.

Distal end 466 of shaft 460 is inserted through pivot holes in the first and second components. Housing 440 is attached to the first component by advancing screw 205 or other fastener through aperture 446*c* in extension 446*b* of rear wall 446. In addition, the outer edge 478 of mounting plate 470 can be attached between ribs on the first component, as shown in FIG. 1. The notch 420 in mounting plate 470 mates with a projection of similar shape on the first component, to confirm that hinge module 400 is being installed on the correct side of the pivot axis. Distal end 466 of shaft 460 protrudes through the first component and second component such that annular recess 467 is exposed.

An e-ring or other coupling element, provided separately, is attached around annular recess 467 to secure shaft 460 to the second component and prevent the shaft from being withdrawn or pulled out of the first and second components, thereby coupling the first and second components together in a pivot connection. This same procedure is followed to install hinge module 500 on the opposite side of the first and second components.

Figure 18:
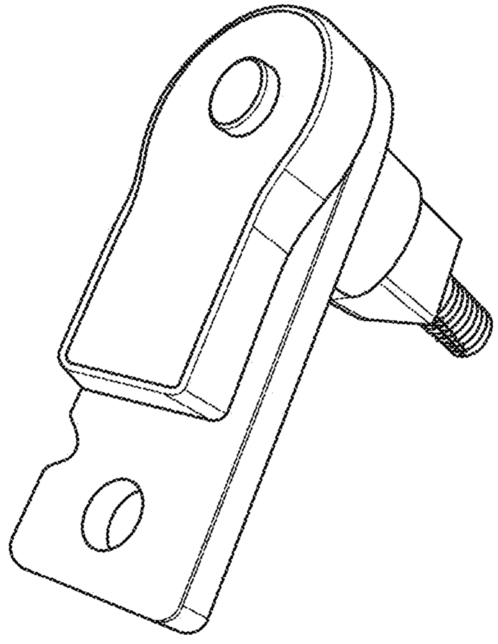
FIG. 18 is a perspective view of a preassembled hinge module in accordance with an exemplary embodiment of the inventions, showing the cover plate mated with a portion of the side wall in a fluid tight crimped connection.

Finally, a method for manufacturing a pre-assembled hinge module in accordance with one embodiment, and with reference to the components of hinge module 500 comprises the step of placing a torque element 480 inside interior space 448 of housing 440. Then, as shown in FIG. 10B, aperture 484 of torque element 480 aligns with aperture 447 of mounting plate 470, creating a passage 401. Next, shaft 460 is inserted through passage 401, such that the shaft 460 extends through the interior space 448 of housing 440 in frictional engagement with the torque element 480. Shaft 460 is tightly held in frictional engagement by torque element 480 so as to resist being pulled out of housing 440. Then, cover 442 is placed adjacent to torque element 480 in a form locking fit, such that an end of shaft 460 is exposed through aperture 443 of the cover 442. Referring now to FIG. 18, the side wall 444 is squeezed along the perimeter to secure the cover 442 relative to the housing 440, such that the side wall 444 mates with the cover 442 in a solid or fluid tight connection. Thus, cover 442, side wall 444, and mounting plate 470 form housing 440, which encloses torque element 480 and grease 490 within the housing 440. Hinge module 500 is now pre-assembled and ready for installation to pivotally connect two components.

Figure 15F:
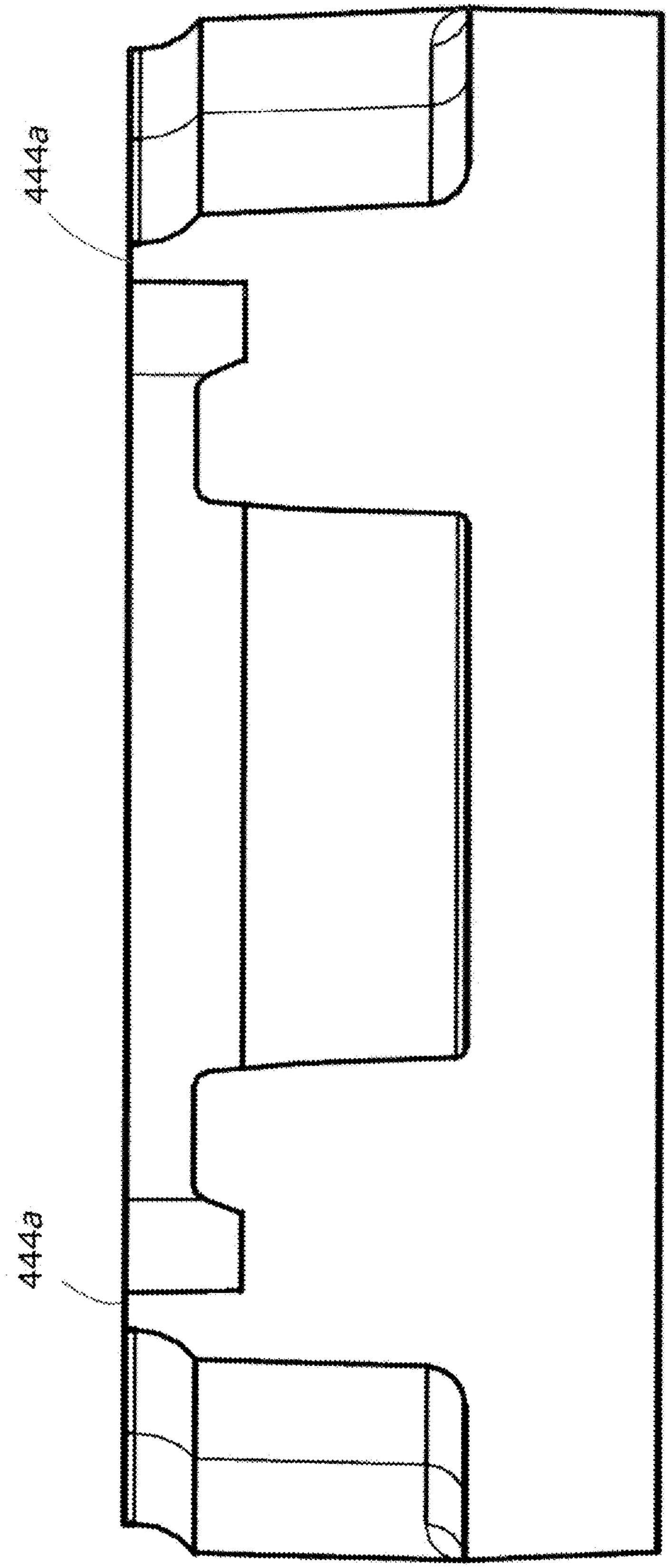
FIG. 15F is a cross-sectional bottom view of the housing of the hinge module of FIG. 15A taken through line 15F-15F in FIG. 15C.
Figure 16A:
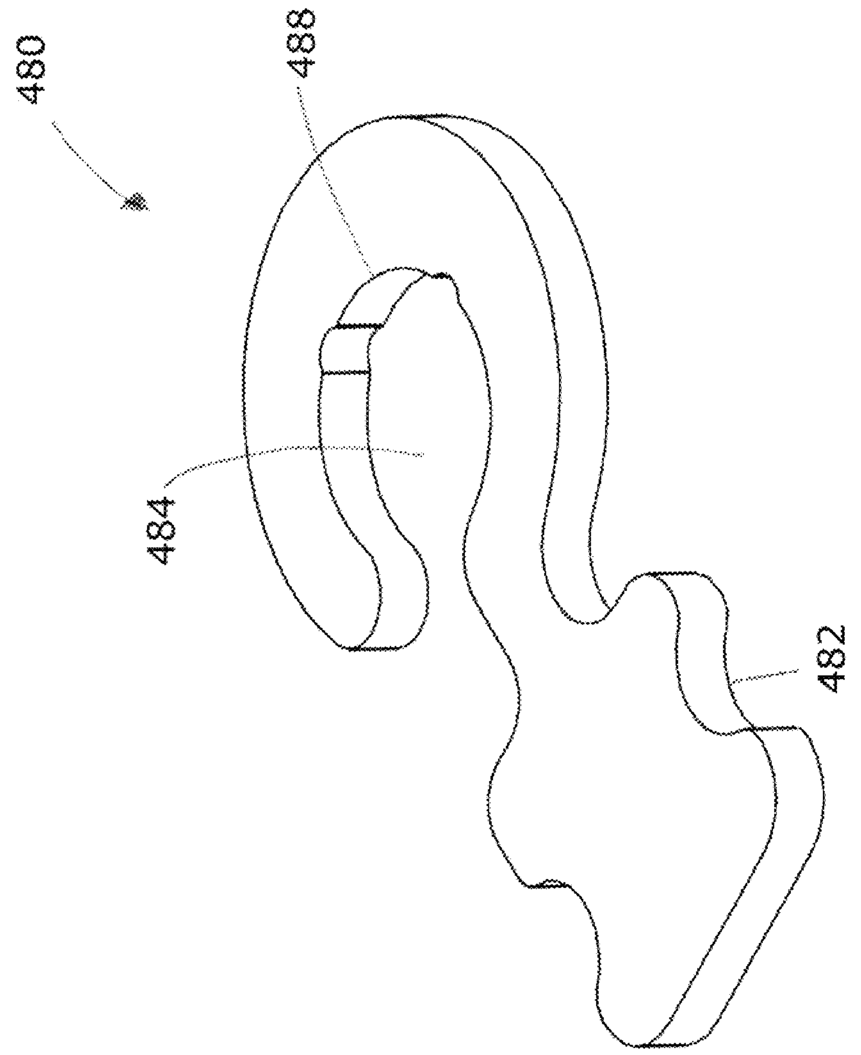
FIG. 16A is a perspective view of a torque element in accordance with another exemplary embodiment of the invention.
Figure 16B:
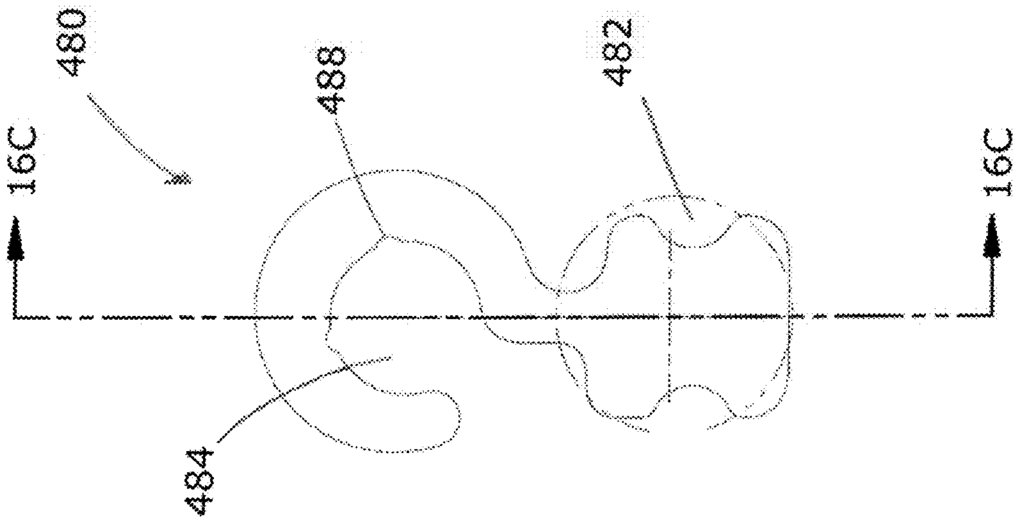
FIG. 16B is a front elevational view of the torque element of FIG. 16A.
Figure 16C:
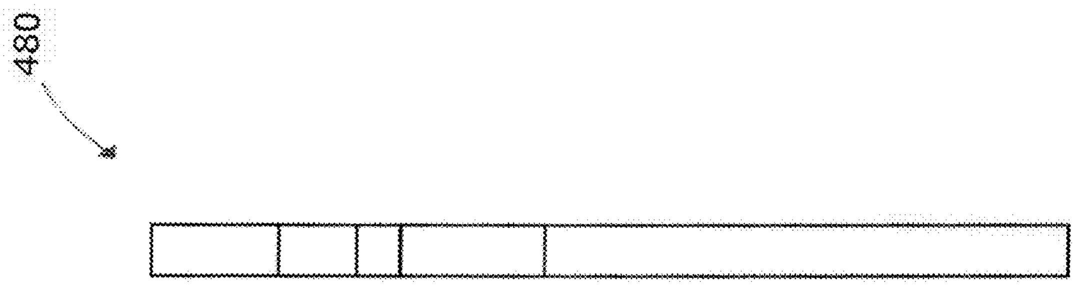
FIG. 16C is a cross section view of the torque element of FIG. 16A taken through line 16C-16C.
Figure 16D:
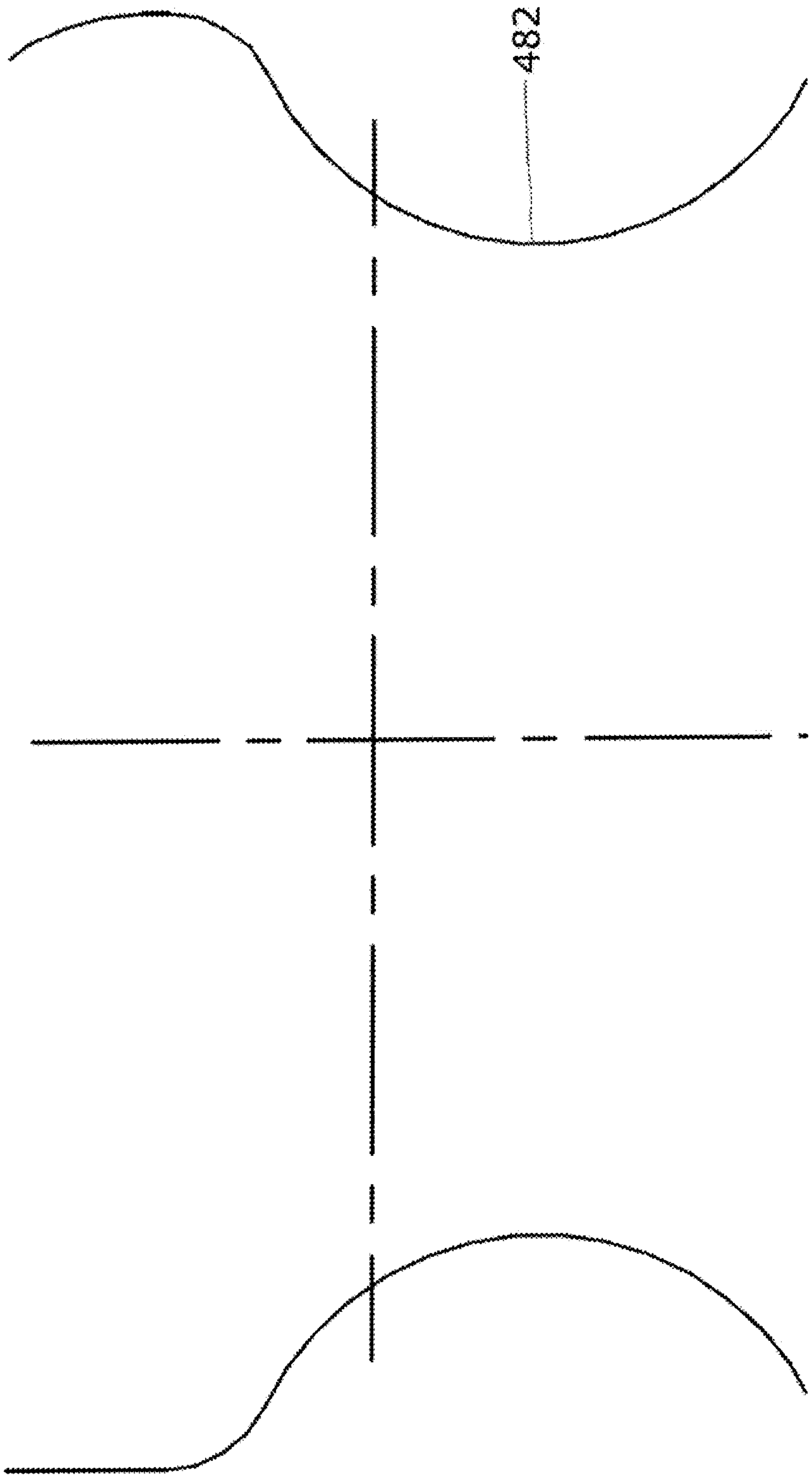
FIG. 16D is an enlarged view of a portion of the torque element of FIG. 16A.

As is illustrated in the cross-sectional view of FIG. 15F, the inner surfaces of the sidewall of the housing provides a pair of opposed detents. On the detents, a portion of the sidewall rises upwardly, thereby forming outer downwardly-facing or downwardly-extending grooves. The upwardly extending portions of the detents provide a surface against which the cover rests when it is placed over the details within the side wall. More particularly, the torque elements will extend downwardly toward the base and the rear wall of the housing because of the recesses formed in the torque elements at the location of the detents. However, the cover does not have recesses and will therefore rest on top of the detents, and more specifically on top of the portion of the detents that rise upwardly.

As will be understood by FIG. 15F, the material of the detents rising upwardly can be deformed downwardly and towards the center of the interior space of the housing as the cover is pressed downwardly against the detents. Accordingly, the material of the detents will be deformed and cold flow inwardly and into the recesses of the torque elements, thereby holding them securely in position within the housing.

In order to facilitate efficient, rapid, and/or low-cost assembly, the hinge module can be assembled in a top-down manner, with all or almost all of the assembly movements occurring from top to bottom or along any other single direction, as opposed to requiring assembly steps with sideward movement and up-down movement. Such top-to-bottom or top-down assembly makes it possible to use simple fixtures and manufacturing techniques, while also reducing the possible misalignment that may be associated with a combination of downward and sideward or angled assembly motions.

For example, referring to FIG. 12, the base component of the housing can be placed flat on a support surface. Then, one or more torque elements can be inserted top-to-bottom in a downward direction into the interior space or region of the base of the housing. A lubricant, such as grease 490, can be applied into recess 482 of torque element 480. Then, the shaft can be inserted through the housing, also along a top-to-bottom axis of assembly. Finally, the cover can be placed on top of the torque element or elements, also using a downward motion from top-to-bottom. In this way, all or almost all of the components of the hinge module can be brought together in a top down arrangement.

Additionally, the final or near final step of capturing or otherwise engaging the cover in or against the base of the housing can also be accomplished in a top-to-bottom or downward motion. For example, a crimping of the wall of the base of the housing can be performed by moving a tool in a downward direction to engage the outward and upward edges of the walls of the base of the housing, thereby forcing those upper wall portions downwardly and slightly inwardly in order to surround and engage or capture the cover. Such a downward crimping or deformation motion once again facilitates a simple tool and simple motion that reduces the risk of misalignment of the tool as well as misalignment of the components of the hinge module. The crimping action can be provided by a stamp or tool or any other mechanism capable of deforming the upper wall of the base portion of the housing.

As one example, FIG. 18 shows an example of a hinge module in which the cover is engaged within the base portion of the housing. Specifically, the cover has been positioned within an interior region of the base of the housing, such that an exterior or perimeter surface of the cover is immediately within the interior surface of the wall of the base of the housing. As a final step, as is illustrated in FIG. 18, the upper portion of the walls of the base of the housing are crimped and curved slightly inwardly and over the perimeter edge portion of the cover, thereby securing the cover in place and providing a partial or full seal against the ingress of solid and/or liquid contaminants. Also, the secured cover prevents or limits the escape of grease or lubricant from the interior space of the housing. A lubricant, such as grease 490, is applied into recess 482 of torque element 480.

Figure 19:
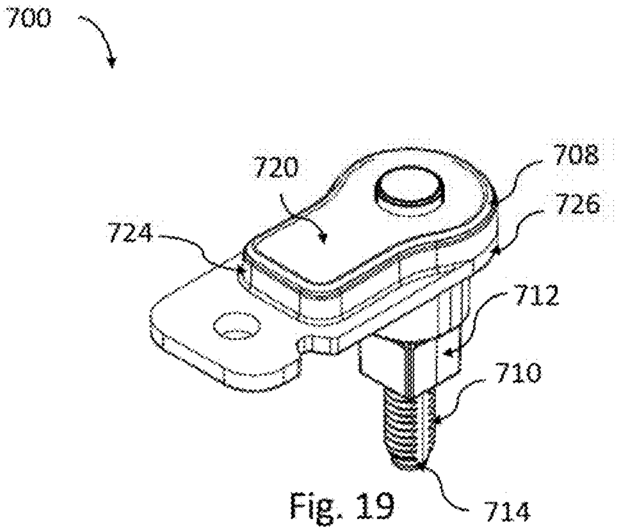
FIG. 19 is a perspective view of a preassembled hinge module in accordance with another exemplary embodiment of the invention, showing an optional adapter that can be provided separately.
Figure 20:
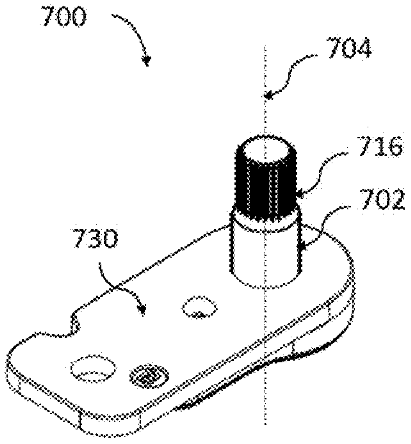
FIG. 20 is a rear perspective view of the preassembled hinge module of FIG. 19, shown without an adapter attached.

In accordance with another exemplary embodiment of the invention, and referring now to FIGS. 19-20, a preassembled hinge module 700 is configured for coupling a first component (not shown) to a second component (not shown) for pivotal movement relative to one another.

The preassembled hinge module 700 includes the shaft 702 defining the pivot axis 704, the shaft 702 being separate from, and configured to be mounted to, the first component (not shown). The shaft 702 is configured to be mated to the coupling element, such as adapter 710 defining a counterbore opening to receive a portion of the end 716 of the shaft 702. More specifically, the adapter 710 includes the end 712 configured for fixed coupling to the end 716 of the shaft 702 and the opposite end 714 configured for releasable coupling to the first component (not shown).

The hinge module 700 includes the housing 708, which is separate from and configured to be mounted to the second component (not shown). In particular, the rear wall 726 of the housing 708 of the preassembled hinge module 700 may include a universal mounting surface 730 (FIG. 20) configured to be mounted to the second component (not shown). The housing 708 further comprises or is configured to receive the cover 720, and also includes the side wall 724, the rear wall 726—the cover 720, the side wall 724, and the rear wall 726 together defining the interior space 718 (see FIG. 25) of the housing 708, wherein the interior space 718 is configured to receive and/or contain the torque element 706, which is discussed further below.

The torque element 706 (as seen in at least FIGS. 21A-21C) is configured for frictionally engaging the shaft 702. Further, the torque element 706 has a perimeter defining a recess 736, and the side wall 724 of the housing 708 comprises a detent or protrusion 740 extending into the interior space 718 within the housing 708. The detent 740 is configured to secure the torque element 706 inside the housing 708 and prevent the torque element 706 from rotation with respect to the housing 708. The torque element 706 (as seen in at least FIGS. 21A-21C) also defines the aperture 732 aligned with the pivot axis 704 of the shaft 702, with the shaft 702 extending through the aperture 732, while the shaft 702 is in frictional engagement with the torque element 706.

The cover 720 defines the first aperture 722 (as seen in at least FIGS. 21A-21C) and the rear wall 724 defines the second aperture 728—the first aperture 722 and the second aperture 728 being aligned with the pivot axis 704 of the shaft 702, such that the shaft 702 extends through at least the aperture 722 of the cover 720, the aperture 732 of the torque element 706, the interior space 718 of the housing 708, and the aperture 728 of the rear wall 726.

The side wall 724 has an inner surface 738, supplemental to the detent 740, configured to secure the torque element 706 inside the housing 708 and prevent the torque element 706 from rotation with respect to the housing 708. The inner surface 738 defines one or more ridges 742 for securing the cover 720. The rear wall 726 extends beyond the side wall 724 to form an extension 744.

The extension 744 of the rear wall 726 defines a third aperture 745 for receiving a mounting fastener (e.g. screw 205 in FIG. 7) to mount the housing 708 to the second component (not shown). Further, the rear wall 726 and the side wall 724 of the housing 708 may be integrally formed as a single body of unitary construction that is separate from the cover 720.

Figures 21A, 21B, 21C:
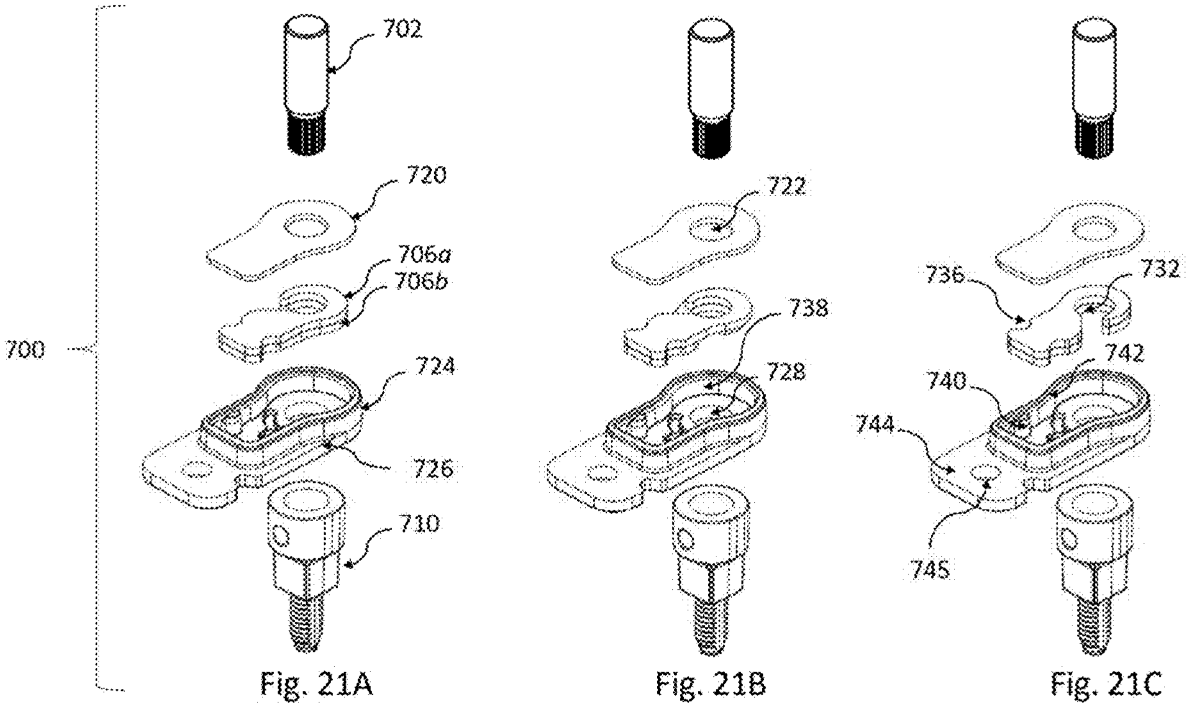
FIG. 21A depicts an exploded view of a preassembled hinge module in accordance with another exemplary embodiment of the invention, showing a first torque element in a first orientation and a second torque element in the first orientation.
FIG. 21B depicts an exploded view of a preassembled hinge module, showing the first torque element in the first orientation and the second torque element in a second orientation.
FIG. 21C depicts an exploded view of a preassembled hinge module, showing the first torque element in the second orientation and the second torque element in the second orientation.

Referring to FIGS. 21A-21C, the preassembled hinge module 700 may include plural torque elements 706 for frictionally engaging the shaft 702. The interior space 718 receives one or more of the torque elements 706 in a form-locking fit. As seen in FIG. 21A, the exploded view of the preassembled hinge module 700 in accordance with an exemplary embodiment of the invention shows the first torque element **706*a* in the first orientation (or position) and the second torque element 706*b*** in the first position.

According to another exemplary embodiment of the invention and as illustrated in FIG. 21B, the first torque element **706*a* may be arranged in the first position and the second torque element 706*b* in the second position. Finally, as seen in FIG. 21C and in accordance with yet another exemplary embodiment of the invention, the first torque element 706*a* may be arranged in the second position and the second torque element 706*b*** in the second position.

Furthermore, although FIGS. 21A-21C depict the hinge module 700 as including adapter 710, it should be understood that the hinge module 700 can be sized and shaped to receive other types of coupling elements configured for releasable coupling to the first component (not shown). It should also be understood that the hinge module 700 may not include the coupling element, such as adapter 710.

Figure 22A:
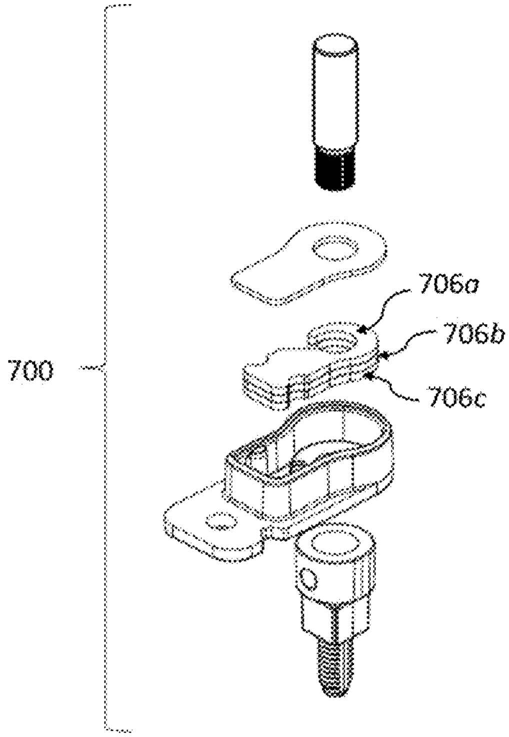
FIG. 22A depicts an exploded view of a preassembled hinge module in accordance with another exemplary embodiment of the invention, showing a first, a second, and a third torque element in a first orientation.
Figure 22B:
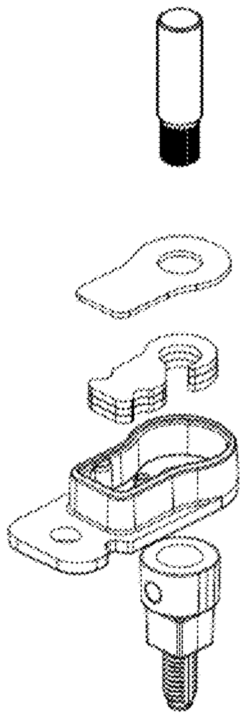
FIG. 22B depicts an exploded view of a preassembled hinge module in accordance with another exemplary embodiment of the invention, showing the first, second, and third torque elements in a second orientation.

In accordance with another exemplary embodiment of the invention, the preassembled hinge module 700 includes a housing 708 that is sized and shaped to receive plural torque elements 706, including the first torque element **706*a*, the second torque element 706*b*, and the third torque element 706*c*. As seen in FIG. 22A, the torque elements 706*a*, 706*b*, and 706*c* are all arranged in the first position. As illustrated in FIG. 22B, the first (706*a*), second (706*b*), and third (706*c*) torque elements are arranged in the second position. It should be understood that the plural torque elements 706** may be arranged in any combination of the first and second positions.

Figures 23A, 23B, 23C:
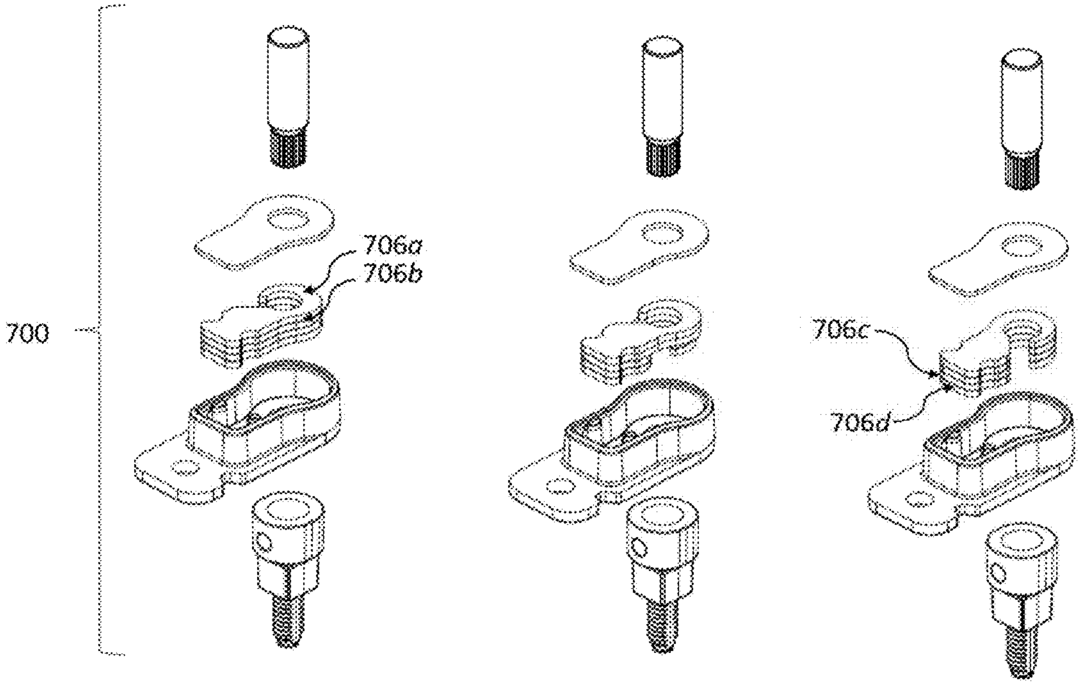
FIG. 23A depicts an exploded view of a preassembled hinge module in accordance with another exemplary embodiment of the invention, showing a first, a second, a third, and a fourth torque element in a first orientation.
FIG. 23B depicts an exploded view of a preassembled hinge module, showing the first and second torque elements in the first orientation and the third and fourth torque elements in a second orientation.
FIG. 23C depicts an exploded view of a preassembled hinge module, showing the first, second, third, and fourth torque elements in a second orientation.

In accordance with yet another exemplary embodiment of the invention, the preassembled hinge module 700 includes a housing 708 that is sized and shaped to receive four torque elements 706, including the first torque element **706*a*, the second torque element 706*b*, the third torque element 706*c* and the fourth torque element 706*d*. As seen in FIG. 23A, the torque elements 706*a*, 706*b*, 706*c*, and 706*d* are all arranged in the first position. As illustrated in FIG. 23B, the first (706*a*) and second (706*b*) torque elements are arranged in the first position whereas the third (706*c*) and fourth (706*d*) torque elements are arranged in the second position. Finally, as depicted in FIG. 23C, the torque elements 706*a*, 706*b*, 706*c*, and 706*d* are all arranged in the second position. It should be understood that the plural torque elements 706** may be arranged in any combination of the first and second positions.

Figure 24C:
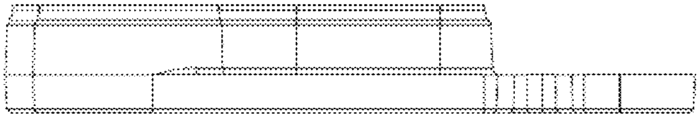
FIG. 24C is a side view of the housing of the preassembled hinge module of FIG. 24A.
Figure 24B:
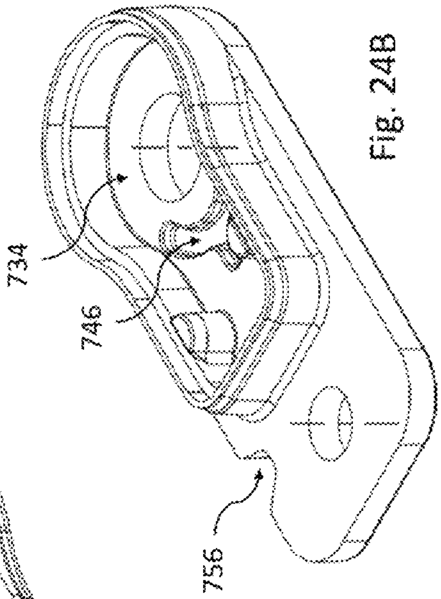
FIG. 24B depicts a perspective view of the housing of the preassembled hinge module of FIG. 24A.
Figure 24A:
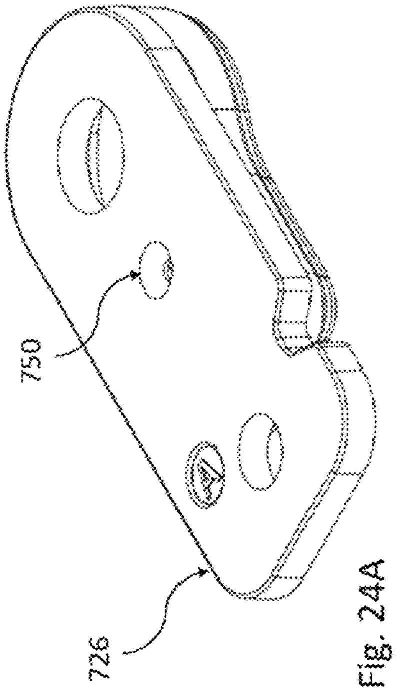
FIG. 24A depicts a rear perspective view of a housing of a preassembled hinge module, showing a first indicia corresponding to a first mounting location.
Figure 24F:
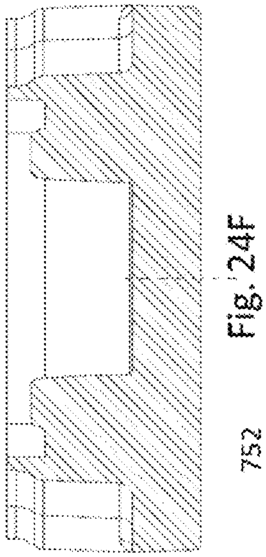
FIG. 24F depicts a cross-sectional bottom view of the housing of the preassembled hinge module of FIG. 24A, taken through line 24F-24F in FIG. 24D.
Figure 24G:
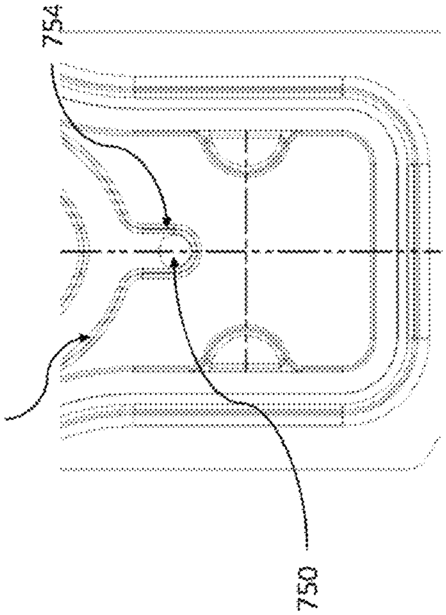
FIG. 24G is an enlarged view of a portion (24G-24G in FIG. 24D) of the interior space of the housing of the preassembled hinge module of FIG. 24A.
Figure 24E:
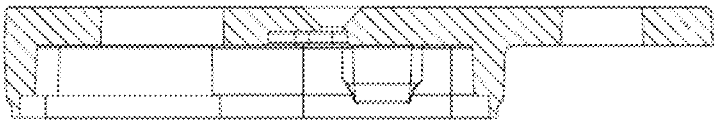
FIG. 24E depicts a cross-sectional side view of the housing of the preassembled hinge module of FIG. 24A, taken through line 24E-24E in FIG. 24D.
Figure 24D:
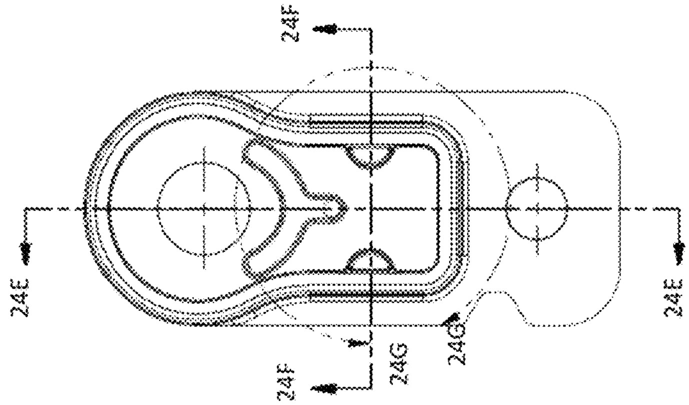
FIG. 24D is a front elevational view of the housing of the preassembled hinge module of FIG. 24A, showing a groove configured to receive a lubricant.

Referring now to FIGS. 24A-24G, the hinge module 700 comprises the rear wall 726 of the housing 708 that defines a passageway 750 (FIG. 24A), which is configured to receive or introduce a quantity of lubricant, such as grease (not shown), into the interior space 718 of housing 708. As best seen in FIGS. 24B, 24D, and 24G, the passageway 750 is in communication with a groove 746 defined by an interior surface 734 of the rear wall 726 of the housing 708 for flow of the lubricant into the passageway 750 and into the groove 746.

Further, the groove 746 and the torque element 706 together define a receptacle configured to receive lubricant, which is then contained in a reservoir, such as interior space 718 (as illustrated in FIGS. 24B, 24E, and 24F). As seen in FIGS. 24D and 24G, the groove may include a transverse portion 752 oriented to extend in a direction transverse relative to the pivot axis 704 of the shaft 702. Further, the groove 746 includes a radial portion 754 oriented to extend in a direction radial relative to the pivot axis 704 of the shaft 702.

Referring now generally to FIGS. 24B and 25-28, a hinge module set configured for coupling the first component 110 to the second component 120 for pivotal movement relative to one another, the hinge module set includes a first preassembled hinge module 700 configured to control relative pivotal movement of the first 110 and second 120 components in a first pivot direction, and a second preassembled hinge module 700 configured to control relative pivotal movement of the first and second components in a second pivot direction opposite the first direction.

Figure 25:
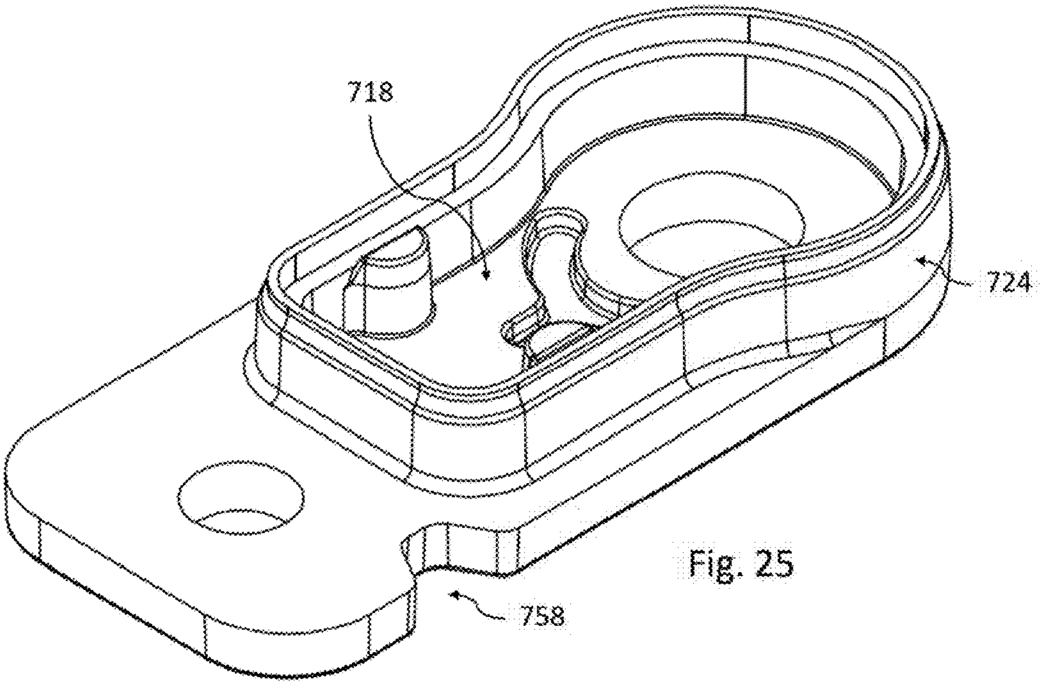
FIG. 25 depicts a perspective view of a housing of a preassembled hinge module in accordance with another exemplary aspect of the invention, showing a second indicia corresponding to a second mounting location.

Moreover, FIG. 24B and FIG. 25 together define a first pair or set of hinge modules 700 in accordance with an embodiment of the invention. As seen in FIG. 24B, the hinge module 700 may include the first indicia 756 corresponding to a first mounting location (not shown). Alternatively or additionally, the hinge module 700 may include the second indicia 758 corresponding to a second mounting location (not shown), as seen in FIG. 25.

Figure 26:
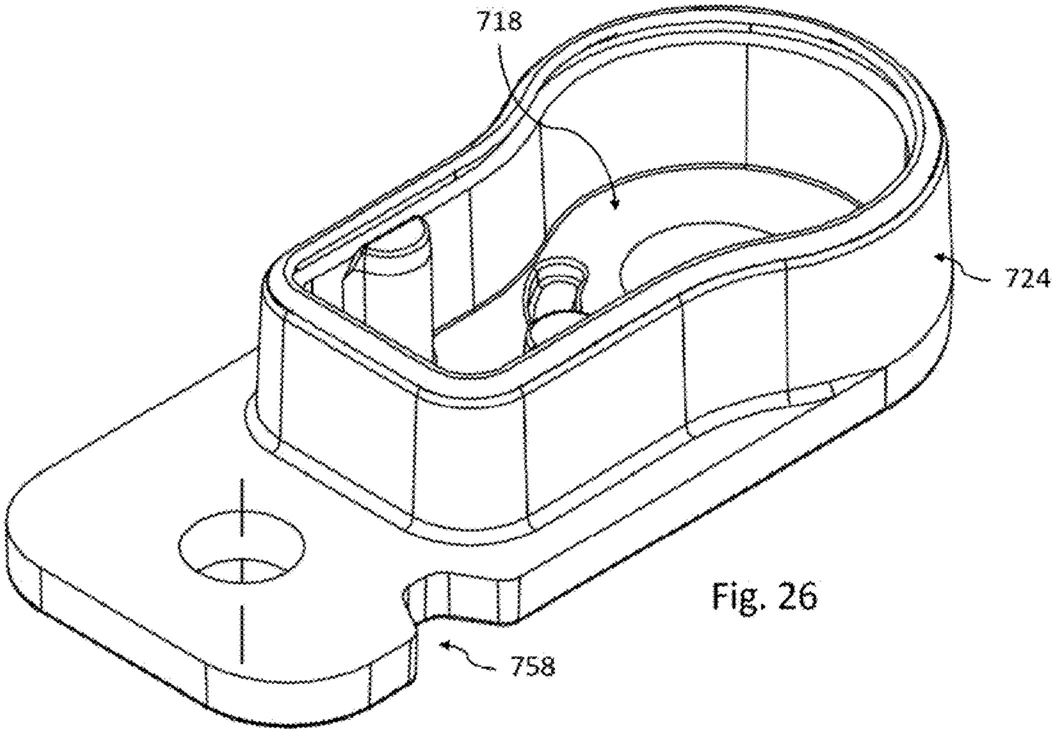
FIG. 26 depicts a perspective view of a housing of a preassembled hinge module in accordance with another exemplary aspect of the invention, showing the second indicia and a larger housing size.
Figure 27:
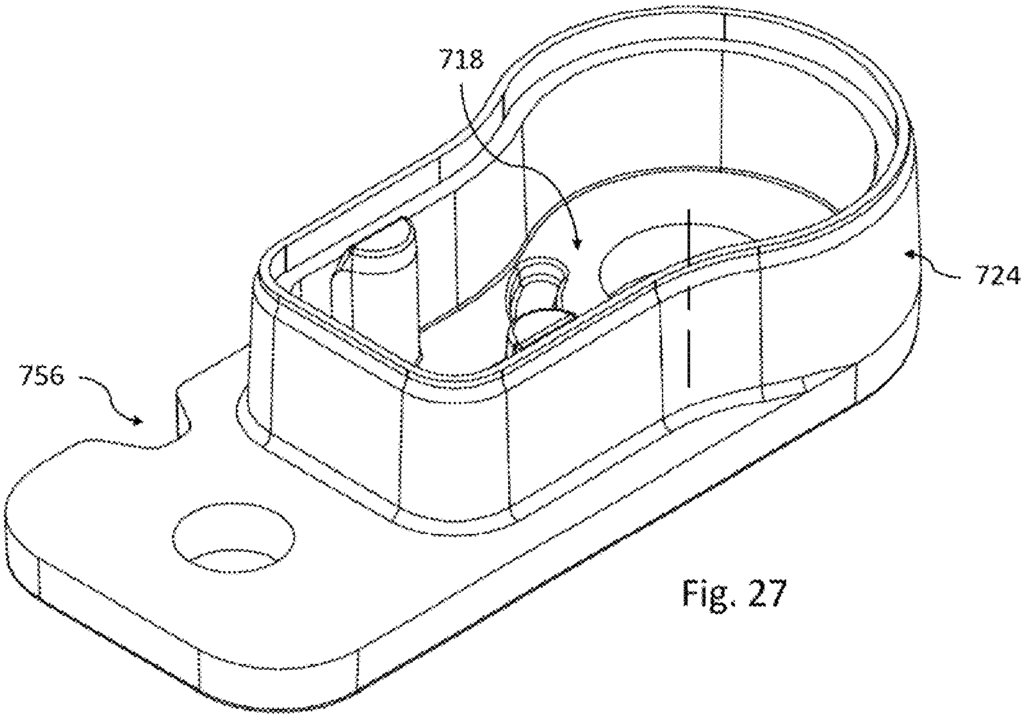
FIG. 27 depicts a perspective view of a housing of a preassembled hinge module in accordance with another exemplary aspect of the invention, showing the first indicia and the larger housing size.

Likewise, FIGS. 26 and 27 together define a second pair or set of housings for hinge modules 700 in accordance with another embodiment of the invention. As illustrated in FIG. 26, the hinge module 700 is sized and shaped to receive a plurality of torque elements 706 and further includes the first indicia 758 corresponding to a first mounting location (not shown). Alternatively or additionally, the hinge module 700 is also sized and shaped to receive a plurality of torque elements 706 and also includes the second indicia 756 corresponding to a second mounting location (not shown), as seen in FIG. 27. As explained earlier, the positioning of the torque elements 706 can be used to provide symmetrical torque (same frictional resistance in both directions of rotation) or asymmetrical torque (different frictional resistances in opposite directions of rotation). For example, if all torque elements are positioned or oriented in the same direction, then the torque elements will typically provide asymmetrical torque. Alternatively, if equal numbers of torque elements are positioned or oriented in the opposite direction, then the torque elements will typically provide symmetrical torque. Further, it should be understood that the more torque elements 706 are included, the greater the torque provided.

Figure 28:
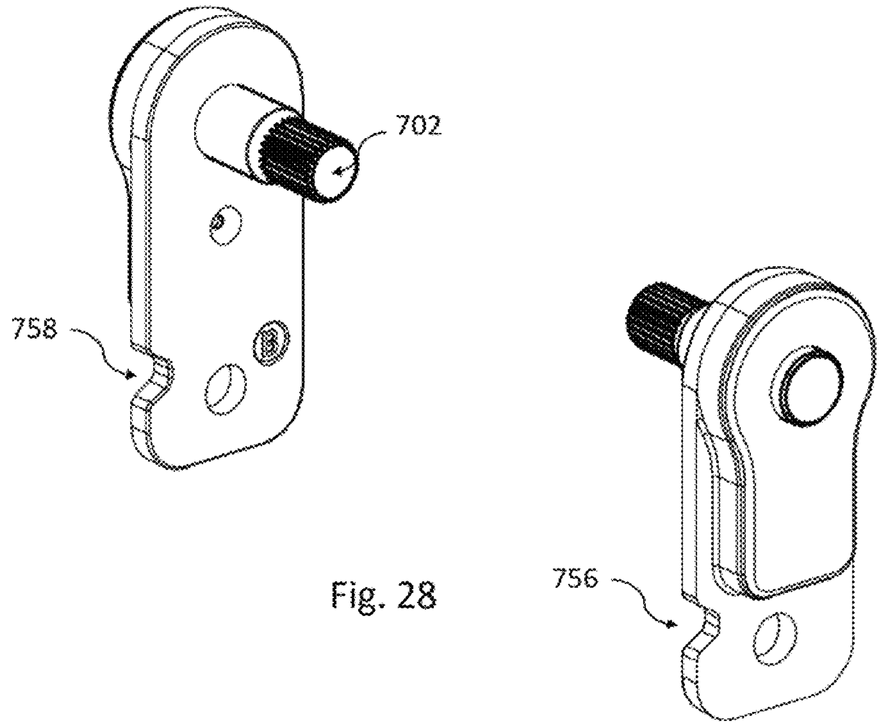
FIG. 28 depicts a set of two preassembled hinge modules in accordance with another exemplary embodiment of the invention, each hinge module shown without an optional adapter that can be provided separately, and with the second indicia.

Similarly, FIG. 28 depicts a third pair or set of hinge modules 700 in accordance with yet another embodiment of the invention, wherein each hinge module 700 does not comprise a coupling element, such as adapter 710. One of hinge modules 700 includes the first indicia 756 corresponding to a first mounting location (not shown). Alternatively or additionally, the other hinge module 700 includes the second indicia 758 corresponding to a second mounting location (not shown).

Figure 29A:
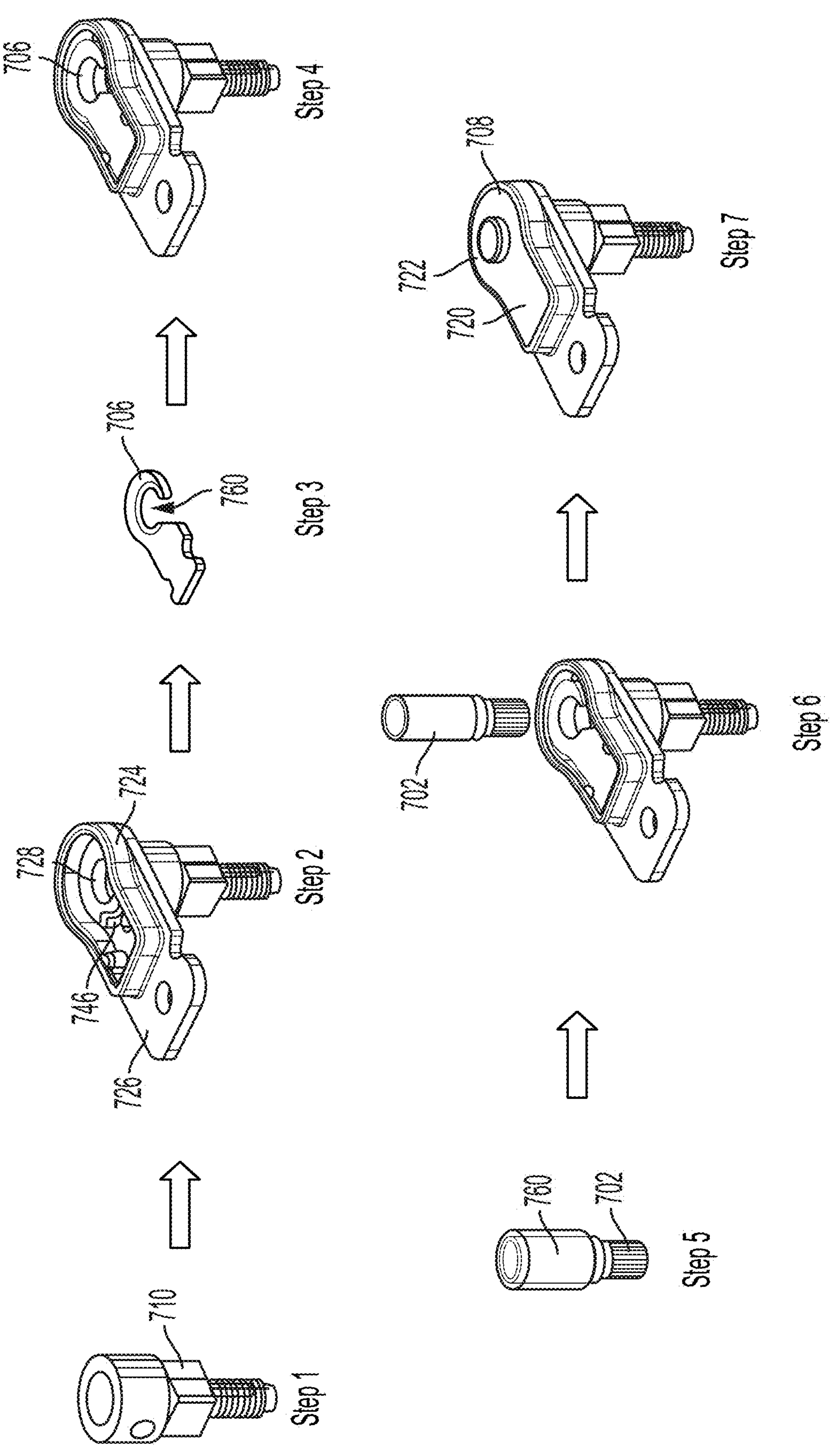
FIG. 29A-29B depict embodiments of processes for a top-to-bottom or top-down assembly of a hinge module in accordance with an exemplary aspect of the invention.
Figure 29B:
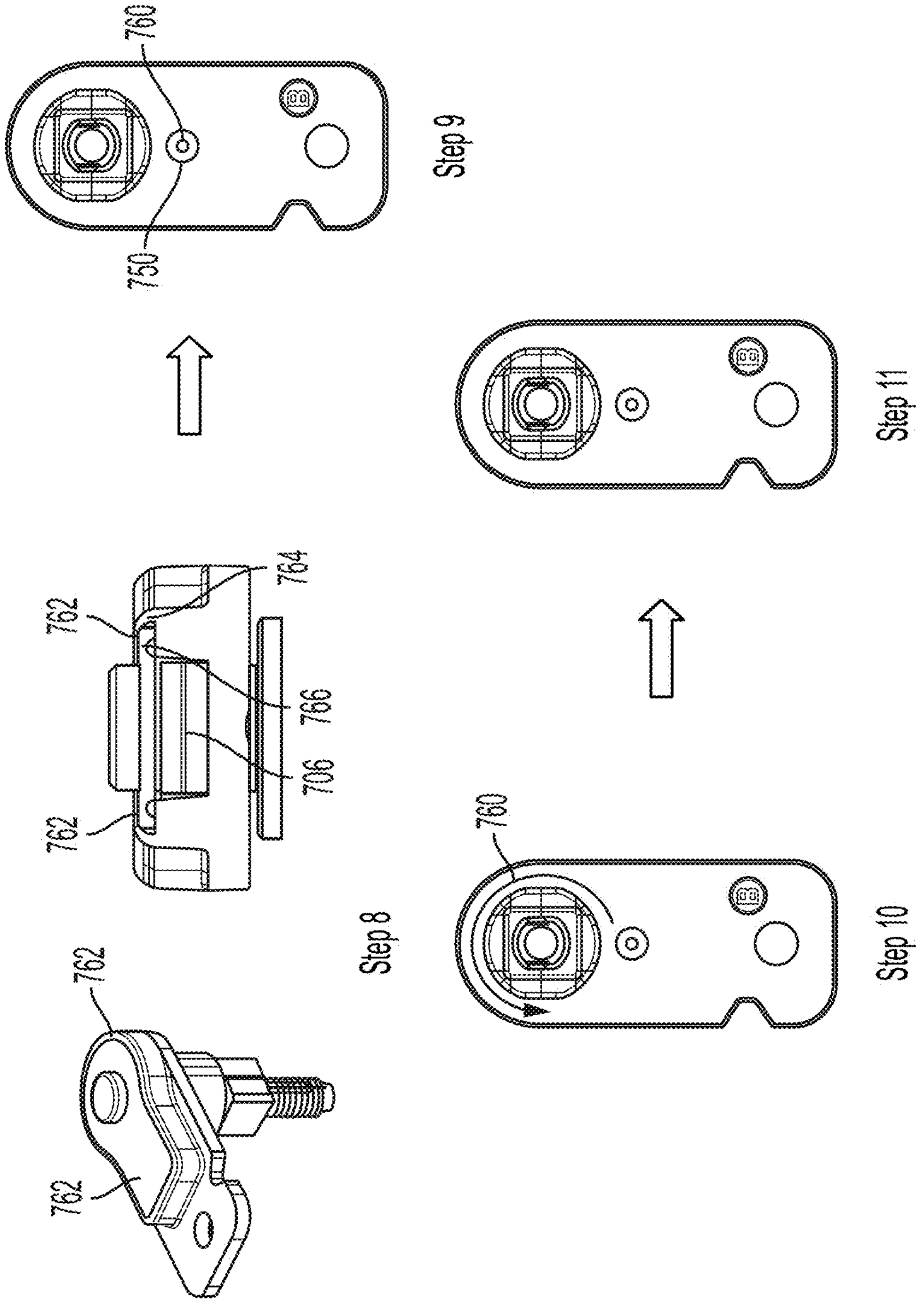

Finally, referring to FIGS. 29A-29B, a method for assembling a hinge module 700 is also provided. Generally speaking the method comprises the steps of: applying lubricant, such as grease 760, to the shaft 702 (step 5); pressing at least a portion of the cover 720 toward the interior space 718 (step 8); injecting lubricant, such as grease 760, into the interior space 718 via a passageway 750 defined in the rear wall 726 of the housing 708 (step 9); and rotating the shaft 702 about a pivot axis 704 to distribute the lubricant 760 (step 10) along a groove 746 defined in the rear wall 726 of the housing 708, the groove 746 being configured to guide the flow of lubricant 760 from the passageway 750 defined in the rear wall 726 of the housing 708. Although FIGS. 29A and 29B depict a method wherein the steps are performed sequentially in the order recited and illustrated, it should be understood that the steps may be performed in any order.

Referring specifically to FIG. 29A, and with respect to steps 1 and 6, the method of assembly of hinge module 700 may comprise coupling a portion of the end 716 of the shaft 702 to a coupling element, such as adapter 710, in accordance with an aspect of the invention. The coupling element is illustrated in step 1.

Regarding steps 2-4 and according to one aspect of the invention, the step 3 of applying the lubricant 760 to the torque element 706 is preceded by the step 2 of aligning an aperture, such as aperture 728, which is defined in the rear wall 726 of the housing 708 with an aperture, such as aperture 732, defined by the torque element 706.

According to another aspect of the invention and with respect to steps 4, 6, and 8, the step 4 of placing the torque element 706 inside the interior space 718 of the housing 708, the step 6 of inserting the shaft 702 through the passage created by aligning the aperture 722 of the cover 720 and the aperture 732 of the torque element 706, the step 8 of placing the cover 720 adjacent the torque element 706, and the step 8 of deforming the side wall 724 of the housing 708 are performed by actions initiated generally along a common assembly direction. For example, this may be a top-to-bottom direction or a bottom-to-top direction in which the components are assembled along a common axis and/or in a common direction, which makes it possible to reduce or eliminate the manipulation or repositioning of the components during assembly. According to one embodiment, the components can be stacked one on top of the other in a downward direction and along a common axis.

Additionally or optionally, the lubricant 760 may be applied to the exterior surface of the shaft 702, as seen in step 5 of FIG. 29A.

Regarding step 7, coupling the shaft 702 to the adapter 710 may comprise inserting the shaft 702 through the passage created by aligning the aperture 722 of the cover 720, the aperture 732 of the torque element 706, and the counterbore opening of the adapter 710 (FIGS. 6A-6D). Then the adapter 710 can be applied to the end or end portion of the shaft 702.

Referring to step 8 (as seen in FIG. 29B) and in accordance with yet another aspect of the invention, the step of pressing or staking or otherwise deforming (see arrows 762 in FIG. 29B) at least a portion of the cover 720 toward the interior space 718 comprises arranging the cover 720 such that the cover 720 extends within the interior space 718 of the housing 708. Furthermore, the step of pressing or staking or otherwise deforming at least a portion of the cover 720 toward the interior space 718 includes deforming an edge surface 764 (step 8 of FIG. 29B) of the side wall 724 of the housing 708, which extends beyond an outer surface 766 of the cover 720.

More specifically, the deforming step 8 may include pressing at least a portion of the side wall 724 of the housing 708 inwardly toward the interior space 718 of the housing 708 and into contact with the cover 720. In this way, the cover 720 is retained in position relative to the housing 708. Preferably, for example, the deforming step 8 includes deforming the edge surface 764 of the side wall 724 of the housing 708 to at least partially contact the outer surface 766 of the cover 720, thereby limiting movement of the cover 720 in a direction away from the interior space 718 of the housing 708. Additionally or alternatively, the deforming step 8 includes deforming the side wall 724 of the housing 708 radially inwardly from an outer surface 768 of the side wall 724 to secure the cover 708 relative to the housing 708.

Furthermore, and according to yet another aspect of the invention, the side wall 724 of the housing 708 can extend upwardly from the rear wall 726 of the housing 708. Accordingly, the step 4 of placing the torque element 706 inside the interior space 718 of the housing 708, the step 7 of placing the cover 720 adjacent the torque element 706, and the step 8 of deforming the side wall 724 of the housing 708 are performed in a top-to-bottom orientation generally along the common assembly direction (e.g., parallel to or along the axis 704 of the shaft 702).

Regarding step 9, and in accordance with another aspect of the invention, the injection step 9 includes injecting the lubricant 760 via the passageway 750 defined in the rear wall 726 of the housing 708 and into the groove 746 defined in the rear wall 726 of the housing 708.

Regarding step 10, the rotating step distributes the lubricant 760 along a transverse portion 752 of the groove 746 oriented to extend in a direction transverse relative to the pivot axis 704 of the shaft 702 (see FIG. 24D). The rotating step 10 may also comprise distributing the lubricant 760, such that a quantity of the lubricant 760 is contained in a reservoir formed by the interior space 718.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A preassembled hinge module configured for coupling a first component to a second component for pivotal movement relative to one another, the preassembled hinge module comprising:

a shaft defining a pivot axis;

a torque element frictionally engaging the shaft, the torque element having a perimeter defining a recess; and a housing having a side wall, a rear wall, and a cover, the side wall and the rear wall and the cover together defining an interior space within the housing, wherein the interior space is configured to receive the torque element inside the housing, wherein the side wall of the housing comprises a rounded detent or protrusion extending into the interior space within the housing, the detent or protrusion being configured to secure the torque element inside the housing and limit rotation of the torque element relative to the housing;

wherein the cover defines a first aperture and the rear wall defines a second aperture, the first aperture and the second aperture being aligned with the pivot axis of the shaft, with the shaft extending through at least the first aperture, the interior space of the housing, and the second aperture;

wherein the shaft is separate from, and configured to be mounted to, the first component; and wherein the housing is separate from, and configured to be mounted to, the second component.

2. The preassembled hinge module of claim 1, wherein the detent or protrusion extends into the recess defined in the perimeter of the torque element, thereby limiting movement of the torque element relative to the housing.

3. The preassembled hinge module of claim 1, wherein the detent or protrusion extends into a recess defined in the cover, thereby limiting movement of the cover relative to the housing.

4. The preassembled hinge module of claim 1, wherein the rear wall of the housing defines a groove, the groove defined in the rear wall of the housing and the torque element together defining a receptacle configured to receive a lubricant.

5. The preassembled hinge module of claim 4, wherein the interior space forms a reservoir that contains the lubricant.

6. The preassembled hinge module of claim 4, wherein the lubricant includes grease.

7. The preassembled hinge module of claim 4, the groove having a transverse portion oriented to extend in a direction transverse relative to the pivot axis of the shaft.

8. The preassembled hinge module of claim 4, the groove having a radial portion oriented to extend in a direction radial relative to the pivot axis.

9. The preassembled hinge module of claim 1, wherein the rear wall of the housing defines a passageway, the passageway defined in the rear wall of the housing being configured to receive a lubricant.

10. The preassembled hinge module of claim 9, wherein the rear wall of the housing further defines a groove, the groove defined in the rear wall of the housing being in communication with the passageway defined in the rear wall of the housing for flow of the lubricant into the passageway and into the groove.

11. The preassembled hinge module of claim 1, wherein the rear wall of the housing comprises a universal mounting surface configured to be mounted to the second component.

12. The preassembled hinge module of claim 1, wherein the torque element defines an aperture aligned with the pivot axis of the shaft, with the shaft extending through the aperture in frictional engagement with the torque element.

13. The preassembled hinge module of claim 1, wherein the side wall has an inner surface, supplemental to the detent or protrusion, configured to secure the torque element inside the housing and prevent the torque element from rotation with respect to the housing.

14. The preassembled hinge module of claim 1, wherein the side wall has an inner surface, supplemental to the detent or protrusion, also configured to secure the torque element inside the housing and prevent the torque element from rotation relative to the housing, and the inner surface defines one or more ridges for securing the torque element.

15. The preassembled hinge module of claim 1, wherein the rear wall extends beyond the side wall to form an extension.

16. The preassembled hinge module of claim 15, wherein the extension of the rear wall defines a third aperture for receiving a mounting fastener to mount the housing to the second component.

17. The preassembled hinge module of claim 1, wherein the rear wall and the side wall of the housing are integrally formed as a single body of unitary construction that is separate from the cover.

18. The preassembled hinge module of claim 1, comprising plural torque elements frictionally engaging the shaft.

19. The preassembled hinge module of claim 1, wherein the interior space receives the torque element in a form-locking fit.

20. The preassembled hinge module of claim 1, wherein at least a portion of a perimeter edge of the cover is engaged with a surface of an upper portion of the side wall that extends inwardly and over the portion of the perimeter edge of the cover, thereby securing the cover in place.

21. A preassembled hinge module system configured for coupling a first component to a second component for pivotal movement relative to one another, the preassembled hinge module comprising:

a shaft defining a pivot axis, the shaft being separate from, and configured to be mounted to, the first component;

a torque element frictionally engaging the shaft;

a housing containing the torque element, the housing having a side wall and a cover, and wherein at least a portion of a perimeter edge of the cover is engaged with a surface of an upper portion of the side wall that extends inwardly and over the portion of the perimeter edge of the cover, thereby securing the cover in place; and an adapter having an end configured for fixed coupling to the shaft and an opposite end configured for releasable coupling to the first component.

22. The preassembled hinge module system according to claim 21, wherein the shaft is mated to the adapter, the adapter defining a counterbore opening to receive a portion of an end of the shaft.

23. The preassembled hinge module system of claim 21, wherein when the at least a portion of the perimeter edge of the cover is engaged with the surface of the upper portion of the side wall, the surface of the upper portion of the side wall and the at least a portion of the perimeter edge of the cover is in a fluid tight crimped connection.

24. The preassembled hinge module system of claim 21, wherein an entirety of the perimeter edge of the cover is engaged with the surface of the upper portion of the side wall.

25. The preassembled hinge module system of claim 21, wherein the surface of the upper portion of the side wall is deformable in at least one of a downward and inward direction, thereby engaging the at least a portion of the perimeter edge of the cover.

26. The preassembled hinge module system of claim 21, wherein when the at least a portion of the perimeter edge of the cover is engaged with the surface of the upper portion of the side wall, the cover provides a partial or full seal against ingress of contaminants into an interior space of the housing.

27. The preassembled hinge module system of claim 21, wherein when the at least a portion of the perimeter edge of the cover is engaged with the surface of the upper portion of the side wall, the cover prevents or limits the escape of grease or lubricant from an interior space of the housing.

28. A hinged system comprising:

a first component;

a second component; and a hinge system including preassembled hinge modules that couple the first component to the second component in a pivot connection so as to allow pivotal movement of the first component relative to the second component, each of the preassembled hinge modules including:

a shaft defining a pivot axis;

a torque element frictionally engaging the shaft, the torque element having a perimeter defining a recess; and a housing having a cover, a rear wall, and a side wall, wherein the housing defines an interior space enclosed within the housing, and the interior space is configured to receive the torque element, wherein the side wall of the housing comprises a rounded detent or protrusion extending into the interior space within the housing, the detent or protrusion being configured to secure the torque element inside the housing and limit rotation of the torque element relative to the housing;

wherein the cover defines a first aperture and the rear wall defines a second aperture, the first aperture and the second aperture being aligned with the pivot axis of the shaft, with the shaft extending through at least the first aperture, the interior space of the housing, and the second aperture;

wherein the shaft is mounted to the first component; and wherein the housing is mounted to the second component.

29. The hinged system of claim 28, wherein at least a portion of a perimeter edge of the cover is engaged with a surface of an upper portion of the side wall that extends inwardly and over the portion of the perimeter edge of the cover, thereby securing the cover in place.

* * * * *